United States Patent
Aiba et al.

(10) Patent No.: US 10,638,507 B2
(45) Date of Patent: Apr. 28, 2020

(54) USER EQUIPMENTS, BASE STATIONS AND METHODS

(71) Applicant: Sharp Laboratories of America, Inc., Camas, WA (US)

(72) Inventors: Tatsushi Aiba, Vancouver, WA (US); Zhanping Yin, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 1 day.

(21) Appl. No.: 16/191,898

(22) Filed: Nov. 15, 2018

(65) Prior Publication Data

US 2019/0150183 A1 May 16, 2019

Related U.S. Application Data

(63) Continuation of application No. PCT/US2018/061073, filed on Nov. 14, 2018.

(60) Provisional application No. 62/587,323, filed on Nov. 16, 2017.

(51) Int. Cl.
| | |
|---|---|
| *H04L 12/28* | (2006.01) |
| *H04W 72/14* | (2009.01) |
| *H04W 72/04* | (2009.01) |
| *H04W 48/12* | (2009.01) |
| *H04L 5/00* | (2006.01) |
| *H04W 72/12* | (2009.01) |
| *H04W 24/10* | (2009.01) |

(52) U.S. Cl.
CPC ........... *H04W 72/14* (2013.01); *H04L 5/0053* (2013.01); *H04W 24/10* (2013.01); *H04W 48/12* (2013.01); *H04W 72/0413* (2013.01); *H04W 72/0446* (2013.01); *H04W 72/1268* (2013.01); *H04L 5/001* (2013.01); *H04L 5/0048* (2013.01)

(58) Field of Classification Search
CPC ........................................................ H04L 12/28
USPC ........................................................ 370/329
See application file for complete search history.

(56) References Cited

U.S. PATENT DOCUMENTS

| | | | |
|---|---|---|---|
| 2010/0128614 A1 | 5/2010 | Kuusela et al. | |
| 2011/0305211 A1 | 12/2011 | Lunttila et al. | |
| 2014/0153536 A1 | 6/2014 | Ouchi et al. | |

(Continued)

OTHER PUBLICATIONS

International Search Report and Written Opinion issued for PCT Application No. PCT/US2018/061073 dated Feb. 1, 2019.

(Continued)

*Primary Examiner* — Dang T Ton
(74) *Attorney, Agent, or Firm* — Austin Rapp

(57) ABSTRACT

A user equipment (UE) that communicates with a base station apparatus on one or more downlink bandwidth parts (DL BWPs) in a serving cell is described. Receiving circuitry is configured to receive a radio resource control (RRC) message comprising first information. The receiving circuitry is also configured to receive a RRC message comprising second information. The receiving circuitry is also configured to monitor a PDCCH based on the first information. The receiving circuitry is also configured to receive on the PDCCH, a downlink control information (DCI) format comprising third information and fourth information. Transmitting circuitry is configured to perform in a slot, based on a detection of the DCI comprising the third information and the fourth information, an aperiodic CSI reporting on the PUSCH, the slot being determined based on the fourth information.

12 Claims, 15 Drawing Sheets

Resource Grid and Resource Block

(56) References Cited

U.S. PATENT DOCUMENTS

| | | |
|---|---|---|
| 2015/0131568 A1 | 5/2015 | You et al. |
| 2015/0156764 A1 | 6/2015 | Yang et al. |
| 2016/0234830 A1 | 8/2016 | Kim et al. |
| 2017/0141833 A1 | 5/2017 | Kim et al. |
| 2019/0372806 A1* | 12/2019 | Park .................... H04W 72/046 |

OTHER PUBLICATIONS

3GPP TS 38.211 V1.0.0, "3rd Generation Partnership Project; Technical Specification Group Radio Access Network; NR; Physical channels and modulation (Release 15)," Sep. 7, 2017.

3GPP TS 38.212 V1.0.0, "3rd Generation Partnership Project; Technical Specification Group Radio Access Network; NR; Multiplexing and channel coding (Release 15)," Sep. 7, 2017.

3GPP TS 38.213, V1.0.0, 3rd Generation Partnership Project; Technical Specification Group Radio Access Network; NR; Physical layer procedures for control (Release 15) Sep. 7, 2017.

3GPP TS 38.214 V1.0.0, "3rd Generation Partnership Project; Technical Specification Group Radio Access Network; NR; Physical layer procedures for data (Release 15)," Sep. 7, 2017.

\* cited by examiner

Supported Transmission Numerologies

| $\mu$ | $\Delta f = 2^{\mu} \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Number of OFDM Symbols Per Slot

| | | Slot configuration | | | |
|---|---|---|---|---|---|
| | | 0 | | 1 | |
| $\mu$ | $N^{slot}_{symb}$ | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

FIG. 2

(a) 2-bit CSI Request field

| Value of CSI request field | Description |
|---|---|
| '00' | No aperiodic CSI report is triggered |
| '01' | Aperiodic CSI report is triggered for BWP |
| '10' | Aperiodic CSI report is triggered for a 1st set of BWPs configured by higher layers |
| '11' | Aperiodic CSI report is triggered for a 2nd set of BWPs configured by higher layers |

(b) 3-bit CSI Request field

| Value of CSI request field | Description |
|---|---|
| '000' | No aperiodic CSI report is triggered |
| '001' | Aperiodic CSI report is triggered for BWP |
| '010' | Aperiodic CSI report is triggered for a 3rd set of serving cells and BWPs configured by higher layers |
| '011' | Aperiodic CSI report is triggered for a 4th set of serving cells and BWPs configured by higher layers |
| '100' | Aperiodic CSI report is triggered for a 5th set of serving cells and BWPs configured by higher layers |
| '101' | Aperiodic CSI report is triggered for a 6th set of serving cells and BWPs configured by higher layers |
| '110' | Aperiodic CSI report is triggered for a 7th set of serving cells and BWPs configured by higher layers |
| '111' | Aperiodic CSI report is triggered for a 8th set of serving cells and BWPs configured by higher layers |

FIG. 7

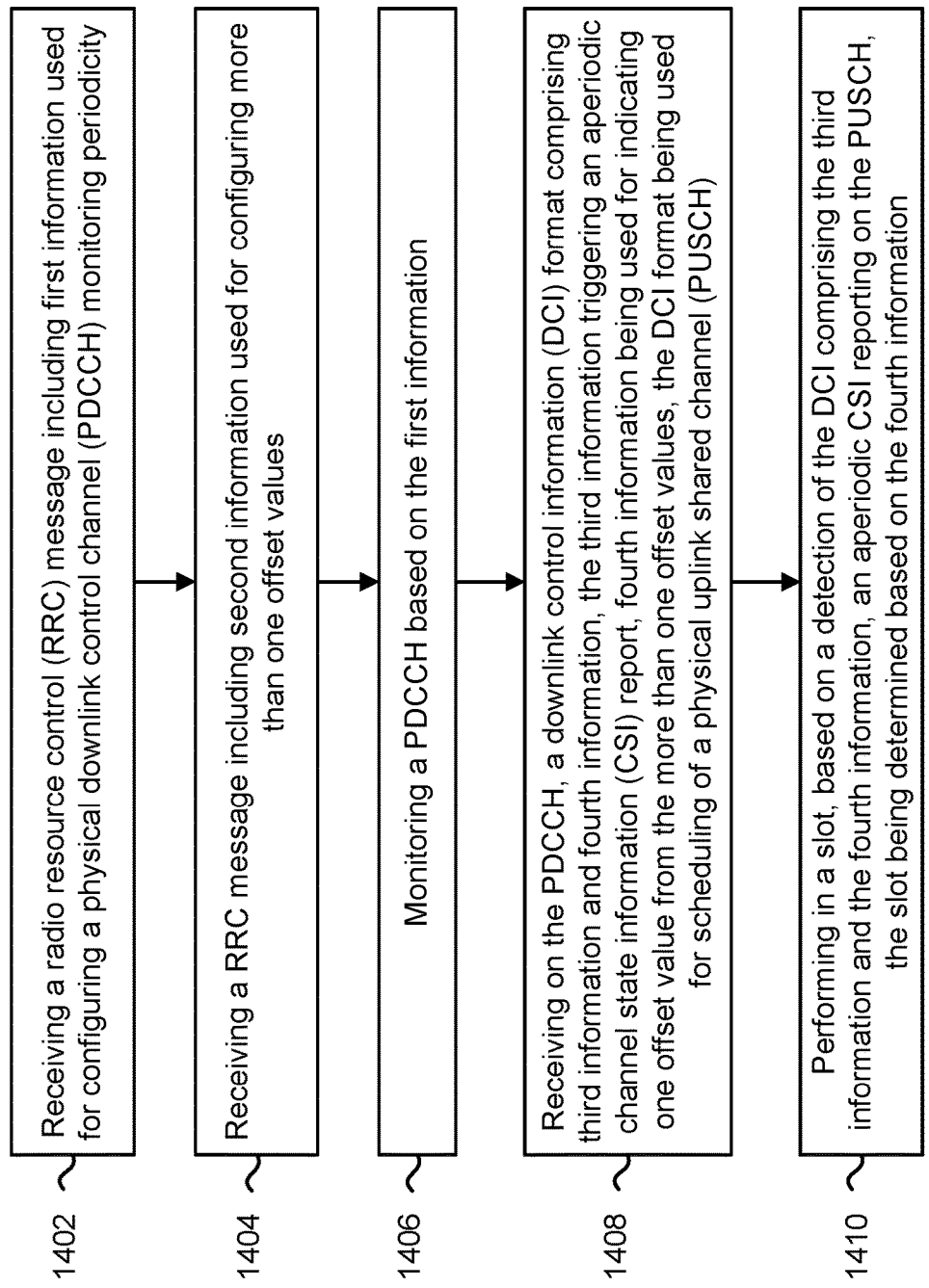

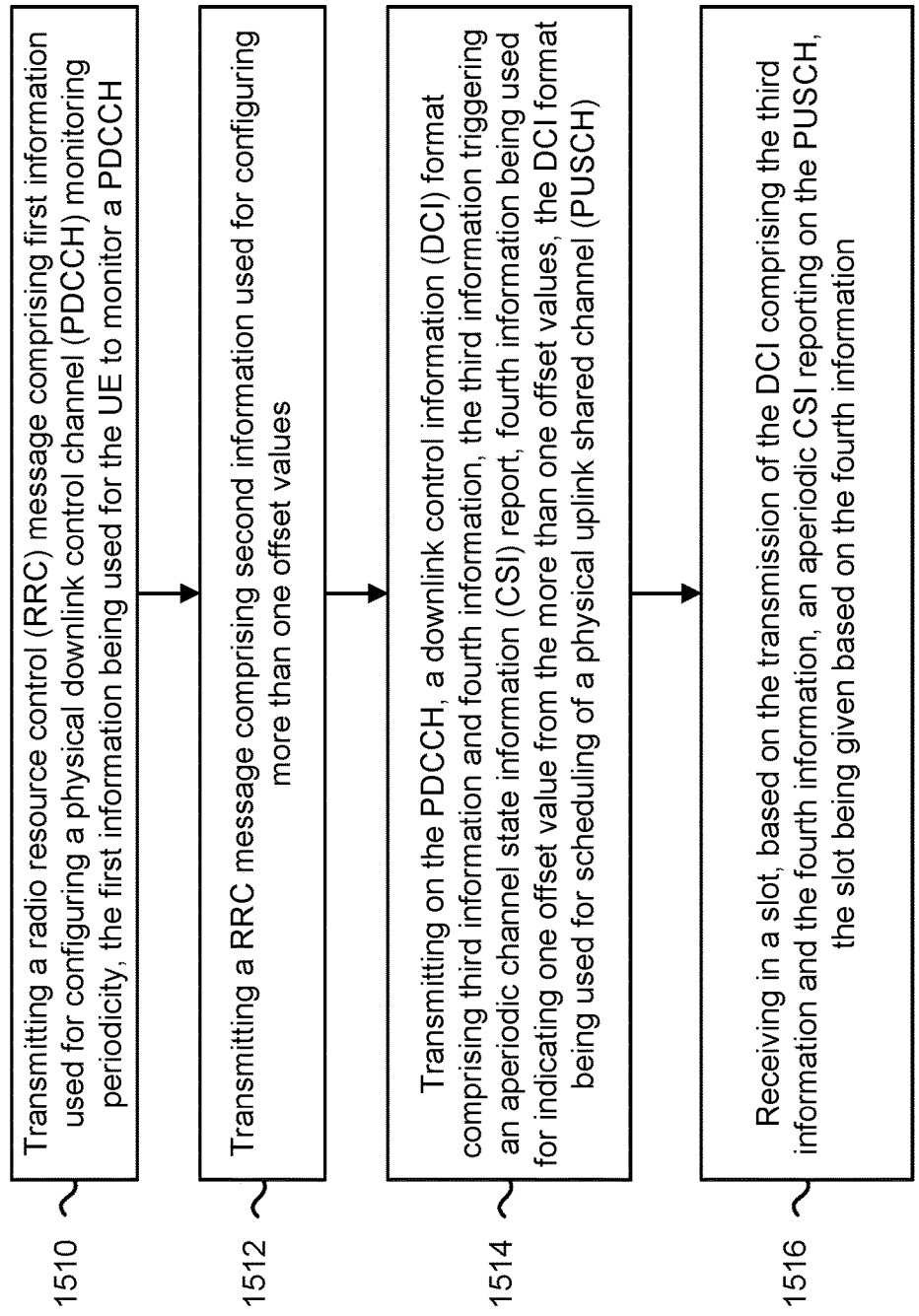

USER EQUIPMENTS, BASE STATIONS AND METHODS

RELATED APPLICATIONS

This application is related to and claims priority from U.S. Provisional Patent Application No. 62/587,323, entitled "USER EQUIPMENTS, BASE STATIONS AND METHODS," filed on Nov. 16, 2017, which is hereby incorporated by reference herein, in its entirety.

TECHNICAL FIELD

The present disclosure relates generally to communication systems. More specifically, the present disclosure relates to new signaling, procedures, user equipment (UE) and base stations for user equipments, base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 2 shows examples of multiple numerologies;

FIG. 7 illustrates examples of a channel state information (CSI) request field;

FIG. 14 is a flow diagram of a communication method of a user equipment (UE) that communicates with a base station apparatus on one or more downlink bandwidth parts (DL BWPs) in a serving cell; and FIG. 15 is a flow diagram illustrating a communication method of a base station apparatus that communicates with a user equipment (UE) on one or more downlink bandwidth parts (DL BWPs) in a serving cell.

DETAILED DESCRIPTION

Figure 1:
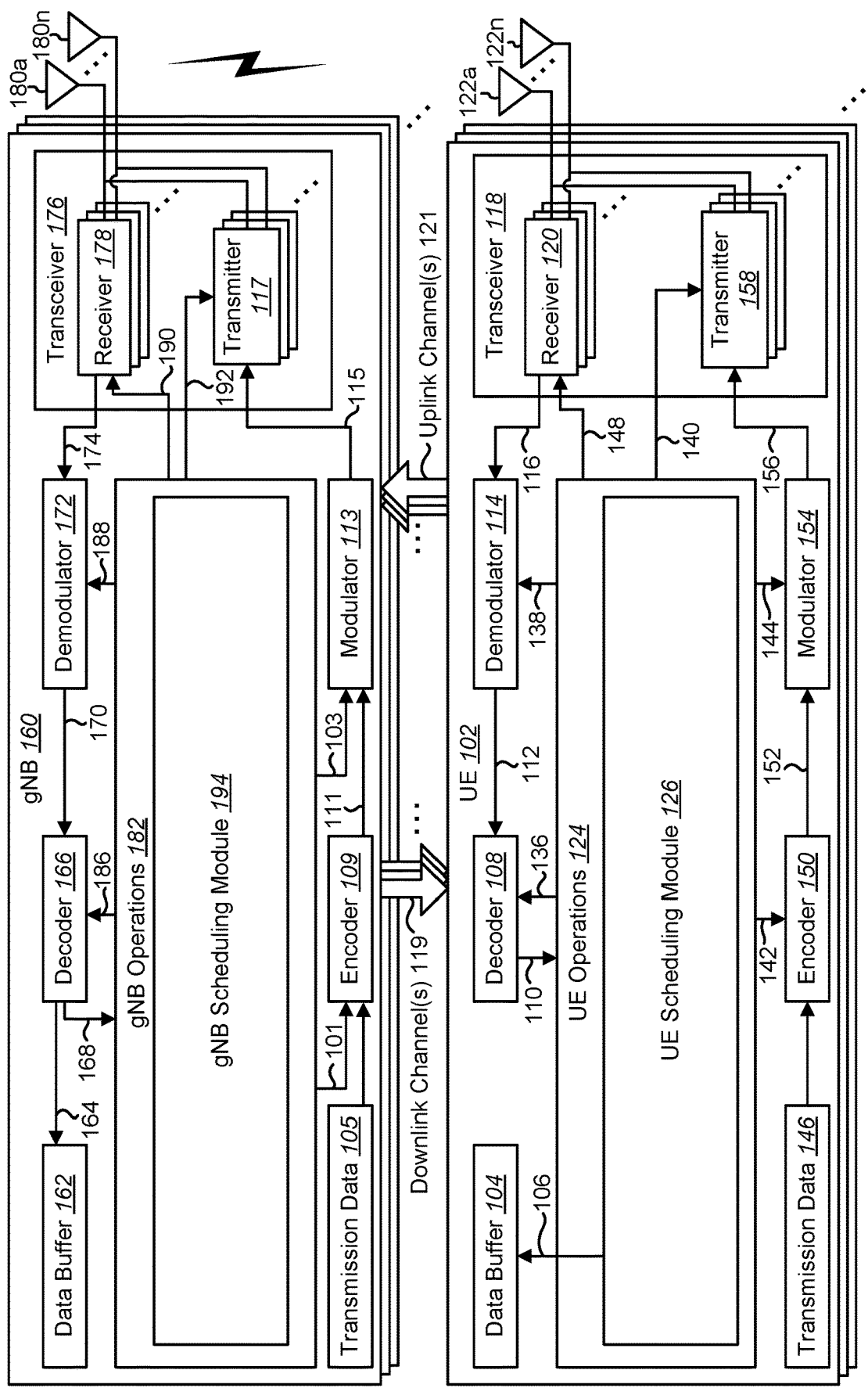
FIG. 1 is a block diagram illustrating one implementation of one or more base stations (gNBs) and one or more user equipments (UEs) in which systems and methods for downlink and/or uplink (re)transmissions may be implemented.

A user equipment (UE) that communicates with a base station apparatus on one or more downlink bandwidth parts (DL BWPs) in a serving cell is described. Receiving circuitry is configured to receive a radio resource control (RRC) message comprising first information used for configuring a physical downlink control channel (PDCCH) monitoring periodicity. The receiving circuitry is also configured to receive a RRC message comprising second information used for configuring more than one offset values. The receiving circuitry is also configured to monitor a PDCCH based on the first information and to receive on the PDCCH, a downlink control information (DCI) format comprising third information and fourth information, the third information triggering an aperiodic channel state information (CSI) report, fourth information being used for indicating one offset value from the more than one offset values, the DCI format being used for scheduling of a physical uplink shared channel (PUSCH). Transmitting circuitry is configured to perform in a slot, based on a detection of the DCI comprising the third information and the fourth information, an aperiodic CSI reporting on the PUSCH, the slot being determined based on the fourth information. The first information is configured for each of one or more search spaces, the one or more search spaces being configured for each of the one or more DL BWPs in the serving cell. The second information is configured for the serving cell.

The receiving circuitry may also be configured to receive a RRC message comprising fifth information use configuring DCI formats where the UE monitors the PDCCH accordingly in a search space. The DCI formats may include the DCI format used for scheduling of the PUSCH and a DCI format used for scheduling of a physical downlink shared channel (PDSCH). The RRC message may be a dedicated RRC message.

A base station apparatus that communicates with a user equipment (UE) on one or more downlink bandwidth parts (DL BWPs) in a serving cell is described. Transmitting circuitry is configured to transmit a radio resource control (RRC) message comprising first information used for configuring a physical downlink control channel (PDCCH) monitoring periodicity, the first information being used for the UE to monitor a PDCCH. The transmitting circuitry is also configured to transmit a RRC message comprising second information used for configuring more than one offset values. The transmitting circuitry is configured to transmit on the PDCCH, a downlink control information (DCI) format comprising third information and fourth information, the third information triggering an aperiodic channel state information (CSI) report, fourth information being used for indicating one offset value from the more than one offset values, the DCI format being used for scheduling of a physical uplink shared channel (PUSCH). Receiving circuitry is also configured to receive in a slot, based on the transmission of the DCI comprising the third information and the fourth information, an aperiodic CSI reporting on the PUSCH, the slot being given based on the fourth information. The first information is configured for each of one or more search spaces, the one or more search spaces being configured for each of the one or more DL BWPs in the serving cell. The second information is configured for the serving cell.

The transmitting circuitry may be configured to transmit a RRC message comprising fifth information use configuring DCI formats where the UE monitors the PDCCH accordingly in a search space. The DCI formats may include the DCI format used for scheduling of the PUSCH and a DCI format used for scheduling of a physical downlink shared channel (PDSCH). The RRC message may be a dedicated RRC message.

A communication method of a user equipment (UE) that communicates with a base station apparatus on one or more downlink bandwidth parts (DL BWPs) in a serving cell is described. The method includes receiving a radio resource control (RRC) message comprising first information used for configuring a physical downlink control channel (PDCCH) monitoring periodicity. The method also includes receiving a RRC message comprising second information used for configuring more than one offset values. The method also includes monitoring a PDCCH based on the first information. The method also includes receiving on the PDCCH, a downlink control information (DCI) format comprising third information and fourth information, the third information triggering an aperiodic channel state information (CSI) report, fourth information being used for indicating one offset value from the more than one offset values, the DCI format being used for scheduling of a physical uplink shared channel (PUSCH). The method also includes performing in a slot, based on a detection of the DCI comprising the third information and the fourth information, an aperiodic CSI reporting on the PUSCH, the slot being determined based on the fourth information. The first information is configured for each of one or more search spaces, the one or more search spaces being configured for each of the one or more DL BWPs in the serving cell. The second information is configured for the serving cell.

A communication method of a base station apparatus that communicates with a user equipment (UE) on one or more downlink bandwidth parts (DL BWPs) in a serving cell is described. The method includes transmitting a radio resource control (RRC) message comprising first information used for configuring a physical downlink control channel (PDCCH) monitoring periodicity, the first information being used for the UE to monitor a PDCCH. The method also includes transmitting a RRC message comprising second information used for configuring more than one offset values. The method also includes transmitting on the PDCCH, a downlink control information (DCI) format comprising third information and fourth information, the third information triggering an aperiodic channel state information (CSI) report, fourth information being used for indicating one offset value from the more than one offset values, the DCI format being used for scheduling of a physical uplink shared channel (PUSCH). The method also includes receiving in a slot, based on the transmission of the DCI comprising the third information and the fourth information, an aperiodic CSI reporting on the PUSCH, the slot being given based on the fourth information. The first information is configured for each of one or more search spaces, the one or more search spaces being configured for each of the one or more DL BWPs in the serving cell. The second information is configured for the serving cell.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra Reliable and Low Latency Communication) transmission, and eMTC (massive Machine Type Communication) transmission. Also, in NR, one or more bandwidth parts (BWPs) may be specified (e.g., configured) for a serving cell. A user equipment (UE) may receive a downlink signal(s) in the BWP(s) of the serving cell. Also, the UE may transmit an uplink signal(s) in the BWP(s) of the serving cell.

In order for the services to use the time, frequency, and/or space resources efficiently, it would be useful to be able to efficiently control downlink and/or uplink transmissions. Therefore, a procedure for efficient control of downlink and/or uplink transmissions should be designed. However, the detailed design of a procedure for downlink and/or uplink transmissions has not been studied yet.

In some approaches, a UE may receive a radio resource control (RRC) message including information used for configuring a value of a timer associated with a bandwidth part (BWP). Also, the UE may perform, based on the detection of the Downlink Control Information (DCI) format for the BWP, the reception on a physical downlink shared channel (PDSCH) in the BWP. Here, in a case that the DCI format for the BWP is detected and the value of the timer associated with the BWP is expired before the reception on the PDSCH, the value of the timer associated with the BWP is extended.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for downlink and/or uplink (re)transmissions may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n. In some implementations, the term "base station," "eNB," and/or "gNB" may refer to and/or may be replaced by the term "Transmission Reception Point (TRP)." For example, the gNB 160 described in connection with FIG. 1 may be a TRP in some implementations.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (Physical Uplink Shared Channel)) and/or a physical control channel (e.g., PUCCH (Physical Uplink Control Channel)), etc. The one or more gNBs 160 may also transmit information or data to the one or more UEs 102 using one or more downlink channels 119, for instance. Examples of downlink channels 119 physical shared channel (e.g., PDSCH (Physical Downlink Shared Channel) and/or a physical control channel (PDCCH (Physical Downlink Control Channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE scheduling module 126.

The UE scheduling module 126 may perform downlink reception(s) and uplink transmission(s). The downlink reception(s) include reception of data, reception of downlink control information, and/or reception of downlink reference signals. Also, the uplink transmissions include transmission of data, transmission of uplink control information, and/or transmission of uplink reference signals.

In a radio communication system, physical channels (uplink physical channels and/or downlink physical channels) may be defined. The physical channels (uplink physical channels and/or downlink physical channels) may be used for transmitting information that is delivered from a higher layer.

For example, in uplink, a PRACH (Physical Random Access Channel) may be defined. For instance, the PRACH may be used for a random access preamble (e.g., a message 1 (Msg.1)). In some approaches, the PRACH may be used for an initial access connection establishment procedure, a handover procedure, a connection re-establishment, a timing adjustment (e.g., a synchronization for an uplink transmission) and/or for requesting an uplink shared channel (UL-SCH) resource (e.g., the uplink PSCH (e.g., PUSCH) resource).

In another example, a PCCH (Physical Control Channel) may be defined. The PCCH may be used to transmit control information. In uplink, PCCH (e.g., Physical Uplink Control Channel (PUCCH)) is used for transmitting Uplink Control Information (UCI). The UCI may include Hybrid Automatic Repeat Request (HARQ-ACK), channel state information (CSI) and/or a scheduling request (SR). The HARQ-ACK is used for indicating a positive acknowledgement (ACK) or a negative acknowledgment (NACK) for downlink data (e.g., Transport block(s), Medium Access Control Protocol Data Unit (MAC PDU) and/or Downlink Shared Channel (DL-SCH)). The CSI is used for indicating state of downlink channel. Here, the CSI reporting may be periodic and/or aperiodic. Also, the SR is used for requesting resources of uplink data (e.g., Transport block(s), MAC PDU and/or Uplink Shared Channel (UL-SCH)).

Here, the DL-SCH and/or the UL-SCH may be a transport channel that is used in the MAC layer. Also, a transport block (TB(s)) and/or a MAC PDU may be defined as a unit(s) of the transport channel used in the MAC layer. For example, control, management, and/or process of HARQ may be performed, in the MAC layer, per the transport block. The transport block may be defined as a unit of data delivered from the MAC layer to the physical layer. The MAC layer may deliver the transport block to the physical layer (i.e., the MAC layer delivers the data as the transport block to the physical layer). In the physical layer, the transport block may be mapped to one or more codewords.

In downlink, the PCCH (e.g., Physical Downlink Control Channel (PDCCH)) may be used for transmitting downlink control information (DCI). Here, more than one DCI format may be defined (e.g., configured) for DCI transmission on the PCCH. Namely, fields may be defined in the DCI format, and the fields are mapped to the information bits (e.g., DCI bits).

For example, a DCI format 1, a DCI format 1A, a DCI format 2, and/or a DCI format 2A that are used for scheduling of downlink physical shared channel(s) in a cell may be defined as the DCI format for the downlink. Here, the DCI format 1, the DCI format 1A, the DCI format 2, and/or the DCI format 2A described herein may be assumed to be included in a DCI format A in some implementations for the sake of simplifying description. Also, a DCI format X and/or a DCI format Y that are used for scheduling of downlink physical channel(s) in a cell may be defined as the DCI format (e.g., a fallback DCI format) for the downlink. Here, the DCI format X and/or the DCI format Y described herein may be assumed to be included in a DCI format B in some implementations for the sake of simplifying descriptions. Also, DCI format Z and/or a DCI format K that are used for activating, deactivating, and/or switching a serving cell(s) (e.g., one or more secondary cell(s), one or more downlink secondary cells, and/or one or more secondary downlink component carriers) and/or a bandwidth part(s) (e.g., one or more BWP(s), one or more DL BWP(s)) may be defined as the DCI format for the downlink. Here, the DCI format Z and/or the DCI format K described herein may be assumed to be included in a DCI format C in some implementations for the sake of simplifying descriptions.

Also, a DCI format 0, and/or a DCI format 4 that are used for scheduling of uplink physical shared channel(s) in a cell may be defined as the DCI format for the uplink. Here, the DCI format 0, and/or the DCI format 4 described herein may be assumed to be included in a DCI format D in some implementations for the sake of simplifying description. Also, a DCI format L and/or a DCI format M that are used for scheduling of uplink physical channel(s) in a cell may be defined as the DCI format (e.g., a fallback DCI format) for the uplink. Here, the DCI format L and/or the DCI format M described herein may be assumed to be included in a DCI format E in some implementations for the sake of simplifying descriptions. Also, a DCI format O and/or a DCI format P that are used for activating, deactivating, and/or switching a serving cell(s) (e.g., one or more secondary cell(s), one or more uplink secondary cells, and/or one or more secondary uplink component carriers) and/or a bandwidth part(s) (e.g., one or more BWP(s), one or more UL BWP(s)) may be defined as the DCI format for the uplink. Here, the DCI format O and/or the DCI format P described herein may be assumed to be included in a DCI format F in some implementations for the sake of simplifying descriptions.

Here, as described above, a RNTI(s) assigned (e.g., by the gNB 160) to the UE 102 may be used for transmission of DCI (e.g., the DCI format(s), DL control channel(s) (e.g., the PDCCH(s)). Namely, CRC (Cyclic Redundancy Check) parity bits (also referred to simply as CRC), which are generated based on DCI, are attached to DCI, and, after attachment, the CRC parity bits are scrambled by the RNTI(s). The UE 102 may attempt to decode (e.g., blind decoding, monitor, detect) DCI to which the CRC parity bits scrambled by the RNTI(s) are attached. Namely, the UE 102 detects DL control channel (e.g., the PDCCH, the DCI, the DCI format(s)) based on the blind decoding. That is, the UE 102 may decode the DL control channel(s) with the CRC scrambled by the RNTI(s). In other words, the UE 102 may monitor the DL control channel(s) with the RNTI(s). Also, as described below, the UE 102 may detect the DCI format(s) in the USS (i.e., the CORESET of a USS (i.e., a UE-specific search space)) and/or a CSS (i.e., the CORESET of a CSS (i.e., a common search space, a UE-common search space)). Here, the UE 102 may detect one or more DCI format(s) in only the USS (i.e., only the CORESET of the USS. Also, the UE 102 may detect one or more DCI format(s) in only the CSS. Namely, the UE 102 may detect the DCI format(s) with the RNTI(s).

Here, the RNTI(s) may include C-RNTI (Cell-RNTI, a first C-RNTI), SPS C-RNTI (Semi-Persistent Scheduling C-RNTI, a second C-RNTI), GF C-RNTI (Grant Free C-RNTI), C-RNTI for the fallback DCI format(s) (e.g., a third C-RNTI for the DCI format B and/or the DCI format E), C-RNTI for the activating/deactivating/switching DCI format(s) (a fourth C-RNTI for the DCI format C and/or the DCI format F), SI-RNTI (System Information RNTI), P-RNTI (Paging RNTI), RA-RNTI (Random Access-RNTI), and/or Temporary C-RNTI.

For example, the C-RNTI may be a unique identification used for identifying a RRC connection and/or scheduling. Also, the SPS C-RNTI may be a unique identification used for semi-persistent scheduling. Also, the GF C-RNTI may be a unique identification used for a grant free scheduling. Also, the C-RNTI for the fallback DCI format(s) may be a unique identification used for scheduling by the fallback DCI format(s). Also, the C-RNTI for the activating/deactivating/ switching DCI format(s) may be a unique identification used for scheduling by the fallback DCI format(s). Also, the SI-RNTI may be used for identifying SI (i.e., SI message) mapped on the BCCH and dynamically carried on DL-SCH. Also, the SI-RNTI may be used for broadcasting of SI. Also, the P-RNTI may be used for transmission of paging and/or SI change notification. Also, the RA-RNTI may be an identification used for the random access procedure. Also, the Temporary C-RNTI may be used for the random access procedure.

Also, for example, PSCH may be defined. For example, in a case that the downlink PSCH resource (e.g., the PDSCH, the PDSCH resource) is scheduled by using the DCI format(s), the UE 102 may receive the downlink data, on the scheduled downlink PSCH resource (e.g., the PDSCH, the PDSCH resource). Also, in a case that the uplink PSCH resource (e.g., the PUSCH, the PUSCH resource) is scheduled by using the DCI format(s), the UE 102 transmits the uplink data, on the scheduled uplink PSCH resource (e.g., the PUSCH, the PUSCH resource). Namely, the downlink PSCH may be used to transmit the downlink data (i.e., DL-SCH, a downlink transport block(s)). And, the uplink PSCH may be used to transmit the uplink data (i.e., UL-SCH, an uplink transport block(s)).

Furthermore, the downlink PSCH (e.g., the PDSCH) and/or the uplink PSCH (e.g., the PUSCH) may be used to transmit information of a higher layer (e.g., a radio resource control (RRC)) layer, and/or a MAC layer). For example, the downlink PSCH (i.e., from the gNB 160 to the UE 102) and/or the uplink PSCH (i.e., from the UE 102 to the gNB 160) may be used to transmit a RRC message (a RRC signal). Also, the downlink PSCH (i.e., from the gNB 160 to the UE 102) and/or the uplink PSCH (i.e., from the UE 102 to the gNB 160) may be used to transmit a MAC control element (a MAC CE). Here, the RRC message that is transmitted from the gNB 160 in downlink may be common to multiple UEs 102 within a cell (referred as a common RRC message). Also, the RRC message that is transmitted from the gNB 160 may be dedicated to a certain UE 102 (referred as a dedicated RRC message). The RRC message and/or the MAC CE are also referred to as a higher layer signal.

In some approaches, the downlink PSCH (e.g., the PDSCH) may be used for transmitting (e.g., notifying, specifying, identifying, etc.) a random access response. For example, the downlink PSCH (e.g., the PDSCH) may be scheduled by using the downlink PCH (e.g., the PDCCH) with RA-RNTI (random access RNTI (radio network temporary identifier)). For instance, the random access response grant may be used for scheduling of the uplink PSCH (e.g., the PUSCH, a Message 3 in a random access procedure (e.g., a contention based random access procedure)). The random access response grant may be delivered from the higher layer (e.g., the MAC layer) to the physical layer.

In some approaches, a PBCH (physical broadcast channel, (e.g., primary PBCH)) may be defined. For example, the PBCH may be used for broadcasting the MIB (master information block). For instance, the MIB may be used by multiple UEs 102 and may include system information transmitted on the BCH (broadcast channel). Also, the MIB may include information (e.g., an information block) for configuring a secondary PBCH. Furthermore, the MIB may include information (e.g., an information block) for configuring the downlink PSCH (e.g., PDSCH). For example, the PBCH (e.g., MIB) may be used for carrying, at least, information indicating a SFN (system frame number).

Here, the system information may be divided into the MIB and a number of SIB(s) (system information block(s)). The MIB may include a limited number of most essential and/or most frequently transmitted information (e.g., parameter(s)) that are needed to acquire other information from the cell. Namely, the PBCH (e.g., MIB) may include minimum system information. Also, the SIB(s) may be carried in a system information message. For example, the SIB(s) may be transmitted on the secondary PBCH and/or the downlink PSCH (e.g., the PDSCH). The SIB(s) (e.g., System Information Block Type 2) may include remaining minimum system information (i.e., RMSI). For example, the SIB(s) (e.g., System Information Block Type 2) may contain radio resource configuration information that is common for multiple UEs 102.

In some approaches, the SIB(s) may contain information for a random access channel configuration (e.g., a random access configuration for a preamble format) that is used for a random access procedure (e.g., a random access preamble transmission (Msg.1 transmission)). For example, the information for the random access configuration may include the preamble format, the SFN, a subframe number (e.g., a subframe number, a slot number and/or a symbol number). Also, a part of the information for the random access configuration may be included in the MIB (e.g., PBCH).

In some approaches, in downlink, a SS (Synchronization Signal) may be defined. The SS may be used for synchronizing downlink time-frequency (a time domain and/or a frequency domain). The SS may include a PSS (Primary Synchronization Signal). Additionally or alternatively, the SS may include a SSS (Secondary Synchronization Signal). Additionally or alternatively, the SS may include a TSS (Tertiary Synchronization Signal). For example, the PSS, the SSS, the TSS and/or the PBCH may be used for identifying a physical layer cell identity. Additionally or alternatively, the PSS, the SSS, the TSS and/or the PBCH may be used for identifying an identity for one or more beams, one or more TRPs and/or one or more antenna ports. Additionally or alternatively, the PSS, the SSS, TSS and/or the PBCH may be used for identifying an OFDM symbol index, a slot index in a radio frame and/or a radio frame number.

In the radio communication for uplink, UL RS(s) may be used as uplink physical signal(s). The uplink physical signal may not be used to transmit information that is provided from the higher layer, but is used by a physical layer. For example, the UL RS(s) may include the demodulation reference signal(s), the UE-specific reference signal(s), the sounding reference signal(s) (the SRS(s)) and/or the beam-specific reference signal(s). The demodulation reference signal(s) may include the demodulation reference signal(s) associated with transmission of the uplink physical channel (e.g., the PUSCH and/or the PUCCH).

Also, the UE-specific reference signal(s) may include reference signal(s) associated with transmission of uplink physical channel (e.g., the PUSCH and/or the PUCCH). For example, the demodulation reference signal(s) and/or the UE-specific reference signal(s) may be a valid reference for demodulation of uplink physical channel only if the uplink physical channel transmission is associated with the corresponding antenna port. The gNB 160 may use the demodulation reference signal(s) and/or the UE-specific reference signal(s) to perform (re)configuration of the uplink physical channels. The sounding reference signal may be used to measure an uplink channel state.

Also, in the radio communication for downlink, DL RS(s) may be used as downlink physical signal(s). The downlink physical signal may not be used to transmit information that is provided from the higher layer, but is used by a physical layer. For example, the DL RS(s) may include the cell-specific reference signal(s), the UE-specific reference signal(s), the demodulation reference signal(s), and/or the channel state information reference signal(s) (the CSI-RS(s)). The UE-specific reference signal may include the UE-specific reference signal(s) associated with transmission of the downlink physical channel (e.g., the PDSCH and/or the PDCCH). Also, the demodulation reference signal(s) may include the demodulation reference signal(s) associated with transmission of the downlink physical channel (e.g., the PDSCH and/or the PDCCH). Also, the CSI-RS may include Non-zero power Channel State Information-Reference signal(s) (NZP CSI-RS), and/or Zero power Channel State Information-Reference signal (ZP CSI-RS).

Here, the downlink physical channel(s) and/or the downlink physical signal(s) described herein may be assumed to be included in a downlink signal (i.e., a DL signal(s)) in some implementations for the sake of simple descriptions. Also, the uplink physical channel(s) and/or the uplink physical signal(s) described herein may be assumed to be included in an uplink signal (i.e. an UL signal(s)) in some implementations for the sake of simple descriptions.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB opera- tions module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB scheduling module 194. The gNB scheduling module 194 may perform scheduling of downlink and/or uplink transmissions as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 shows examples of multiple numerologies. As shown in FIG. 2, multiple numerologies (i.e., multiple subcarrier spacing) may be supported. For example, $\mu$ (e.g., a subcarrier space configuration) and a cyclic prefix (e.g., the $\mu$ and the cyclic prefix for a carrier bandwidth part) may be configured by higher layer parameters (i.e., a RRC message) for the downlink and/or the uplink. Here, 15 kHz may be a reference numerology. For example, an RE of the reference numerology may be defined with a subcarrier spacing of 15 kHz in a frequency domain and 2048 Ts+CP length (e.g. 160 Ts or 144 Ts) in a time domain, where Ts denotes a baseband sampling time unit defined as 1/(15000*2048) seconds.

Also, a number of OFDM symbol(s) per slot $$(N_{symb}^{slot})$$

may be determined based on the $\mu$ (e.g., the subcarrier space configuration). Here, for example, a slot configuration 0 (i.e., the number of OFDM symbols per slot may be 14) and/or a slot configuration (i.e., the number of OFDM symbols per slot may be 7) may be defined.

Figure 3:
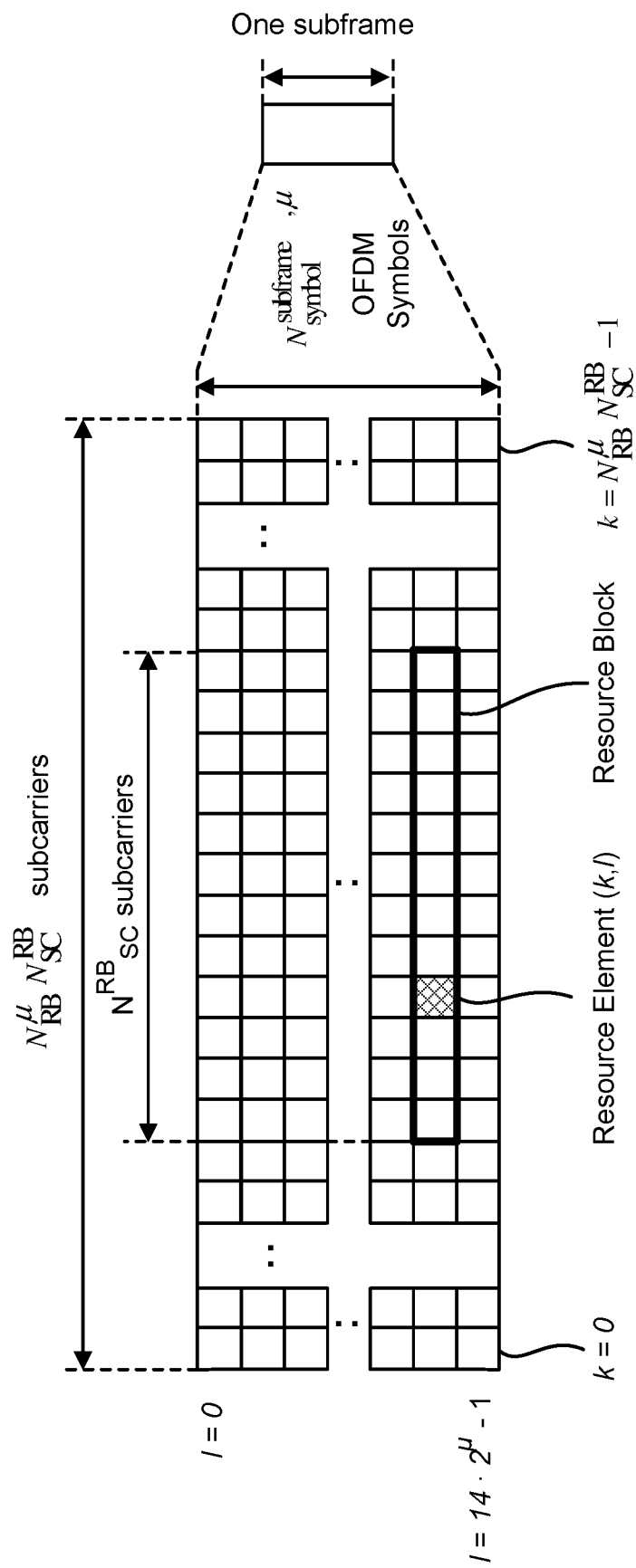
FIG. 3 is a diagram illustrating one example of a resource grid and resource block for the downlink and/or the uplink.

FIG. 3 is a diagram illustrating one example of a resource grid and resource block (e.g., for the downlink and/or the uplink). The resource grid illustrated in FIG. 3 may be utilized in some implementations of the systems and methods disclosed herein.

In FIG. 3, one subframe may include $N_{symbol}^{subframe,\mu}$ symbols. Also, a resource block may include a number of resource elements (RE). Here, in the downlink, the OFDM access scheme with cyclic prefix (CP) may be employed, which may be also referred to as CP-OFDM. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair may include two downlink RBs that are continuous in the time domain. And, the downlink RB may include twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l), where k and l are indices in the frequency and time domains, respectively.

Also, in the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). An uplink radio frame may include multiple pairs of uplink resource blocks. The uplink RB pair is a unit for assigning uplink radio resources, defined by a predetermined bandwidth (RB bandwidth) and a time slot. The uplink RB pair may include two uplink RBs that are continuous in the time domain. The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a resource element (RE) and is uniquely identified by the index pair (k,l) in a slot, where k and l are indices in the frequency and time domains respectively.

Each element in the resource grid (e.g., antenna port p) and the subcarrier configuration $\mu$ is called a resource element and is uniquely identified by the index pair (k,l) where $k=0, \ldots, N_{RB}^{\mu}N_{SC}^{RB}-1$ the in the frequency domain and l refers to the symbol position in the time domain. The resource element (k,l) on the antenna port p and the sub-carrier spacing configuration $\mu$ is denoted $(k,l)_{p,\mu}$. The physical resource block is defined as $N_{SC}^{RB}=12$ consecutive subcarriers in the frequency domain. The physical resource blocks are numbered from 0 to $N_{RB}^{\mu}-1$ in the frequency domain. The relation between the physical resource block number $n_{PRB}$ in the frequency domain and the resource element (k,l) is given by $$n_{PRB} = \left\lfloor \frac{k}{N_{SC}^{RB}} \right\rfloor.$$

Figure 4:
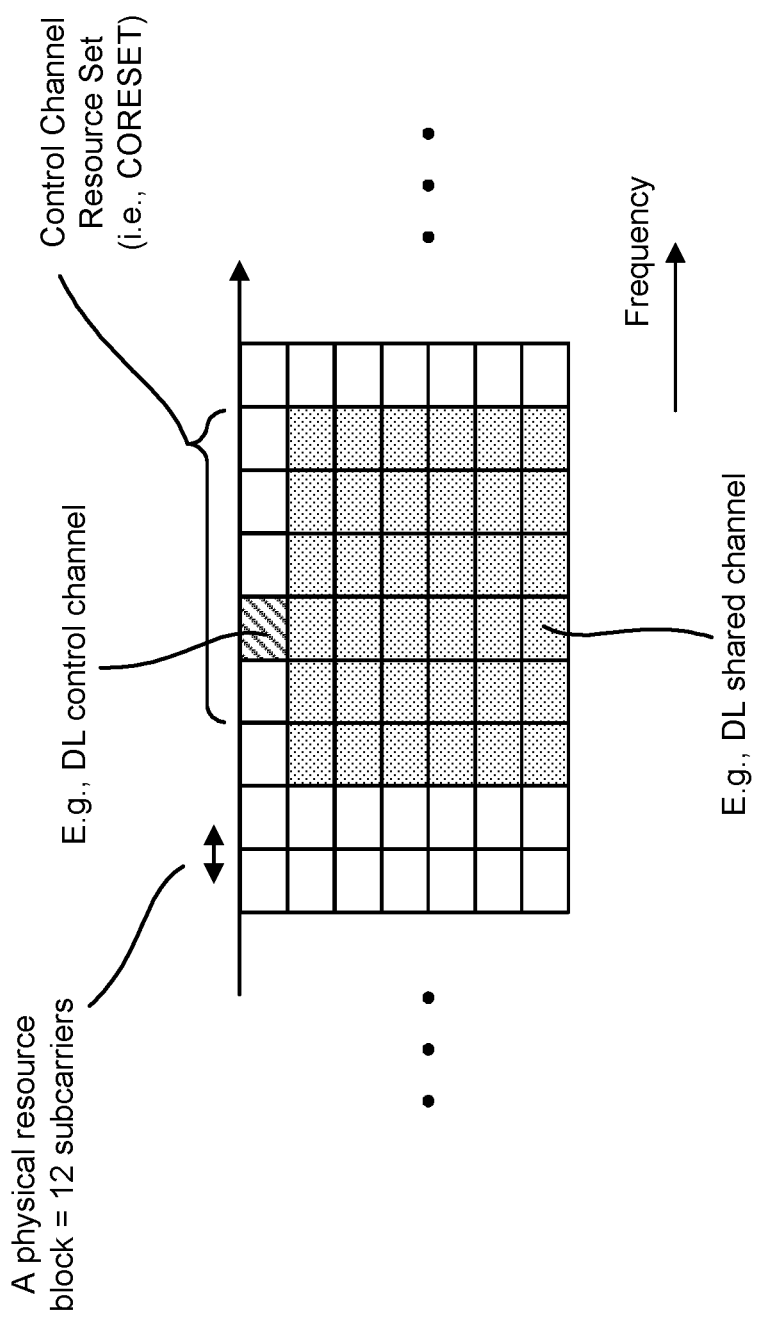
FIG. 4 shows examples of resource regions.

FIG. 4 shows examples of resource regions (e.g., resource region of the downlink). One or more sets of PRB(s) (e.g., a control resource set (e.g., CORESET)) may be configured for DL control channel monitoring (e.g., the PDCCH monitoring). For example, the control resource set (e.g., the CORESET) is, in the frequency domain and/or the time domain, a set of PRBs within which the UE 102 attempts to decode the DCI (e.g., the DCI format(s), the PDCCH(s)), where the PRBs may or may not be frequency contiguous and/or time contiguous, a UE 102 may be configured with one or more control resource sets (i.e., the CORESETs) and one DCI message may be mapped within one control resource set. In the frequency-domain, a PRB is the resource unit size (which may or may not include DM-RS) for the DL control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

The UE 102 may monitor a set of candidates of the DL control channel(s) in the control resource set (i.e., the CORESET). Here, the candidates of DL control channel (s) may be candidates for which the DL control channel(s) may possibly be mapped, assigned, and/or transmitted. For example, a candidate of the DL control channel(s) is composed of one or more control channel elements (CCEs). Here, the term "monitor" means that the UE 102 attempts to decode each DL control channel(s) in the set of candidates of the DL control channel(s) in accordance with all the DCI format(s) to be monitored.

The set of candidates of the DL control channel(s) (e.g., the CORESET) which the UE 102 monitors may be also referred to as a search space (e.g., DL control channel set etc.). That is, the search space is a set of resource (e.g., CORESET) that may possibly be used for transmission of the DL control channel(s). The UE 102 may monitor a set of candidates of the DL control channel(s) in the control resource set (i.e., the CORESET) according to a search space where monitoring implies attempting to detect each DL control channel(s) candidate in the control resource set (i.e., the CORESET) according to the monitored DCI formats. Namely, the control resource set (i.e., the CORESET) may be used for scheduling of the PDSCH. Also, the control resource set may be used for scheduling of the PUSCH.

Here, the common search space (CSS, the UE-common search space) and/or a user equipment-specific search space (USS, the UE-specific search space) are set (or defined, configured) in a region(s) of DL control channel(s) (e.g., the DL control channel monitoring regions, CORESET). For example, the CSS may be used for transmission of DCI to a plurality of the UEs 102. That is, the CSS may be defined by a resource common to a plurality of the UEs 102. For example, the CSS is composed of CCEs having numbers that are predetermined between the gNB 160 and the UE 102. For example, the CSS is composed of CCEs having indices 0 to 15. Also, the gNB 160 may configure, (by using the PBCH (e.g., the MIB), the PDSCH (e.g., the SIB type 2), and/or the dedicated RRC message), the CSS (e.g., the region of the CSS, the control resource set of the CSS). Also, the gNB 160 may transmit, in the CSS, DCI format(s) to a plurality of the UEs 102. The sets of candidates of DL control channel(s) that the UE 102 monitors may be defined in terms of DL control channel(s) CSS. A DL control channel(s) CSS at CCE aggregation level may be defined by the set of candidates of the DL control channel(s).

Here, the CSS may be used for transmission of DCI to a specific UE 102. That is, the gNB 160 may transmit, in the CSS, DCI format(s) intended for a plurality of the UEs 102 and/or DCI format(s) intended for a specific UE 102.

The USS may be used for transmission of DCI to a specific UE 102. That is, the USS is defined by a resource dedicated to a certain UE 102. The USS may be defined independently for each UE 102. For example, the USS may be composed of CCEs having numbers that are determined based on a Radio Network Temporary Identifier (RNTI) (e.g., the C-RNTI), a slot number in a radio frame, an aggregation level, and/or the like. The RNTI(s) may be assigned by the gNB 160. Namely, each of the USSs corresponding to each of the RNTI(s) described below may be defined. Also, for example, the gNB 160 may configure (by using the PBCH (e.g., the MIB), the PDSCH (e.g., the SIB type 2), and/or the dedicated RRC message), the USS (e.g., the region of the USS, the control resource set of the USS). Also, the gNB 160 may transmit, in the USS, DCI format(s) intended for a specific UE 102. The sets of candidates of DL control channel(s) that the UE 102 monitors may be defined in terms of DL control channel(s) USS. A DL control channel(s) USS at CCE aggregation level may be defined by the set of candidates of the DL control channel(s).

Namely, in a CORESET (e.g., in a given CORESET), at least, two types of search space (i.e., the CSS and the USS (e.g., a set of the CSS and a set of USS)) may be configured to the UE 102. For example, the gNB 160 may transmit, (by using the PBCH (e.g., the MIB), the PDSCH (e.g., the SIB type 2), and/or the dedicated RRC message), information used for configuring one or more control resource sets (i.e., one or more CORESETs) of the CSS. Also, the gNB 160 may transmit, (by using the PBCH (e.g., the MIB), the PDSCH (e.g., the SIB type 2), and/or the dedicated RRC message), information used for configuring one or more control resource sets (i.e., one or more CORESETs) of the USS. Also, for example, the gNB 160 may transmit information used for configuring the occasion(s) of DL control channel(s) monitoring (the control resource set monitoring). Here, the DL control channel(s) may be the PCCH(s) (e.g., the PDCCH(s)). Also, the occasion(s) may correspond to a subframe, a slot, a sub-slot, and/or a symbol. Namely, the occasion(s) may correspond to a position(s) (e.g., a timing, a time resource, a time location, a time index, an index of the subframe(s), the slot(s), the sub-slot(s), and/or the symbol(s)). Also, for example, the occasion(s) may correspond to a periodicity (e.g., a periodicity of a subframe, a slot, a sub-slot, and/or a symbol) for which the UE 102 monitors the PDCCH. Namely, the gNB 160 may configure, to the UE 102, a periodicity for monitoring of PDCCH (i.e., PDCCH monitoring periodicity, PDCCH monitoring occasion(s)).

For example, the gNB 160 may transmit, e.g., by using the PBCH (e.g., the MIB), the PDSCH (e.g., the SIB type 2 (i.e., RMSI)), and/or the dedicated RRC message, information used for configuring the occasion(s) (i.e., the PDCCH monitoring periodicity, the PDCCH monitoring occasion(s)). And, the UE 102 may monitor the PDCCH based on the information used for configuring the occasion(s).

Here, the information used for configuring the occasion(s) may be configured per serving cell. Namely, the information used for configuring the occasion(s) may be configured for each of the serving cells (e.g., each of the primary cell and the one or more secondary cells). Also, the information used for configuring the occasion(s) may be configured per BWP (e.g., per BWP in a serving cell). Namely, the information used for configuring the occasion(s) may be configured for each of BWPs in a serving cell. Also, the information used for configuring the occasion(s) may be configured per DCI format. For example, the information used for configuring the occasion(s) may be configured for each of the DCI formats (e.g., the DCI format A, the DCI format B, the DCI format C, the DCI format E, and/or the DCI format E). Here, for example, the gNB 160 may transmit, e.g., by using the PBCH (e.g., the MIB) and/or the PDSCH (e.g., the SIB type 2 (i.e., the RMSI)), the information used for configuring the occasions(s) for the DCI format B and/or the DCI format E. Namely, the PBCH (e.g., the MIB) and/or the PDSCH (e.g., the SIB type 2 (i.e., the RMSI)) may be used for configuring the occasion(s) for the DCI format B and/or the DCI format E. Also, the gNB 160 may transmit, e.g., by using the dedicated RRC message, the information used for configuring the occasions(s) for the DCI format A, the DCI format C, the DCI format D, and/or the DCI format F. Namely, the dedicated RRC message may be used for configuring the occasion(s) for the DCI format A, the DCI format C, the DCI format D, and/or the DCI format F. Also, the information used for configuring the occasion(s) may be configured per search space (e.g., the CSS and/or the USS). For example, the information used for configuring the occasion(s) may be configured for the each types of the search space. For example, in a CORESET (e.g., in a given CORESET), each of the occasions (e.g., different periodicities) may be configured (e.g., independently configured) for the each types of the search space (e.g., the CSS and/or the USS). Also, the gNB 160 may configure the DCI format(s) (e.g., the DCI format A, the DCI format B, the DCI format C, the DCI format D, the DCI format E, and/or the DCI format F) in which the UE 102 monitors in the each types of search space (e.g., the CSS and/or the USS). For example, each of the occasions (e.g., different periodicities) may be configured (e.g., independently configured) for the each of the DCI format (s) (e.g., the DCI format A, the DCI format B, the DCI format C, the DCI format D, the DCI format E, and/or the DCI format F). Also, the information used for configuring the occasion(s) may be configured per RNTI. For example, the information used for configuring the occasion may be configured for each RNTI (e.g., C-RNTI (a first C-RNTI), SPS C-RNTI (a second C-RNTI), C-RNTI for the fallback DCI format(s), GF C-RNTI, SI-RNTI, P-RNTI, RA-RNTI, and/or Temporary C-RNTI). For example, each of the occasions may be configured (e.g., independently configured) for the each of the RNTIs (e.g., C-RNTI (a first C-RNTI), SPS C-RNTI (a second C-RNTI), C-RNTI for the fallback DCI format(s), GF C-RNTI, SI-RNTI, P-RNTI, RA-RNTI, and/or Temporary C-RNTI). Namely, the information used for configuring the occasion(s) may be configured for the each of the serving cells, the each of the BWPs, the each of the DCI formats, the each of the search spaces (e.g., the CSS and/or the USS), and/or the each of the RNTIs.

Here, the search space (e.g., the CSS and/or the USS (e.g., a set of the CSS and/or a set of USS)) may be defined based on the number of PDCCH candidates for each aggregation level (e.g., 1, 2, 4, 8, 16), the PDCCH monitoring occasion(s) for the set of the search space(s), and/or each set of search spaces associated with the CORESET. For example, the gNB 160 may configure the number of PDCCH candidates for each aggregation level. Also, the gNB 160 may configure the PDCCH monitoring occasion(s) for the set of the search space(s). Also, the gNB 160 may configure the each set of search spaces associated with the CORESET. Namely, for example, an index of the search space may be defined (e.g., computed) based on the number of PDCCH candidates for each aggregation level (e.g., 1, 2, 4, 8, 16), the PDCCH monitoring occasion(s) for the set of the search space(s), and/or each set of search spaces associated with the CORESET.

As described above, for example, a DCI format 1, a DCI format 1A, a DCI format 2, and/or a DCI format 2A that are used for scheduling of downlink physical shared channel(s) in a cell may be defined as the DCI format for the downlink. For example, the DCI format 1 and/or the DCI format 1A may be used for scheduling of one downlink physical shared channel (e.g., one PDSCH, one PDSCH codeword, transmission of one downlink transport block) in a cell. Also, the DCI format 2 and/or the DCI format 2A may be used for scheduling of one downlink physical shared channel (e.g., one PDSCH, up to two PDSCH codewords, transmission of up to two downlink transport blocks). Here, the DCI format 1, the DCI format 1A, the DCI format 2, and/or the DCI format 2A described herein may be assumed to be included in a DCI format A in some implementations for the sake of simplifying description. As described above, the DCI format A may be used for scheduling of the downlink PSCH (e.g., the PDSCH). Namely, the DCI format A may be a scheduling DCI. Also, the control resource set (i.e., CORESET) of a search space (e.g., the UE-specific search space, the common search space, and/or the PDCCH) in which the DCI format A is monitored may be used to schedule the downlink PSCH (e.g., the PDSCH).

Here, as described below, the DCI format A may be used for activating and/or deactivating a serving cell(s) (e.g., one or more secondary cell(s), one or more downlink secondary cells, and/or one or more secondary downlink component carriers). Also, the DCI format A may be used for activating and/or deactivating a bandwidth part(s) (e.g., one or more BWPs in a serving cell(s), one or more DL BWPs in a serving cell(s)). Also, the C-RNTI (i.e., a first C-RNTI), the SPS C-RNTI (i.e., a second C-RNTI), and/or the GF C-RNTI may be used to transmit the DCI format A. Namely, the UE 102 may decode (detect, monitor) the DCI format A to which CRC parity bits scrambled by the C-RNTI and/or the SPS C-RNTI are attached.

For example, the DCI format A may include resource block assignment information (i.e., resource allocation information, a resource block assignment field(s)). Namely, the DCI format A may include information used for indicating a physical resource block(s) (e.g., an index of a physical resource block(s), a size of the physical resource block(s)) of the PDSCH. Also, the DCI format A may include information used for indicating a modulation and coding scheme (i.e., a MCS information, a MCS field(s)). Also, the DCI format A may include information (i.e., a flag for DCI format(s) differentiation, an identifier) used for identifying a DCI format among multiple DCI formats having the same DCI size (i.e., the same DCI format size). For example, for multiple DCI formats with the same DCI size of a same RNTI, the information (i.e., the flag for DCI format(s) differentiation, the identifier) may be included in respective DCI format (e.g., the DCI format A, a DCI format B described below, a DCI format C described below, a DCI format D described below, a DCI format E described below, and/or a DCI format F described below) to distinguish the multiple DCI formats (i.e., the DCI format A, the DCI format B, the DCI format C, the DCI format D, the DCI format E, and/or the DCI format F). Also, the DCI format A may include information (e.g., a new data indicator) used for indicating whether a transmission is a new transmission or not (e.g., whether a transmission is a new transmission or a retransmission). Also, the DCI format A may include information (i.e., a CSI request, a CSI request field(s)) used for requesting transmission of CSI (i.e., CSI report, aperiodic CSI report (i.e., aperiodic CSI reporting)) on the PUSCH and/or the PUCCH. Also, the DCI format A may include information (e.g., 3-bit information field(s), a carrier indicator and/or a BWP indicator, a carrier and/or BWP indicator, a carrier indicator field(s) and/or a BWP indicator field(s), a carrier and/or BWP indicator field(s)) used for indicating a serving cell (e.g., a carrier) and/or a BWP. Namely, the DCI format A may include information (e.g., 3-bit information field(s) the carrier indicator, the carrier indicator field(s)) used for indicating a serving cell (e.g., a carrier in which the corresponding PDSCH is scheduled). Also, the DCI format A may include information (e.g., 3-bit information field(s), the BWP indicator, the BWP indicator field(s)) used for indicating a BWP (e.g., a BWP in which the corresponding PDSCH is scheduled). Here, for example, in a case that the information (e.g., 3-bit information field(s))

used for indicating the serving cell(s) in which the PDSCH is scheduled is set "0" (e.g., all of 3-bit information fields set to "0"), the information used for indication the serving cell(s) may be used for indicating the primary cell. Also, for example, in a case that the information (e.g., 3-bit information field(s)) used for indicating the BWP(s) in which the PDSCH is scheduled is set "0" (e.g., all of 3-bit information fields set to "0"), the information used for indication the BWP(s) may be used for indicating the initial active BWP (e.g., the initial active DL BWP) and/or the default BWP (e.g., the default DL BWP). Also, the DCI format A may include information (e.g., 3-bit information field(s), the carrier and the BWP indicator) used for indicating a serving cell and a BWP (e.g., a serving cell and a BWP in which the corresponding PDSCH is scheduled). Here, for example, in a case that the information (e.g., 3-bit information field(s)) used for indicating the serving cell(s) in which the PDSCH is scheduled is set "0" (e.g., all of 3-bit information fields set to "0"), the information used for indication the serving cell(s) and the BWP(s) may be used for indicating the primary cell and the initial active DL BWP (or the default DL BWP). Also, the DCI format A may include information (a SRS request, a SRS request field(s)) used for requesting transmission of SRS (i.e., aperiodic SRS transmission). Also, the DCI format A may include information used for indicating a transmission power control (TPC) command for the PCCH (e.g., a TPC command field for the PUCCH).

Also, a DCI format X and/or a DCI format Y that are used for scheduling of downlink physical channel(s) in a cell may be defined as the DCI format (e.g., a fallback DCI format) for the downlink. For example, the DCI format X and/or the DCI format Y may be used for scheduling of one downlink physical shared channel (e.g., one PDSCH, one PDSCH codeword, transmission of one downlink transport block). Here, the DCI format X and/or the DCI format Y described herein may be assumed to be included in a DCI format B in some implementations for the sake of simplifying descriptions. As described above, the DCI format B may be used for scheduling of the downlink PSCH (e.g., the PDSCH). Namely, the DCI format B may be a scheduling DCI. Also, the control resource set (i.e., CORESET) of a search space (e.g., the UE-specific search space, the common search space, and/or the PDCCH) in which the DCI format B is monitored may be used to schedule the downlink PSCH (e.g., the PDSCH).

Here, as described below, the DCI format B may be used for activating and/or deactivating a serving cell(s) (e.g., one or more secondary cells, one or more uplink secondary cells, and/or one or more uplink component carriers). Also, the DCI format B may be used for activating and/or deactivating a bandwidth part(s) (e.g., one or more BWPs in a serving cell(s), one or more DL BWPs in a serving cell(s)). Also, the C-RNTI (i.e., the first C-RNTI), SPS C-RNTI (i.e., the second C-RNTI), and/or the GF C-RNTI may be used to transmit the DCI format B. Namely, the UE 102 may decode (detect, monitor) the DCI format B to which CRC parity bits scrambled by the C-RNTI (i.e., the first C-RNTI), SPS C-RNTI (i.e., the second C-RNTI), and/or the GF C-RNTI are attached. Here, the different C-RNTI (i.e., a third C-RNTI, e.g., C-RNTI for the fallback DCI format) than the C-RNTI (i.e., the first C-RNTI), the SPS C-RNTI (i.e., the second C-RNTI) and the GF C-RNTI may be used to transmit the DCI format B. Namely, the UE 102 may decode (detect, monitor) the DCI format B to which CRC parity bits scrambled by the third C-RNTI are attached.

For example, the DCI format B may include resource block assignment information (i.e., resource allocation information, a resource block assignment field(s)). Namely, the DCI format B may include information used for indicating a physical resource block(s) (e.g., an index of a physical resource block(s), a size of the physical resource block(s)) of the PDSCH. Also, the DCI format B may include information used for indicating a modulation and coding scheme (i.e., a MCS information, a MCS field(s)). Also, the DCI format B may include information (i.e., a flag for DCI format(s) differentiation, an identifier) used for identifying a DCI format among multiple DCI formats having the same DCI size (i.e., the same DCI format size). For example, for multiple DCI formats with the same DCI size of a same RNTI, the information (i.e., the flag for DCI format(s) differentiation, the identifier) may be included in respective DCI format (e.g., the DCI format A, the DCI format B, the DCI format C, the DCI format D, the DCI format E, and/or the DCI format F) to distinguish the multiple DCI formats (i.e., the DCI format A, the DCI format B, the DCI format C, the DCI format D, the DCI format E, and/or the DCI format F). Also, the DCI format B may include information (e.g., a new data indicator) used for indicating whether a transmission is a new transmission or not (e.g., whether a transmission is a new transmission or a retransmission). Also, the DCI format B may include information (i.e., a CSI request, a CSI request field(s)) used for requesting transmission of CSI (i.e., CSI report, aperiodic CSI report (i.e., aperiodic CSI reporting)) on the PUSCH and/or the PUCCH. Also, the DCI format B may include information (e.g., 3-bit information field(s), a carrier indicator and/or a BWP indicator, a carrier and/or BWP indicator, a carrier indicator field(s) and/or BWP indicator field(s), a carrier and/or a BWP indicator field(s)) used for indicating a serving cell (e.g., a carrier) and/or a BWP. Namely, the DCI format B may include information (e.g., 3-bit information field(s), the carrier indicator, the carrier indicator field(s)) used for indicating a serving cell (e.g., a carrier in which the corresponding PDSCH is scheduled). Also, the DCI format B may include information (e.g., 3-bit information field(s), the BWP indicator, the BWP indicator field(s)) used for indicating a BWP (e.g., a BWP in which the corresponding PDSCH is scheduled). Here, for example, in a case that the information (e.g., 3-bit information field(s)) used for indicating the serving cell(s) in which the PDSCH is scheduled is set "0" (e.g., all of 3-bit information fields set to "0"), the information used for indication the serving cell(s) may be used for indicating the primary cell. Also, for example, in a case that the information (e.g., 3-bit information field(s)) used for indicating the BWP(s) in which the PDSCH is scheduled is set "0" (e.g., all of 3-bit information fields set to "0"), the information used for indication the BWP(s) may be used for indicating the initial active BWP (e.g., the initial active DL BWP) and/or the default BWP (e.g., the default DL BWP). Also, the DCI format B may include information (i.e., the carrier and the BWP indicator) used for indicating a serving cell and a BWP (e.g., a serving cell and a BWP in which the corresponding PDSCH is scheduled). Here, for example, in a case that the information (e.g., 3-bit information field(s)) used for indicating the serving cell(s) and the BWP(s) is scheduled is set "0" (e.g., all of 3-bit information fields set to "0"), the information used for indication the serving cell(s) may be used for indicating the primary cell and the initial active DL BWP (or the default DL BWP). Also, the DCI format B may include information (a SRS request, a SRS request field(s)) used for requesting transmission of SRS (i.e., aperiodic SRS transmission). Also, the DCI format B may include information used for indicating a transmission power control (TPC) command for the PCCH (e.g., a TPC command field for the PUCCH).

Here, the DCI format B may not include information (i.e., a carrier indicator and/or a BWP indicator, a carrier and/or BWP indicator, a carrier indicator field(s) and/or BWP indicator field(s), a carrier and/or a BWP indicator field(s)) used for indicating a serving cell (e.g., a carrier) and/or a BWP. Namely, the DCI format B may not include information (i.e., the carrier indicator, the carrier indicator field(s)) used for indicating a serving cell (e.g., a carrier in which the corresponding PDSCH is scheduled). Also, the DCI format B may not include information (i.e., the BWP indicator, the BWP indicator field(s)) used for indicating a BWP (e.g., a BWP in which the corresponding PDSCH is scheduled). Also, the DCI format B may not include information (i.e., the carrier and the BWP indicator) used for indicating a serving cell and a BWP (e.g., a serving cell and a BWP in which the corresponding PDSCH is scheduled).

Also, the DCI format B may be used for scheduling of a smaller size of the PDSCH than a size of the PDSCH scheduled by using the DCI format A. Namely, for example, the DCI format B may be used for scheduling of a narrower bandwidth of the PDSCH than a bandwidth of the PDSCH scheduled by using the DCI format A. For example, a number of allocated PRB(s) (e.g., a total number of allocated PRB(s), a total number of allocated PRB(s) of the PDSCH, $N_{PRB}$) by using the DCI format A may be 100(PRBs), 110(PRBs), 270(PRBs), 273(PRBs), and/or 276(PRBs). Here, 100(PRBs) may correspond to 20 MHz, 110(PRBs) may correspond to 20 MHz, 270(PRBs) may correspond to 50 MHz, 273(PRBs) may correspond to 100 MHz, and/or 276(PRBs) may correspond to 100 MHz. Namely, a maximum number of allocated PRB(s) by using the DCI forma A may be 100(PRBs), 110(PRBs), 270(PRBs), 273(PRBs), and/or 276(PRBs). And, the DCI format A may be used for scheduling of the PDSCH of up to 100(PRBs), 110(PRBs), 270(PRBs), 273(PRBs), and/or 276(PRBs). Also, the number of allocated PRB(s) by using the DCI format B may be 6(PRBs), 24(PRBs), 25(PRBs), 50(PRBs), and/or 52(PRBs). Here, 6(PRBs) may correspond to 1.4 MHz, 25(PRBs) may correspond 5 MHz, 50(PRBs) may correspond to 10 MHz, and/or 52(PRBs) may correspond to 10 MHz. Also, 24(PRBs) may correspond to a bandwidth used for PSS, SSS, and/or PBCH (e.g., SS block(s)). Also, 24(PRBs) may correspond to a bandwidth used for RMSI (e.g., SIB2) and CORESET containing PDCCH scheduling RMSI. Namely, the DCI format B may be used for scheduling of the PDSCH of the bandwidth that corresponds to (e.g., the same as) the bandwidth in which the random access procedure is performed.

Namely, the maximum number of allocated PRB(s) by using the DCI forma B may be 6(PRBs), 24(PRBs), 25(PRBs), 50(PRBs), and/or 52(PRBs). And, the DCI format B may be used for scheduling of the PDSCH of up to 6(PRBs), 24(PRBs), 25(PRBs), 50(PRBs), and/or 52(PRBs). Namely, for example, the larger size (i.e., the larger number) of transport block(s) than a size (i.e., a number) of transport block(s) transmitted on the PDSCH that is scheduled by using the DCI format B may be transmitted on the PUSCH that is scheduled by using the DCI format A. Namely, the smaller size of transport block(s) than a size of transport block(s) transmitted on the PDSCH that is scheduled by using the DCI format A may be transmitted on the PDSCH that is scheduled by using the DCI format B. For example, a first table used for determining the size of the transport block(s) may be defined (e.g., specified) for the DCI format A. Also, a second table (i.e., the second table different than the first table) used for determining the size of the transport block(s) may be defined (e.g., specified) for the DCI format B. And, the maximum size (i.e., the maximum number) of the transport block(s) for the DCI format A (i.e., the maximum size of the transport block(s) transmitted on the PDSCH that is scheduled by using the DCI format A) may be larger than the maximum size (i.e., the maximum number) of the transport block(s) for the DCI format B (i.e., the maximum size of the transport block(s) transmitted on the PUSCH that is scheduled by using the DCI format B).

Here, the number of allocated PRB(s) (i.e., the maximum number of allocated PRB(s)) may depend on each of multiple numerologies (i.e., multiple subcarrier spacing). Namely, for a certain numerology (i.e., a given numerology, a configured numerology), as described above, the number of allocated PRB(s) that is possible to be scheduled by using the DCI format B is smaller than the number of allocated PRB(s) that is possible to be scheduled by using the DCI format A. Also, the number of allocated PRB(s) (i.e., the maximum number of allocated PRB(s)) by using the DCI format B may be determined based on a bandwidth of a default DL BWP (e.g., the number of PRB(s) of the default DL BWP). For example, the gNB 160 may configure, e.g., by using the RRC message, the bandwidth of the default DL BWP (e.g., the number of PRB(s) of the default DL BWP). Also, the number of allocated PRB(s) (i.e., the maximum number of allocated PRB(s)) by using the DCI format B may be determined based on a bandwidth of an active DL BWP (e.g., an initial active DL BWP, the number of PRB(s) of the initial active DL BWP, an activated DL BWP, the number of PRB(s) of the activated DL BWP). For example, the gNB 160 may configure, e.g., by using the PBCH (e.g., MIB), the RMSI (e.g., SIB2), and/or the RRC message, the bandwidth of the active DL BWP (e.g., an initial active DL BWP, the number of PRB(s) of the initial active DL BWP, an activated DL BWP, the number of PRB(s) of the activated DL BWP). Also, the gNB 160 may configure, e.g., by using the PBCH (e.g., MIB), the RMSI (e.g., SIB2), and/or the RRC message, a bandwidth of RMSI CORESET. And, the bandwidth of the active DL BWP (e.g., an initial active DL BWP, the number of PRB(s) of the initial active DL BWP, an activated DL BWP, the number of PRB(s) of the activated DL BWP) may be determined based on (e.g., the same as) the bandwidth of RMSI CORESET. Here, the initial active DL BWP is defined as frequency location and the bandwidth of RMSI CORESET and the numerology of the RMSI (i.e., the RMSI CORESET, e.g., the numerology of PDSCH used for transmitting the RMSI (e.g., SIB2)).

Also, for example, the numerology of the PDSCH that is scheduled by using the DCI format A may be 15 kHz (e.g., a first numerology), 30 kHz (e.g., a second numerology), and/or 60 kHz (e.g., a third numerology). Namely, the DCI format A may be used for scheduling of the PDSCH of multiple numerologies (i.e., the first numerology, the second numerology and/or the third numerology). Also, the numerology of the PDSCH that is scheduled by using the DCI format B may be 15 kHz (e.g., the first numerology), 30 kHz (e.g., the second numerology), and/or 60 kHz (e.g., the third numerology). Namely, the DCI format B may be used for scheduling of the PDSCH of multiple numerologies (i.e., the first numerology, the second numerology and/or the third numerology). Here, for example, the numerology of the PDSCH that is scheduled by using the DCI format B may be only one of 15 kHz (i.e., the first numerology), 30 kHz (i.e., the second numerology), and 60 kHz (i.e., the third numerology). For example, only 15 kHz SCS may be used for PDSCH that is scheduled by using the DCI format B. Here, the numerology used for the PDSCH that is scheduled by using the DCI format B may be specified, in advance, by the specification, and known information between the gNB 160 and the UE 102. Namely, in a case that the DCI format B is received (e.g., detected), the UE 102 may assume 15 kHz SCS (e.g., the first numerology) for the scheduled PDSCH. And, the UE 102 may perform (e.g., decode, detect) the PDSCH reception based on 15 kHz SCS (e.g., based on the assumption of the PDSCH of 15 kHz SCS (e.g., the first numerology), even if 30 kHz SCS (e.g., the second numerology) and/or 60 kHz SCS (e.g., the third numerology) is configured).

Also, the numerology of the PDSCH that is scheduled by using the DCI format B may be determined based on a numerology of the default DL BWP. For example, the gNB 160 may configure, e.g., by using the RRC message, the numerology of the default DL BWP. Also, the numerology of the PDSCH that is scheduled by using the DCI format B may be determined based on a numerology of the active DL BWP (e.g., the initial active DL BWP, the activated DL BWP). For example, the gNB 160 may configure, e.g., by using the RRC message, the numerology of the active DL BWP (e.g., the initial active DL BWP, the activated DL BWP). Also, the gNB 160 may configure, e.g., by using the PBCH (e.g., MIB), the RMSI (e.g., SIB2), and/or the RRC message, the numerology of RMSI CORESET. And, the numerology of the active DL BWP (e.g., the initial active DL BWP, the activated DL BWP) may be determined based on (e.g., the same as) the numerology of RMSI CORESET. Namely, the numerology of the PDSCH that is scheduled by using the DCI format B may be determined based on the numerology of RMSI CORESET. Also, the gNB 160 may configure, e.g., by using the PBCH (e.g., MIB), the RMSI (e.g., SIB2), and/or the RRC message, the numerology for RMSI (e.g., the PDSCH used for transmitting the RMSI), the Msg.2 (e.g., the PDSCH used for transmitting the Msg.2 in a random access procedure), and/or the Msg.4 (e.g., the PDSCH used for transmitting the Msg.4 in the random access procedure). And, the numerology of the active DL BWP (e.g., the initial active DL BWP, the activated DL BWP) may be determined based on (e.g., the same as) the numerology for the RMSI, the Msg.2, and/or the Msg.4. Namely, the numerology of the PDSCH that is scheduled by using the DCI format B may be determined based on the numerology for the RMSI, the Msg.2, and/or the Msg.4.

Also, a DCI format Z and/or a DCI format K that are used for activating, deactivating, and/or switching a serving cell(s) (e.g., one or more secondary cell(s), one or more downlink secondary cells, and/or one or more secondary downlink component carriers) may be defined as the DCI format for the downlink. Here, the DCI format Z and/or the DCI format K may be used for activating, deactivating, and/or switching a BWP(s) (e.g., one or more BWPs in a serving cell(s), one or more DL BWPs in a serving cell(s)). Namely, the DCI format Z and/or the DCI format K that are used for activating, deactivating, and/or switching the serving cell(s) and/or the BWP(s). Here, the DCI format Z and/or the DCI format K described herein may be assumed to be included in a DCI format C in some implementations for the sake of simplifying descriptions. As described above, the DCI format C may be used for activating, deactivating, and/or switching the serving cell(s) and/or the BWP(s). Namely, the DCI format B may be an activating/deactivating/switching DCI. Also, the control resource set (i.e., CORESET) of a search space (e.g., the UE-specific search space, the common search space, and/or the PDCCH) in which the DCI format C is monitored may be used to activate, deactivate, and/or switch the serving cell(s) and/or the BWP(s).

Here, the C-RNTI (i.e., the first C-RNTI), SPS C-RNTI (i.e., the second C-RNTI), and/or the GF C-RNTI may be used to transmit the DCI format C. Namely, the UE 102 may decode (detect, monitor) the DCI format C to which CRC parity bits scrambled by the C-RNTI (i.e., the first C-RNTI), SPS C-RNTI (i.e., the second C-RNTI), and/or the GF C-RNTI are attached. Here, the different C-RNTI (i.e., the fourth C-RNTI, e.g., the C-RNTI for the activating/deactivating/switching DCI format) than the C-RNTI (i.e., the first C-RNTI), the SPS C-RNTI (i.e., the second C-RNTI), the GF C-RNTI and the third C-RNTI may be used to transmit the DCI format C. Namely, the UE 102 may decode (detect, monitor) the DCI format C to which CRC parity bits scrambled by the fourth C-RNTI are attached.

Here, the DCI format C may be identified by (re)using the DCI format A (i.e., the scheduling DCI). For example, the DCI format C may be identified by setting each of one or more fields (i.e., one or more predetermined fields) included in the DCI format A to each of certain values (i.e., one or more predetermined values). For example, by setting each of the resource block assignment field(s), the MCS field(s), the new data indicator field(s), and/or the TPC command for PUCCH field(s) to each of the certain values, the DCI format C may be identified by (re)using the DCI format A. For example, all of (i.e., each of) the resource clock assignment field(s) may be set to "0" or "1" (i.e., a predetermined value(s)). Also, all of (i.e., each of) the MCS field(s) may be set to all of "0" or "1" (i.e., a predetermined value(s)). Also, all of (i.e., each of) the new data indicator field(s) may be set to all of "0" or "1" (i.e., a predetermined value(s)). Also, all of (i.e., each of) the TPC command for PUCCH field(s) may be set to all of "0" or "1" (i.e., a predetermined value(s)). Here, which information field(s) (i.e., the predetermined field(s)) included in the DCI format A is used for identifying the DCI format C may be specified, in advance, by the specification, and known information between the gNB 160 and the UE 102. Also, which value(s) set to the predetermined field(s) for identifying the DCI format C may be specified, in advance, by the specification, and known information between the gNB 160 and the UE 102.

Namely, the DCI format C may be the DCI format A including the predetermined field(s) set to the predetermined value(s). As described above, for example, the DCI format C may be the DCI format A including the resource block assignment field(s) set to "0". And, the DCI format C may include resource block assignment information (i.e., resource allocation information, a resource block assignment field(s)). Also, the DCI format C may include information used for indicating a modulation and coding scheme (i.e., a MCS information, a MCS field(s)). Also, the DCI format C may include information (i.e., a flag for DCI format(s) differentiation, an identifier) used for identifying a DCI format among multiple DCI formats having the same DCI size (i.e., the same DCI format size). Also, the DCI format C may include information (e.g., a new data indicator) used for indicating whether a transmission is a new transmission or not (e.g., whether a transmission is a new transmission or a retransmission). Also, the DCI format C may include information (i.e., a CSI request, a CSI request field(s)) used for requesting transmission of CSI (i.e., CSI report, aperiodic CSI report (i.e., aperiodic CSI reporting)) on the PUSCH and/or the PUCCH. Also, the DCI format C may include information (e.g., 3-bit information field(s), a carrier indicator and/or a BWP indicator, a carrier and/or BWP indicator, a carrier indicator field(s) and/or a BWP indicator field(s), a carrier and/or BWP indicator field(s)) used for indicating a serving cell (e.g., a carrier) and/or a BWP. Namely, the DCI format C may include information (e.g., 3-bit information field(s), the carrier indicator, the carrier indicator field(s)) used for indicating a serving cell (e.g., a carrier in which the corresponding PDSCH is scheduled). Also, the DCI format C may include information (i.e., the BWP indicator, the BWP indicator field(s)) used for indicating a BWP (e.g., 3-bit information field(s), a BWP in which the corresponding PDSCH is scheduled). Here, for example, in a case that the information (e.g., 3-bit information field(s)) used for indicating the serving cell(s) in which the PDSCH is scheduled is set "0" (e.g., all of 3-bit information fields set to "0"), the information used for indication the serving cell(s) may be used for indicating the primary cell. Also, for example, in a case that the information (e.g., 3-bit information field(s)) used for indicating the BWP(s) in which the PDSCH is scheduled is set "0" (e.g., all of 3-bit information fields set to "0"), the information used for indication the BWP(s) may be used for indicating the initial active BWP (e.g., the initial active DL BWP) and/or the default BWP (e.g., the default DL BWP). Also, the DCI format C may include information (e.g., 3-bit information field(s), the carrier and the BWP indicator) used for indicating a serving cell and a BWP (e.g., a serving cell and a BWP in which the corresponding PDSCH is scheduled). Here, for example, in a case that the information (e.g., 3-bit information field(s)) used for indicating the serving cell(s) and the BWP(s) is set "0" (e.g., all of 3-bit information fields set to "0"), the information used for indication the serving cell(s) and the BWP(s) may be used for indicating the primary cell and the initial active DL BWP (or the default DL BWP). Also, the DCI format C may include information (a SRS request, a SRS request field(s)) used for requesting transmission of SRS (i.e., aperiodic SRS transmission). Also, the DCI format C may include information used for indicating a transmission power control (TPC) command for the PCCH (e.g., a TPC command field for the PUCCH).

And, in a case that the DCI format A is received (i.e., based on the detection of the DCI format A), the UE 102 may receive (i.e., decode, detect) the scheduled PDSCH. Also, in a case that the DCI format B is received (i.e., based on the detection of the DCI format B), the UE 102 may receive (i.e., decode, detect) the scheduled PDSCH. Also, in a case that the DCI format C is received (i.e., based on the detection of the DCI format C), the UE 102 may perform activation, deactivation and/or switching for the indicated serving cell(s) (e.g., the serving cell(s) used for receiving the downlink signal, and/or a downlink communication). Namely, the UE 102 may perform activation, deactivation, switching for the serving cell(s) based on the information, as above described, included in the DCI format C. Also, in a case that DCI format C is received (i.e., based on the detection of the DCI format C), the UE 102 may perform activation, deactivation, and/or switching for the BWP(s) (e.g., the DL BWP(s) used for receiving the downlink signal, and/or the downlink communication). Namely, the UE 102 may perform activation, deactivation, switching for the BWP(s) based on the information, as above described, included in the DCI format C.

Also, a DCI format 0, and/or a DCI format 4 that are used for scheduling of uplink physical shared channel(s) in a cell may be defined as the DCI format for the uplink. For example, the DCI format 0 may be used for scheduling of one uplink physical shared channel (e.g., one PUSCH, one PUSCH codeword, transmission of one uplink transport block) in a cell. Also, the DCI format 4 may be used for scheduling of one uplink physical shared channel (e.g., one PUSCH, up to two PUSCH codewords, transmission of up to two uplink transport blocks). Here, the DCI format 0, and/or the DCI format 4 described herein may be assumed to be included in a DCI format D in some implementations for the sake of simplifying description. As described above, the DCI format D may be used for scheduling of the uplink PSCH (e.g., the PUSCH). Namely, the DCI format D may be a scheduling DCI. Also, the control resource set (i.e., CORESET) of a search space (e.g., the UE-specific search space, the common search space, and/or the PDCCH) in which the DCI format D is monitored may be used to schedule the uplink PSCH (e.g., the PUSCH).

Here, as described below, the DCI format D may be used for activating and/or deactivating a serving cell(s) (e.g., one or more secondary cell(s), one or more uplink secondary cells, and/or one or more uplink component carriers). Also, the DCI format D may be used for activating and/or deactivating a bandwidth part(s) (e.g., one or more BWPs in a serving cell(s), one or more UL BWPs in a serving cell(s)). Also, the C-RNTI (i.e., a first C-RNTI), the SPS C-RNTI (i.e., a second C-RNTI), and/or the GF C-RNTI may be used to transmit the DCI format D. Namely, the UE 102 may decode (detect, monitor) the DCI format D to which CRC parity bits scrambled by the C-RNTI, the SPS C-RNTI, and/or the GF C-RNTI are attached.

For example, the DCI format D may include resource block assignment information (i.e., resource allocation information, a resource block assignment field(s)). Namely, the DCI format D may include information used for indicating a physical resource block(s) (e.g., an index of a physical resource block(s), a size of the physical resource block(s)) of the PUSCH. Also, the DCI format D may include information used for indicating a modulation and coding scheme (i.e., a MCS information, a MCS field(s)). Also, the DCI format D may include information (i.e., a flag for DCI format(s) differentiation, an identifier) used for identifying a DCI format among multiple DCI formats having the same DCI size (i.e., the same DCI format size). For example, for multiple DCI formats with the same DCI size of a same RNTI, the information (i.e., the flag for DCI format(s) differentiation, the identifier) may be included in respective DCI format (e.g., the DCI format A, the DCI format B, the DCI format C, the DCI format D, the DCI format E, and/or the DCI format F) to distinguish the multiple DCI formats (i.e., the DCI format A, the DCI format B, the DCI format C, the DCI format D, the DCI format E, and/or the DCI format F). Also, the DCI format D may include information (e.g., a new data indicator) used for indicating whether a transmission is a new transmission or not (e.g., whether a transmission is a new transmission or a retransmission). Also, the DCI format D may include information (i.e., a CSI request, a CSI request field(s)) used for requesting transmission of CSI (i.e., CSI report, aperiodic CSI report (i.e., aperiodic CSI reporting)) on the PUSCH and/or the PUCCH. Also, the DCI format D may include information (e.g., 3-bit information field(s), a carrier indicator and/or a BWP indicator, a carrier and/or BWP indicator, a carrier indicator field(s) and/or a BWP indicator field(s), a carrier and/or BWP indicator field(s)) used for indicating a serving cell (e.g., a carrier) and/or a BWP. Namely, the DCI format D may include information (e.g., 3-bit information field(s), the carrier indicator, the carrier indicator field(s)) used for indicating a serving cell (e.g., a carrier in which the corresponding PUSCH is scheduled). Also, the DCI format D may include information (e.g., 3-bit information field(s), the BWP indicator, the BWP indicator field(s)) used for indicating a BWP (e.g., a BWP in which the corresponding PUSCH is scheduled). Here, for example, in a case that the information (e.g., 3-bit information field(s)) used for indicating the serving cell(s) in which the PUSCH is scheduled is set "0" (e.g., all of 3-bit information fields set to "0"), the information used for indication the serving cell(s) may be used for indicating the primary cell. Also, for example, in a case that the information (e.g., 3-bit information field(s)) used for indicating the BWP(s) in which the PUSCH is scheduled is set "0" (e.g., all of 3-bit information fields set to "0"), the information used for indication the BWP(s) may be used for indicating the initial active BWP (e.g., the initial active UL BWP) and/or the default BWP (e.g., the default UL BWP). Also, the DCI format D may include information (i.e., the carrier and the BWP indicator) used for indicating a serving cell and a BWP (e.g., a serving cell and a BWP in which the corresponding PUSCH is scheduled). Here, for example, in a case that the information (e.g., 3-bit information field(s)) used for indicating the serving cell(s) and the BWP(s) is set "0" (e.g., all of 3-bit information fields set to "0"), the information used for indication the serving cell(s) and the BWP(s) may be used for indicating the primary cell and the initial active UL BWP (or the default UL BWP). Also, the DCI format D may include information (a SRS request, a SRS request field(s)) used for requesting transmission of SRS (i.e., aperiodic SRS transmission). Also, the DCI format D may include information used for indicating a transmission power control (TPC) command for the PSCH (e.g., a TPC command field for the PUSCH).

Also, a DCI format L and/or a DCI format M that are used for scheduling of uplink physical channel(s) in a cell may be defined as the DCI format (e.g., a fallback DCI format) for the uplink. For example, the DCI format L and/or the DCI format M may be used for scheduling of one uplink physical shared channel (e.g., one PUSCH, one PUSCH codeword, transmission of one uplink transport block). Here, the DCI format L and/or the DCI format M described herein may be assumed to be included in a DCI format E in some implementations for the sake of simplifying descriptions. As described above, the DCI format E may be used for scheduling of the uplink PSCH (e.g., the PUSCH). Namely, the DCI format E may be a scheduling DCI. Also, the control resource set (i.e., CORESET) of a search space (e.g., the UE-specific search space, the common search space, and/or the PDCCH) in which the DCI format E is monitored may be used to schedule the uplink PSCH (e.g., the PUSCH).

Here, as described below, the DCI format E may be used for activating and/or deactivating a serving cell(s) (e.g., one or more secondary cells, one or more uplink secondary cells, and/or one or more uplink component carriers). Also, the DCI format E may be used for activating and/or deactivating a bandwidth part(s) (e.g., one or more BWPs in a serving cell(s), one or more UL BWPs in a serving cell(s)). Also, the C-RNTI (i.e., the first C-RNTI) and/or the SPS C-RNTI (i.e., the second C-RNTI) may be used to transmit the DCI format E. Namely, the UE 102 may decode (detect, monitor) the DCI format E to which CRC parity bits scrambled by the C-RNTI (i.e., the first C-RNTI), the SPS C-RNTI (i.e., the second C-RNTI) and/or the GF C-RNTI are attached. Here, the different C-RNTI (i.e., the third C-RNTI, e.g., the C-RNTI for the fallback DCI format) than the C-RNTI (i.e., the first C-RNTI) and the SPS C-RNTI (i.e., the second C-RNTI) may be used to transmit the DCI format E. Namely, the UE 102 may decode (detect, monitor) the DCI format E to which CRC parity bits scrambled by the third C-RNTI are attached.

For example, the DCI format E may include resource block assignment information (i.e., resource allocation information, a resource block assignment field(s)). Namely, the DCI format E may include information used for indicating a physical resource block(s) (e.g., an index of a physical resource block(s), a size of the physical resource block(s)) of the PUSCH. Also, the DCI format E may include information used for indicating a modulation and coding scheme (i.e., a MCS information, a MCS field(s)). Also, the DCI format E may include information (i.e., a flag for DCI format(s) differentiation, an identifier) used for identifying a DCI format among multiple DCI formats having the same DCI size (i.e., the same DCI format size). For example, for multiple DCI formats with the same DCI size of a same RNTI, the information (i.e., the flag for DCI format(s) differentiation, the identifier) may be included in respective DCI format (e.g., the DCI format A, the DCI format B, the DCI format C, the DCI format D, the DCI format E, and/or the DCI format F) to distinguish the multiple DCI formats (i.e., the DCI format A, the DCI format B, the DCI format C, the DCI format D, the DCI format E, and/or the DCI format F). Also, the DCI format E may include information (e.g., a new data indicator) used for indicating whether a transmission is a new transmission or not (e.g., whether a transmission is a new transmission or a retransmission). Also, the DCI format E may include information (i.e., a CSI request, a CSI request field(s)) used for requesting transmission of CSI (i.e., CSI report, aperiodic CSI report (i.e., aperiodic CSI reporting)) on the PUSCH and/or the PUCCH. Also, the DCI format E may include information (e.g., 3-bit information field(s), a carrier indicator and/or a BWP indicator, a carrier and/or BWP indicator, a carrier indicator field(s) and/or BWP indicator field(s), a carrier and/or a BWP indicator field(s)) used for indicating a serving cell (e.g., a carrier) and/or a BWP. Namely, the DCI format E may include information (e.g., 3-bit information field(s), the carrier indicator, the carrier indicator field(s)) used for indicating a serving cell (e.g., a carrier in which the corresponding PUSCH is scheduled). Also, the DCI format B may include information (e.g., 3-bit information field(s), the BWP indicator, the BWP indicator field(s)) used for indicating a BWP (e.g., a BWP in which the corresponding PUSCH is scheduled). Here, for example, in a case that the information (e.g., 3-bit information field(s)) used for indicating the serving cell(s) in which the PUSCH is scheduled is set "0" (e.g., all of 3-bit information fields set to "0"), the information used for indication the serving cell(s) may be used for indicating the primary cell. Also, for example, in a case that the information (e.g., 3-bit information field(s)) used for indicating the BWP(s) in which the PUSCH is scheduled is set "0" (e.g., all of 3-bit information fields set to "0"), the information used for indication the BWP(s) may be used for indicating the initial active BWP (e.g., the initial active UL BWP) and/or the default BWP (e.g., the default UL BWP). Also, the DCI format B may include information (i.e., the carrier and the BWP indicator) used for indicating a serving cell and a BWP (e.g., a serving cell and a BWP in which the corresponding PUSCH is scheduled). Here, for example, in a case that the information (e.g., 3-bit information field(s)) used for indicating the serving cell(s) and the BWP(s) is set "0" (e.g., all of 3-bit information fields set to "0"), the information used for indication the serving cell(s) may be used for indicating the primary cell and the initial active UL BWP (or the default UL BWP). Also, the DCI format B may include information (a SRS request, a SRS request field(s)) used for requesting transmission of SRS (i.e., aperiodic SRS transmission). Also, the DCI format B may include information used for indicating a transmission power control (TPC) command for the PSCH (e.g., a TPC command field for the PUSCH).

Here, the DCI format E may not include information (i.e., a carrier indicator and/or a BWP indicator, a carrier and/or BWP indicator, a carrier indicator field(s) and/or BWP indicator field(s), a carrier and/or a BWP indicator field(s)) used for indicating a serving cell (e.g., a carrier) and/or a BWP. Namely, the DCI format E may not include information (i.e., the carrier indicator, the carrier indicator field(s)) used for indicating a serving cell (e.g., a carrier in which the corresponding PUSCH is scheduled). Also, the DCI format E may not include information (i.e., the BWP indicator, the BWP indicator field(s)) used for indicating a BWP (e.g., a BWP in which the corresponding PUSCH is scheduled). Also, the DCI format E may not include information (i.e., the carrier and the BWP indicator) used for indicating a serving cell and a BWP (e.g., a serving cell and a BWP in which the corresponding PUSCH is scheduled).

Also, the DCI format E may be used for scheduling of a smaller size of the PUSCH than a size of the PUSCH scheduled by using the DCI format D. Namely, for example, the DCI format E may be used for scheduling of a narrower bandwidth of the PUSCH than a bandwidth of the PUSCH scheduled by using the DCI format D. For example, a number of allocated PRB(s) (e.g., a total number of allocated PRB(s), a total number of allocated PRB(s) of the PDSCH, $N_{PRB}$) by using the DCI format D may be 100(PRBs), 110(PRBs), 270(PRBs), 273(PRBs), and/or 276(PRBs). Here, 100(PRBs) may correspond to 20 MHz, 110(PRBs) may correspond to 20 MHz, 270(PRBs) may correspond to 50 MHz, 273(PRBs) may correspond to 100 MHz, and/or 276(PRBs) may correspond to 100 MHz. Namely, a maximum number of allocated PRB(s) by using the DCI forma D may be 100(PRBs), 110(PRBs), 270(PRBs), 273(PRBs), and/or 276(PRBs). And, the DCI format D may be used for scheduling of the PUSCH of up to 100(PRBs), 110(PRBs), 270(PRBs), 273(PRBs), and/or 276(PRBs). Also, the number of allocated PRB(s) by using the DCI format E may be 6(PRBs), 24(PRBs), 25(PRBs), 50(PRBs), and/or 52(PRBs). Here, 6(PRBs) may correspond to 1.4 MHz, 25(PRBs) may correspond 5 MHz, 50(PRBs) may correspond to 10 MHz, and/or 52(PRBs) may correspond to 10 MHz. Also, 24(PRBs) may correspond to a bandwidth used for PSS, SSS, and/or PBCH (e.g., SS block(s)). Also, 24(PRBs) may correspond to a bandwidth used for RMSI (e.g., SIB2) and CORESET containing PDCCH scheduling RMSI. Also, 24(PRBs) may correspond to a bandwidth used for Msg.3 transmission on UL-SCH (i.e., the PUSCH, the PUSCH transmission) in the random access procedure. Namely, the DCI format E may be used for scheduling of the PUSCH of the bandwidth that corresponds to (e.g., the same as) the bandwidth in which the random access procedure is performed.

Namely, the maximum number of allocated PRB(s) by using the DCI forma E may be 6(PRBs), 24(PRBs), 25(PRBs), 50(PRBs), and/or 52(PRBs). And, the DCI format E may be used for scheduling of the PDSCH of up to 6(PRBs), 24(PRBs), 25(PRBs), 50(PRBs), and/or 52(PRBs). Namely, for example, the larger size (i.e., the larger number) of transport block(s) than a size (i.e., a number) of transport block(s) transmitted on the PUSCH that is scheduled by using the DCI format E may be transmitted on the PUSCH that is scheduled by using the DCI format D. Namely, the smaller size of transport block(s) than a size of transport block(s) transmitted on the PUSCH that is scheduled by using the DCI format D may be transmitted on the PUSCH that is scheduled by using the DCI format E. For example, a third table used for determining the size of the transport block(s) may be defined (e.g., specified) for the DCI format D. Also, a fourth table (i.e., the fourth table different than the third table) used for determining the size of the transport block(s) may be defined (e.g., specified) for the DCI format E. And, the maximum size (i.e., the maximum number) of the transport block(s) for the DCI format D (i.e., the maximum size of the transport block(s) transmitted on the PUSCH that is scheduled by using the DCI format D) may be larger than the maximum size (i.e., the maximum number) of the transport block(s) for the DCI format E (i.e., the maximum size of the transport block(s) transmitted on the PUSCH that is scheduled by using the DCI format E).

Here, the number of allocated PRB(s) (i.e., the maximum number of allocated PRB(s)) may depend on each of multiple numerologies (i.e., multiple subcarrier spacing). Namely, for a certain numerology (i.e., a given numerology, a configured numerology), as described above, the number of allocated PRB(s) that is possible to be scheduled by using the DCI format E is smaller than the number of allocated PRB(s) that is possible to be scheduled by using the DCI format D. Also, the number of allocated PRB(s) (i.e., the maximum number of allocated PRB(s)) by using the DCI format E may be determined based on a bandwidth of a default DL BWP (e.g., the number of PRB(s) of the default DL BWP). Also, the number of allocated PRB(s) (i.e., the maximum number of allocated PRB(s)) by using the DCI format E may be determined based on a bandwidth of a default UL BWP (e.g., the number of PRB(s) of the default UL BWP). As described above, for example, the gNB 160 may configure, e.g., by using the RRC message, the bandwidth of the default DL BWP (e.g., the number of PRB(s) of the default DL BWP). Also, for example, the gNB 160 may configure, e.g., by using the RRC message, the bandwidth of the default UL BWP (e.g., the number of PRB(s) of the default UL BWP). Also, the number of allocated PRB(s) (i.e., the maximum number of allocated PRB(s)) by using the DCI format E may be determined based on a bandwidth of an active DL BWP (e.g., an initial active DL BWP, the number of PRB(s) of the initial active DL BWP, an activated DL BWP, the number of PRB(s) of the activated DL BWP). Also, the number of allocated PRB(s) (i.e., the maximum number of allocated PRB(s)) by using the DCI format E may be determined based on a bandwidth of an active UL BWP (e.g., an initial active UL BWP, the number of PRB(s) of the initial active UL BWP, an activated UL BWP, the number of PRB(s) of the activated UL BWP). As described above, for example, the gNB 160 may configure, e.g., by using the PBCH (e.g., MIB), the RMSI (e.g., SIB2), and/or the RRC message, the bandwidth of the active DL BWP (e.g., an initial active DL BWP, the number of PRB(s) of the initial active DL BWP, an activated DL BWP, the number of PRB(s) of the activated DL BWP). Also, for example, the gNB 160 may configure, e.g., by using the PBCH (e.g., MIB), the RMSI (e.g., SIB2), and/or the RRC message, the bandwidth of the active UL BWP (e.g., an initial active UL BWP, the number of PRB(s) of the initial active UL BWP, an activated UL BWP, the number of PRB(s) of the activated UL BWP). Also, the gNB 160 may configure, e.g., by using the PBCH (e.g., MIB), the RMSI (e.g., SIB2), and/or the RRC message, a bandwidth of RMSI CORESET. And, the bandwidth of the active DL BWP (e.g., an initial active DL BWP, the number of PRB(s) of the initial active DL BWP, an activated DL BWP, the number of PRB(s) of the activated DL BWP) and/or the bandwidth of the active UL BWP (e.g., an initial active UL BWP, the number of PRB(s) of the initial active UL BWP, an activated UL BWP, the number of PRB(s) of the activated UL BWP) may be determined based on (e.g., the same as) the bandwidth of RMSI CORESET.

Also, for example, the numerology of the PUSCH that is scheduled by using the DCI format D may be 15 kHz (e.g., the first numerology), 30 kHz (e.g., the second numerology), and/or 60 kHz (e.g., the third numerology). Namely, the DCI format D may be used for scheduling of the PUSCH of multiple numerologies (i.e., the first numerology, the second numerology and/or the third numerology). Also, the numerology of the PUSCH that is scheduled by using the DCI format E may be 15 kHz (e.g., the first numerology), 30 kHz (e.g., the second numerology), and/or 60 kHz (e.g., the third numerology). Namely, the DCI format E may be used for scheduling of the PDSCH of multiple numerologies (i.e., the first numerology, the second numerology and/or the third numerology). Here, for example, the numerology of the PDSCH that is scheduled by using the DCI format E may be only one of 15 kHz (i.e., the first numerology), 30 kHz (i.e., the second numerology), and 60 kHz (i.e., the third numerology). For example, only 15 kHz SCS may be used for PUSCH that is scheduled by using the DCI format E. Here, the numerology used for the PUSCH that is scheduled by using the DCI format E may be specified, in advance, by the specification, and known information between the gNB 160 and the UE 102. Namely, in a case that the DCI format E is received (e.g., detected), the UE 102 may assume 15 kHz SCS (e.g., the first numerology) for the scheduled PDSCH. And, the UE 102 may perform the PUSCH transmission based on 15 kHz SCS (e.g., based on the assumption of the PUSCH of 15 kHz SCS (e.g., the first numerology), even if 30 kHz SCS (e.g., the second numerology) and/or 60 kHz SCS (e.g., the third numerology) is configured).

Also, the numerology of the PUSCH that is scheduled by using the DCI format E may be determined based on a numerology of the default DL BWP. For example, the gNB 160 may configure, e.g., by using the RRC message, the numerology of the default DL BWP. Also, the numerology of the PUSCH that is scheduled by using the DCI format E may be determined based on a numerology of the default UL BWP. For example, the gNB 160 may configure, e.g., by using the RRC message, the numerology of the default UL BWP. Also, the numerology of the PUSCH that is scheduled by using the DCI format E may be determined based on a numerology of the active DL BWP (e.g., the initial active DL BWP, the activated DL BWP). For example, the gNB 160 may configure, e.g., by using the RRC message, the numerology of the active DL BWP (e.g., the initial active DL BWP, the activated DL BWP). Also, the numerology of the PUSCH that is scheduled by using the DCI format E may be determined based on a numerology of the active UL BWP (e.g., the initial active UL BWP, the activated UL BWP). For example, the gNB 160 may configure, e.g., by using the RRC message, the numerology of the active UL BWP (e.g., the initial active UL BWP, the activated UL BWP). Also, the gNB 160 may configure, e.g., by using the PBCH (e.g., MIB), the RMSI (e.g., SIB2), and/or the RRC message, the numerology of RMSI CORESET. And, the numerology of the active DL BWP (e.g., the initial active DL BWP, the activated DL BWP) and/or the active UL BWP (e.g., the initial active UL BWP, the activated UL BWP) may be determined based on (e.g., the same as) the numerology of RMSI CORESET. Namely, the numerology of the PUSCH that is scheduled by using the DCI format E may be determined based on the numerology of RMSI CORESET. Also, the gNB 160 may configure, e.g., by using the PBCH (e.g., MIB), the RMSI (e.g., SIB2), and/or the RRC message, the numerology for RMSI (e.g., the PDSCH used for transmitting the RMSI), the Msg.2 (e.g., the PDSCH used for transmitting the Msg.2 in a random access procedure), and/or the Msg.4 (e.g., the PDSCH used for transmitting the Msg.4 in the random access procedure). And, the numerology of the active DL BWP (e.g., the initial active DL BWP, the activated DL BWP) and/or the active UL BWP (e.g., the initial active UL BWP, the activated UL BWP) may be determined based on (e.g., the same as) the numerology for the RMSI, the Msg.2, and/or the Msg.4. Namely, the numerology of the PUSCH that is scheduled by using the DCI format E may be determined based on the numerology for the RMSI, the Msg.2, and/or the Msg.4.

Also, a DCI format O and/or a DCI format P that are used for activating, deactivating, and/or switching a serving cell(s) (e.g., one or more secondary cell(s), one or more uplink secondary cells, and/or one or more secondary uplink component carriers) may be defined as the DCI format for the uplink. Here, the DCI format Z and/or the DCI format K may be used for activating, deactivating, and/or switching a BWP(s) (e.g., one or more BWPs in a serving cell(s), one or more UL BWPs in a serving cell(s)). Namely, the DCI format O and/or the DCI format P that are used for activating, deactivating, and/or switching the serving cell(s) and/or the BWP(s). Here, the DCI format O and/or the DCI format P described herein may be assumed to be included in a DCI format F in some implementations for the sake of simplifying descriptions. As described above, the DCI format F may be used for activating, deactivating, and/or switching the serving cell(s) and/or the BWP(s). Namely, the DCI format F may be an activating/deactivating/switching DCI. Also, the control resource set (i.e., CORESET) of a search space (e.g., the UE-specific search space, the common search space, and/or the PDCCH) in which the DCI format F is monitored may be used to activate, deactivate, and/or switch the serving cell(s) and/or the BWP(s).

Here, the C-RNTI (i.e., the first C-RNTI), SPS C-RNTI (i.e., the second C-RNTI), and/or the GF C-RNTI may be used to transmit the DCI format F. Namely, the UE 102 may decode (detect, monitor) the DCI format F to which CRC parity bits scrambled by the C-RNTI (i.e., the first C-RNTI), SPS C-RNTI (i.e., the second C-RNTI), and/or the GF C-RNTI are attached. Here, the different C-RNTI (i.e., the fourth C-RNTI, e.g., the C-RNTI for activating/deactivating/switching DCI format) than the C-RNTI (i.e., the first C-RNTI), the SPS C-RNTI (i.e., the second C-RNTI), the GF C-RNTI and the third C-RNTI may be used to transmit the DCI format F. Namely, the UE 102 may decode (detect, monitor) the DCI format F to which CRC parity bits scrambled by the fourth C-RNTI are attached.

Here, the DCI format F may be identified by (re)using the DCI format D (i.e., the scheduling DCI). For example, the DCI format F may be identified by setting each of one or more fields (i.e., one or more predetermined fields) included in the DCI format D to each of certain values (i.e., one or more predetermined values). For example, by setting each of the resource block assignment field(s), the MCS field(s), the new data indicator field(s), and/or the TPC command for PUSCH field(s) to each of the certain values, the DCI format F may be identified by (re)using the DCI format D. For example, all of (i.e., each of) the resource clock assignment field(s) may be set to "0" or "1" (i.e., a predetermined value(s)). Also, all of (i.e., each of) the MCS field(s) may be set to all of "0" or "1" (i.e., a predetermined value(s)). Also, all of (i.e., each of) the new data indicator field(s) may be set to all of "0" or "1" (i.e., a predetermined value(s)). Also, all of (i.e., each of) the TPC command for PUSCH field(s) may be set to all of "0" or "1" (i.e., a predetermined value(s)). Here, which information field(s) (i.e., the predetermined field(s)) included in the DCI format D is used for identifying the DCI format F may be specified, in advance, by the specification, and known information between the gNB 160 and the UE 102. Also, which value(s) set to the predetermined field(s) for identifying the DCI format F may be specified, in advance, by the specification, and known information between the gNB 160 and the UE 102.

Namely, the DCI format F may be the DCI format D including the predetermined field(s) set to the predetermined value(s). As described above, for example, the DCI format F may be the DCI format D including the resource block assignment field(s) set to "0". And, the DCI format F may include resource block assignment information (i.e., resource allocation information, a resource block assignment field(s)). Also, the DCI format F may include information used for indicating a modulation and coding scheme (i.e., a MCS information, a MCS field(s)). Also, the DCI format F may include information (i.e., a flag for DCI format(s) differentiation, an identifier) used for identifying a DCI format among multiple DCI formats having the same DCI size (i.e., the same DCI format size). Also, the DCI format F may include information (e.g., a new data indicator) used for indicating whether a transmission is a new transmission or not (e.g., whether a transmission is a new transmission or a retransmission). Also, the DCI format F may include information (i.e., a CSI request, a CSI request field(s)) used for requesting transmission of CSI (i.e., CSI report, aperiodic CSI report (i.e., aperiodic CSI reporting)) on the PUSCH and/or the PUCCH. Also, the DCI format F may include information (e.g., 3-bit information field(s), a carrier indicator and/or a BWP indicator, a carrier and/or BWP indicator, a carrier indicator field(s) and/or a BWP indicator field(s), a carrier and/or BWP indicator field(s)) used for indicating a serving cell (e.g., a carrier) and/or a BWP. Namely, the DCI format F may include information (e.g., 3-bit information field(s), the carrier indicator, the carrier indicator field(s)) used for indicating a serving cell (e.g., a carrier in which the corresponding PDSCH is scheduled). Also, the DCI format F may include information (e.g., the BWP indicator, the BWP indicator field(s)) used for indicating a BWP (e.g., a BWP in which the corresponding PDSCH is scheduled). Here, for example, in a case that the information (e.g., 3-bit information field(s)) used for indicating the serving cell(s) in which the PUSCH is scheduled is set "0" (e.g., all of 3-bit information fields set to "0"), the information used for indication the serving cell(s) may be used for indicating the primary cell. Also, for example, in a case that the information (e.g., 3-bit information field(s)) used for indicating the BWP(s) in which the PUSCH is scheduled is set "0" (e.g., all of 3-bit information fields set to "0"), the information used for indication the BWP(s) may be used for indicating the initial active BWP (e.g., the initial active UL BWP) and/or the default BWP (e.g., the default UL BWP). Also, the DCI format F may include information (i.e., the carrier and the BWP indicator) used for indicating a serving cell and a BWP (e.g., a serving cell and a BWP in which the corresponding PDSCH is scheduled). Here, for example, in a case that the information (e.g., 3-bit information field(s)) used for indicating the serving cell(s) and the BWP(s) is set "0" (e.g., all of 3-bit information fields set to "0"), the information used for indication the serving cell(s) may be used for indicating the primary cell and the initial active UL BWP (or the default UL BWP). Also, the DCI format F may include information (a SRS request, a SRS request field(s)) used for requesting transmission of SRS (i.e., aperiodic SRS transmission). Also, the DCI format F may include information used for indicating a transmission power control (TPC) command for the PCCH (e.g., a TPC command field for the PUCCH).

And, in a case that the DCI format D is received (i.e., based on the detection of the DCI format D), the UE 102 may perform the PUSCH transmission. Also, in a case that the DCI format E is received (i.e., based on the detection of the DCI format E), the UE 102 may perform the PUSCH transmission. Also, in a case that the DCI format F is received (i.e., based on the detection of the DCI format F), the UE 102 may perform activation, deactivation and/or switching for the indicated serving cell(s) (e.g., the serving cell(s) used for receiving the downlink signal and/or the downlink communication, and/or the serving cell(s) used for transmitting the uplink signal and/or the uplink communication). Namely, the UE 102 may perform activation, deactivation, switching for the serving cell(s) based on the information, as above described, included in the DCI format F. Also, in a case that DCI format F is received (i.e., based on the detection of the DCI format F), the UE 102 may perform activation, deactivation, and/or switching for the BWP(s) (e.g., the DL BWP(s) used for receiving the downlink signal and/or the downlink communication, and/or the UL BWP(s) used for transmitting the uplink signal and/or the uplink communication). Namely, the UE 102 may perform activation, deactivation, switching for the BWP(s) based on the information, as above described, included in the DCI format C.

Figure 5:
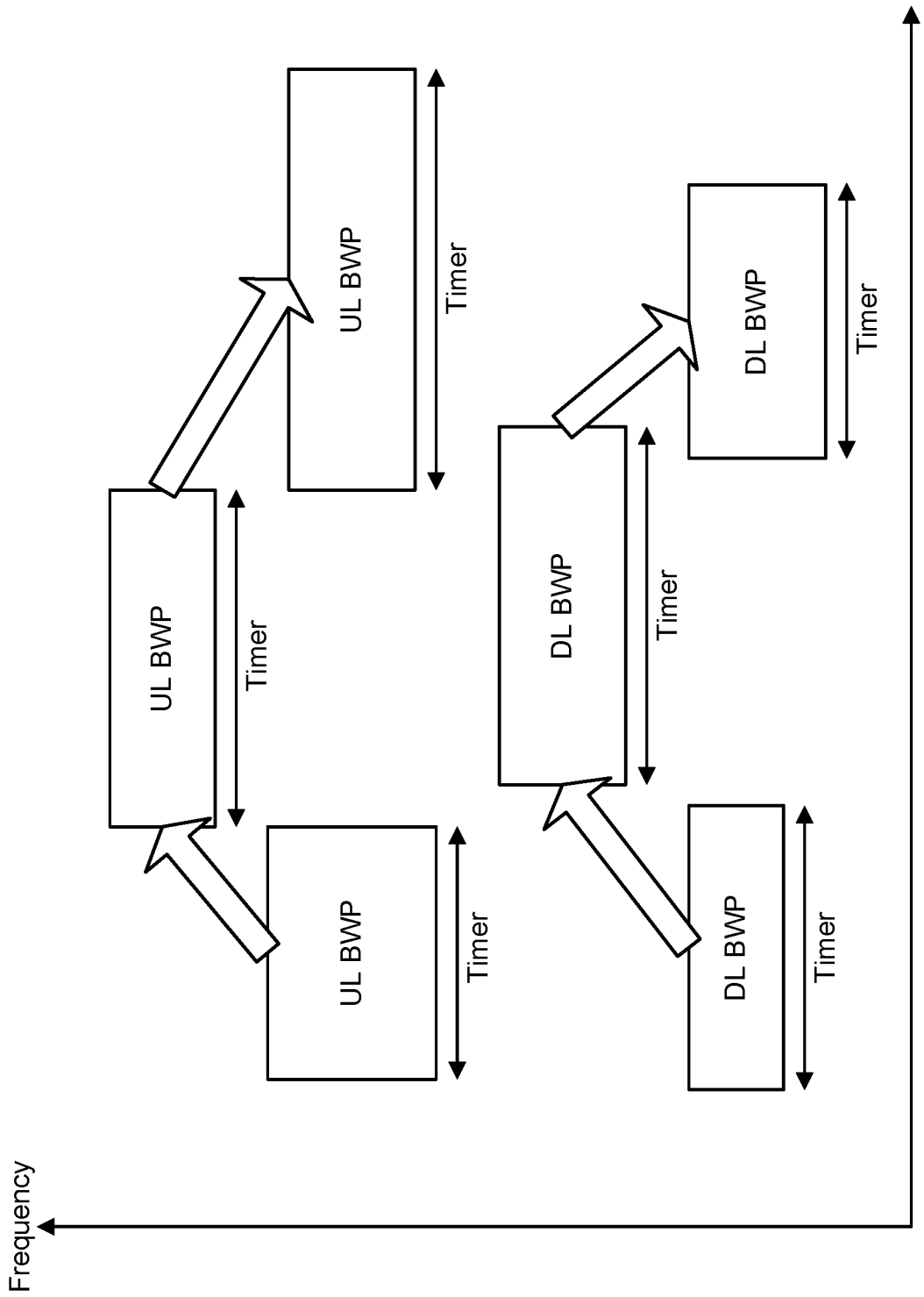
FIG. 5 illustrates an example of the downlink and/or uplink transmissions.

FIG. 5 illustrates an example of the downlink and/or uplink transmissions. As showed by FIG. 5, one or more serving cells may be configured to the UE 102. In the carrier aggregation (CA), the gNB 160 and the UE 102 may communicate each other using the one more serving cells. Here, the configured one or more serving cells may include one primary cell and one or more secondary cell. For example, the primary cell may be a serving cell on which an initial connection establishment procedure is performed. Also, the primary cell may be a serving cell on which a connection re-establishment procedure is performed. Also, the primary cell may be a serving cell that is indicated as the primary cell (e.g., indicated as the primary cell during the handover procedure). For example, the gNB 160 may transmit, e.g., by using the PBCH (e.g., the MIB), the PDSCH (e.g., the SIB type 2), and/or the dedicated RRC message, information configuring the primary cell. Also, the gNB 160 may transmit, e.g., by using the PBCH (e.g., the MIB), the PDSCH (e.g., the SIB type 2), and/or the dedicated RRC message, information used for configuring one or more secondary cells to form together with the primary cell a set of serving cells. Here, in the downlink, a carrier corresponding to the primary cell may be a downlink primary component carrier, and a carrier corresponding to a secondary cell may be a downlink secondary component carrier. Also, in the uplink, a carrier corresponding to the primary cell may be an uplink primary component carrier, and a carrier corresponding to the secondary cell may be an uplink secondary component carrier.

Here, the primary cell may be used for transmitting on the PUCCH. Namely, the UE 102 may perform the transmission on the PUCCH in the primary cell. Also, the primary cell may not be deactivated. Also, a cross-carrier scheduling may not be applied to the primary cell. Namely, the primary cell may be always scheduled via its PDCCH (i.e., the PDCCH of the primary cell). Also, in a case that the PDCCH (e.g., the PDCCH monitoring, the PDCCH monitoring occasion(s)) of the secondary cell is configured, the cross-carrier scheduling may not be applied to the secondary cell. Namely, in the case that the PDCCH of the secondary cell is configured, the secondary cell may be always scheduled via its PDCCH (i.e., the PDCCH of the secondary cell). Also, in a case that the PDCCH (e.g., the PDCCH monitoring, the PDCCH monitoring occasion(s)) of the secondary cell is not configured, the cross-carrier scheduling may be applied to the secondary cell. Namely, in the case that the PDCCH of the secondary cell is not configured, the secondary cell may be scheduled via the PDCCH of one other serving cell. Here, as described above, the carrier indicator (i.e., the carrier indicator field(s)) may be included in the DCI format(s) for indicating the serving cell (e.g., the serving cell on which the corresponding PDSCH and/or the corresponding PUSCH is scheduled).

Here, a linking (i.e., a linkage, a pairing, a correspondence) may be defined between the uplink (e.g., the uplink component carrier) and the downlink (e.g., the downlink component carrier). For example, the gNB 160 may transmit, e.g., by using the PBCH (e.g., the MIB), the PDSCH (e.g., the SIB type 2), and/or the dedicated RRC message, information used for configuring the linking between the uplink and the downlink. Namely, a serving cell in which the transmission on the PDSCH is performed based on the scheduling by using the DCI format(s) (i.e., the DCI format(s) for the downlink, a downlink assignment) may be identified based on the linking. Also, a serving cell in which the transmission on the PUSCH is performed based on the scheduling by using the DCI format(s) (i.e., the DCI format(s) for the uplink, an uplink grant) may be identified based on the linking. Here, in this case, the carrier indicator field(s) may not be included in the DCI format(s) (i.e., the DCI format(s) for the downlink, the DCI format(s) for the uplink). Namely, the DCI format(s) received on the primary cell may be corresponding to the downlink transmission (e.g., the PDSCH transmission) on the primary cell. Also, the DCI format(s) received on the secondary cell may be corresponding to the uplink transmission (e.g., the PUSCH transmission) on the secondary cell.

Also, as described above, an activation and/or a deactivation mechanism of the serving cell(s) may be supported. Here, the primary cell may be always activated. For example, the gNB 160 may transmit, e.g., by using the higher layer signal (e.g., the MAC CE) and/or the DCI format(s), information used for indicating the activation, the deactivation, and/or the switching of the one or more serving cells. Also, the gNB 160 may transmit, e.g., by using the higher layer signal (e.g., the RRC message), information used for configuring a value(s) of timer (e.g., a first timer) associated with the deactivation and/or the switching of the one or more serving cells. For example, the UE 102 may maintain the first timer per configured secondary cell. Also, the UE 102 may deactivate the secondary cell (i.e., the associated secondary cell) based on the timer expiry. Namely, the UE 102 may activate, based on the information used for indicating the activation and/or the switching of the serving cell(s) (e.g., the secondary cell(s)), the serving cell(s) (e.g., the secondary cell(s)). And, in a case that the serving cell(s) is activated, the UE 102 may perform the SRS transmission (e.g., the aperiodic SRS transmission) on the serving cell(s). Also, in a case that the serving cell(s) is activated, the UE 102 may perform CSI reporting (e.g., the aperiodic CSI reporting) for the serving cell(s). Also, in a case that the serving cell(s) is activated, the UE 102 may perform the PDCCH monitoring on the serving cell(s). Also, in a case that the serving cell(s) is activated, the UE 102 may perform the PDCCH monitoring for the serving cell(s). Also, in a case that the serving cell(s) is activated, the UE 102 may start (or restart) the first timer associated with the serving cell(s). Also, the UE 102 may deactivate, based on the information used for deactivating the serving cell(s) (e.g., the secondary cell(s)), the serving cell(s) (e.g., the secondary cell(s)). And, in a case that the serving cell(s) is deactivated, the UE 102 may stop the first timer associated with the serving cell(s). Also, in a case that the DCI format(s) on the activated serving cell(s) is used for scheduling of the PDSCH and/or the PUSCH, the UE 102 may restart the first timer associated with the serving cell(s). Also, in a case that the DCI format(s) on the serving cell(s) scheduling the activated serving cell(s) is used for scheduling of the PDSCH and/or the PUSCH for the activated serving cell(s), the UE 102 may restart the first timer associated with the serving cell(s). Also, in a case that the serving cell(s) is deactivated, the UE 102 may not perform the SRS transmission (e.g., the aperiodic SRS transmission) on the serving cell(s). Also, in a case that the serving cell(s) is deactivated, the UE 102 may not perform the CSI reporting (e.g., the aperiodic CSI reporting) for the serving cell(s). Also, in a case that the serving cell(s) is deactivated, the UE 102 may not transmit UL-SCH on the serving cell(s). Also, in a case that the serving cell(s) is deactivated, the UE 102 may not monitor the PDCCH on the serving cell(s). Also, in a case that the serving cell(s) is deactivated, the UE 102 may not monitor the PDCCH for the serving cell(s).

Also, for example, one or more serving BWPs (e.g., four DL BWPs and/or four UL BWPs) may be configured to the UE 102. Here, the configured one or more serving cells may include one or more initial active BWPs (e.g., the initial active DL BWPs, and/or the initial active UL BWPs). Also, the configured one or more serving sells may include one or more default BWPs (e.g., the default DL BWPs, and/or the default UL BWPs). For example, the initial active BWPs may be a BWPs (e.g., the DL BWP and/or the UL BWP) on which an initial connection establishment procedure is performed. Also, the initial active BWP may be a BWP (e.g., the DL BWP and/or the UL BWP) on which a connection re-establishment procedure is performed. Also, the initial active BWP may be a BWP (e.g., the DL BWP and/or the UL BWP) that is indicated as the initial active BWP (e.g., indicated as the initial active BWP during the handover procedure). Also, for example, the default BWPs may be a BWPs (e.g., the DL BWP and/or the UL BWP) on which an initial connection establishment procedure is performed. Also, the default BWP may be a BWP (e.g., the DL BWP and/or the UL BWP) on which a connection re-establishment procedure is performed. Also, the default BWP may be a BWP (e.g., the DL BWP and/or the UL BWP) that is indicated as the initial active BWP (e.g., indicated as the default BWP during the handover procedure). Namely, the default BWP may be the initial active BWP. For example, the gNB 160 may transmit, e.g., by using the PBCH (e.g., the MIB), the PDSCH (e.g., the SIB type 2), and/or the dedicated RRC message, information configuring the initial BWP(s). Here, the gNB 160 may independently configure the initial DL BWP and the initial UL BWP. Also, the gNB 160 may transmit, e.g., by using the PBCH (e.g., the MIB), the PDSCH (e.g., the SIB type 2), and/or the dedicated RRC message, information used for configuring the default BWP(s). Here, the gNB 160 may independently configure the default DL BWP and the default UL BWP. Also, for example, the gNB 160 may transmit, e.g., by using the PBCH (e.g., the MIB), the PDSCH (e.g., the SIB type 2), and/or the dedicated RRC message, information used for configuring one or more BWPs in a serving cell(s). Here, the gNB 160 may independently configure, in the serving cell, the one or more DL BWPs (e.g., four DL BWPs) and the one or more UL BWPs (e.g., four UL BWPs).

Here, the initial active BWP and/or the default BWP may be used for transmitting on the PUCCH. Namely, the UE 102 may perform the transmission on the PUCCH in the initial active BWP and/or the default BWP. Also, the initial active BWP and/or the default BWP may not be deactivated. Also, a cross-carrier scheduling may not be applied to the initial active BWP and/or the default BWP. Namely, the initial active BWP and/or the default BWP may be always scheduled via its PDCCH (i.e., the PDCCH of the initial active BWP and/or the default BWP). Also, in a case that the PDCCH (e.g., the PDCCH monitoring, the PDCCH monitoring occasion(s)) of the BWP(s) is configured, the cross-carrier scheduling may not be applied to the BWP(s). Namely, in the case that the PDCCH of the BWP(s) is configured, the BWP(s) may be always scheduled via its PDCCH (i.e., the PDCCH of the BWP(s)). Also, in a case that the PDCCH (e.g., the PDCCH monitoring, the PDCCH monitoring occasion(s)) of the BWP(s) is not configured, the cross-carrier scheduling may be applied to the BWP(s). Namely, in the case that the PDCCH of the BWP(s) is not configured, the BWP(s) may be scheduled via the PDCCH of one other BWP(s). Here, as described above, the BWP indicator (i.e., the BWP indicator field(s)) may be included in the DCI format(s) for indicating the BWP(s) (e.g., the BWP(s) on which the corresponding PDSCH and/or the corresponding PUSCH is scheduled).

Here, a linking (i.e., a linkage, a pairing, a correspondence) may be defined between the UL BWP and the DL BWP. For example, the gNB 160 may transmit, e.g., by using the PBCH (e.g., the MIB), the PDSCH (e.g., the SIB type 2), and/or the dedicated RRC message, information used for configuring the linking between the UL BWP(s) and the DL BWP(s). Namely, a BWP(s) in which the transmission on the PDSCH is performed based on the scheduling by using the DCI format(s) (i.e., the DCI format(s) for the downlink, a downlink assignment) may be identified based on the linking. Also, a BWP(s) in which the transmission on the PUSCH is performed based on the scheduling by using the DCI format(s) (i.e., the DCI format(s) for the uplink, an uplink grant) may be identified based on the linking. Here, in this case, the BWP indicator field(s) may not be included in the DCI format(s) (i.e., the DCI format(s) for the downlink, the DCI format(s) for the uplink). Namely, the DCI format(s) received on the DL BWP(s) may be corresponding to the downlink transmission (e.g., the PDSCH transmission) on the DL BWP(s). Also, the DCI format(s) received on the BWP(s) may be corresponding to the uplink transmission (e.g., the PUSCH transmission) on the BWP(s).

Also, as described above, an activation and/or a deactivation mechanism of the BWP(s) may be supported. Here, the initial active BWP and/or the default BWP may be always activated. For example, the gNB 160 may transmit, e.g., by using the higher layer signal (e.g., the MAC CE) and/or the DCI format(s), information used for indicating the activation, the deactivation, and/or the switching of the one or more BWPs. Also, the gNB 160 may transmit, e.g., by using the higher layer signal (e.g., the RRC message), information used for configuring a value(s) of timer (e.g., a second timer) associated with the deactivation and/or the switching of the one or more BWPs. For example, the UE 102 may maintain the second timer per configured BWP. Also, the UE 102 may maintain the second timer per configured serving cell(s). Also, the UE 102 may deactivate the BWP(s) (i.e., the associated BWP(s)) based on the timer expiry. Namely, the UE 102 may activate, based on the information used for indicating the activation and/or the switching of the BWP(s), the BWP(s). And, in a case that the BWP(s) is activated, the UE 102 may perform the SRS transmission (e.g., the aperiodic SRS transmission) on the BWP(s). Also, in a case that the BWP(s) is activated, the UE 102 may perform CSI reporting (e.g., the aperiodic CSI reporting) for the BWP(s). Also, in a case that the BWP(s) is activated, the UE 102 may perform the PDCCH monitoring on the BWP(s). Also, in a case that the BWP(s) is activated, the UE 102 may perform the PDCCH monitoring for the BWP(s). Also, in a case that the BWP(s) is activated, the UE 102 may start (or restart) the second timer associated with the BWP(s). Also, the UE 102 may deactivate, based on the information used for deactivating the BWP(s), the BWP(s). And, in a case that the BWP(s) is deactivated, the UE 102 may stop the second timer associated with the BWP(s). Also, in a case that the DCI format(s) on the activated BWP(s) is used for scheduling of the PDSCH and/or the PUSCH, the UE 102 may restart the second timer associated with the BWP(s). Also, in a case that the DCI format(s) on the BWP(s) scheduling the activated BWP(s) is used for scheduling of the PDSCH and/or the PUSCH for the activated BWP(s), the UE 102 may restart the second timer associated with the BWP(s). Also, in a case that the BWP(s) is deactivated, the UE 102 may not perform the SRS transmission (e.g., the aperiodic SRS transmission) on the BWP(s). Also, in a case that the BWP(s) is deactivated, the UE 102 may not perform the CSI reporting (e.g., the aperiodic CSI reporting) for the BWP(s). Also, in a case that the BWP(s) is deactivated, the UE 102 may not transmit UL-SCH on the BWP(s). Also, in a case that the BWP(s) is deactivated, the UE 102 may not monitor the PDCCH on the BWP(s). Also, in a case that the BWP(s) is deactivated, the UE 102 may not monitor the PDCCH for the BWP(s).

Here, the information used for configuring a value(s) of the second timer may be configured per serving cell. Namely, the information used for configuring a value(s) of the second timer may be configured for each of the serving cells (e.g., each of the primary cell and the one or more secondary cells). Namely, the gNB 160 may configure the value(s) of the second timer (e.g., a single value(s) of the second timer) for the one or more BWPs in the serving cell(s). Also, the information used for configuring a value(s) of the second timer may be configured per BWP (e.g., per BWP in a serving cell). Namely, the information used for configuring a value(s) of the second timer may be configured for each of BWPs in a serving cell. Namely, the gNB 160 may configure the value(s) of the second timer (e.g., a single value(s) of the second timer) for each of BWPs in the serving cell(s). Also, the information used for configuring a value(s) of the second timer may be configured per DCI format. For example, the information used for configuring a value(s) of the second timer may be configured for each of the DCI formats (e.g., the DCI format A, the DCI format B, the DCI format C, the DCI format E, and/or the DCI format E). Namely, the information used for configuring a value(s) of the second timer may be configured for the each of the serving cells, the each of the BWPs, and/or the each of the DCI formats. Namely, in a case that the UE 102 receives the DCI format A, and/or the DCI format D, the second timer of the first value(s) may be (re)started. Also, in a case that the UE 102 receives the DCI format B, and/or the DCI format E, the second timer of the second value(s) may be (re)started. Also, in a case that the UE 102 receives the DCI format C, and/or the DCI format F, the second timer of the third value(s) may be (re)started. Here, the value(s) of the second timer (i.e., the second timer) may not be applied to a predetermined DCI format(s). Here, the predetermined DCI format(s) may be specified, in advance, by the specification, and known information between the gNB 160 and the UE 102.

Also, the value(s) of the second timer (i.e., the second timer) may be independently configured for the DL BWP(s) and the UL BWP(s). For example, the gNB 160 may configure the fourth value(s) of the second timer (i.e., the second timer) for the DL BWP(s). And, in a case that the DL BWP(s) is activated, the UE 102 may start (or restart) the second timer for the DL BWP(s). Also, in a case that the DCI format(s) on the activated DL BWP(s) is used for scheduling of the PDSCH, the UE 102 may start (or restart) the second timer for the DL BWP(s). Also, in a case that the DCI format(s) on the DL BWP(s) scheduling the activated DL BWP(s) is used for scheduling of the PDSCH for the activated DL BWP(s), the UE 102 may start (or restart) the second timer for DL BWP(s). Also, the gNB 160 may configure the fifth value(s) of the second timer (i.e., the second timer) for the UL BWP(s). And, in a case that the UL BWP(s) is activated, the UE 102 may start (or restart) the second timer for the UL BWP(s). Also, in a case that the DCI format(s) on the activated UL BWP(s) is used for scheduling of the PUSCH, the UE 102 may start (or restart) the second timer for the UL BWP(s). Also, in a case that the DCI format(s) on the UL BWP(s) scheduling the activated UL BWP(s) is used for scheduling of the PUSCH for the activated UL BWP(s), the UE 102 may start (or restart) the second timer for UL BWP(s).

For example, the UE 102 configured for operation in BWPs of the serving cell may be configured (e.g., by using the PBCH (e.g., the MIB, the PDSCH (the SIB type 2 (i.e., the RMSI)), and/or the dedicated RRC message), for the serving cell) a set of BWP(s) for reception(s) by the UE 102 (e.g., a set of DL BWP) in a DL bandwidth for the serving cell. Also, the UE 102 configured for operation in BWPs of the serving cell may be configured (e.g., by using the PBCH (e.g., the MIB, the PDSCH (the SIB type 2 (i.e., the RMSI)), and/or the dedicated RRC message), for the serving cell) a set of BWP(s) for transmission(s) by the UE 102 (e.g., a set of UL BWP) in a UL bandwidth for the serving cell. For example, for unpaired spectrum operation (i.e., linked spectrum operation), the DL BWP from the set of configured DL BWP(s) may be linked to the UL BWP from the set of configured UL BWP(s), where the DL BWP and the UL BWP may have a same index in the respective sets. Here, the index may be configured by using the PBCH (e.g., the MIB, the PDSCH (the SIB type 2 (i.e., the RMSI)), and/or the dedicated RRC message. Also, the index may be indicated by using the DCI format(s). Also, for unpaired spectrum operation, the UE 102 may expect that the center frequency for the DL BWP(s) is the same as the center frequency for the UL BWP(s).

Here, for example, for each DL BWP or UL BWP in a set of DL BWPs or UL BWPs, respectively, the gNB 160 may configure, e.g., by using the higher layer signal, one or more parameters (e.g., the subcarrier spacing (i.e., the numerology), a cyclic prefix, a number of contiguous PRBs, an offset of the first PRB of the DL BWP in the DL bandwidth, and/or an offset of the first PRB of the UL BWP in the UL bandwidth). Namely, the gNB 160 may transmit, e.g., by using the higher layer signal, information used for configuring the ore more parameters. Namely, for example, each DL BWP in the set of DL BWPs may have different bandwidth (i.e., different numbers of contiguous PRBs). Also, each UL BWP in the set of UL BWPs may have different bandwidth (i.e., different numbers of contiguous PRBs). Also, as described above, for each DL BWP in the set of DL BWPs, the search space (e.g., the CSS and/or the USS) may be configured (e.g., defined). Also, for each UL BWP in the set of UL BWPs, the resource of the PUCCH (e.g., resource sets of the PUCCH transmission) may be configured and/or indicated, as described in the systems and methods herein. Also, for each UL BWP in the set of UL BWPs, the resource of the PUSCH (e.g., resource sets of the PUSCH transmission) may be configured and/or indicated, as described in the systems and methods herein.

Namely, for example, the UE 102 may perform, based on the one or more parameters, a reception on the PDCCH and/or the PDSCH in the DL BWP. Also, the UE 102 may perform, based on the one or more parameters, a transmission on the PUSCH and/or the PUCCH in the UL BWP. Namely, the DL BWP from the configured DL BWP set for DL receptions (i.e., the reception on the PDCCH and/or the PDSCH) may be configured (e.g., by using the higher layer signal) and/or indicated (e.g., by using the DCI format(s)). Also, the UL BWP from the configured UL BWP set for UL transmissions (i.e., the transmission on the PUSCH and/or the PUCCH) may be configured (e.g., by using the higher layer signal) and/or indicated (e.g., by using the DCI format(s)). Here, as described above, the control resource set of the search space (i.e., the CSS and/or the USS) may configured (e.g., defined) for the initial activated DL BWP(s) and/or the default DL BWP(s). For example, the initial activated DL BWP that is defined by a location and number of contiguous PRB(s), the subcarrier spacing, and/or the cyclic prefix may be the DL BWP for the control resource set for the common search space. Also, as described above, in a case that the BWP indicator is configured (e.g., present) in the DCI format(s) scheduling the PDSCH (e.g., the PDSCH reception), the value(s) of the BWP indicator may be used for indicating the activated DL BWP, from the configured DL BWP, for the DL receptions. Also, in a case that the BWP indicator is configured (e.g., present) in the DCI format(s) scheduling the PUSCH (e.g., the PUSCH transmission), the value(s) of the BWP indicator may be used for indicating the activated UL BWP, from the configured UL BWP, for the UL transmissions.

Also, for example, in a case that the default BWP (e.g., the default BWP of the serving cell(s) (e.g., the primary cell and/or the secondary cell)) is configured and the second timer (e.g., the second timer indicating the value(s) for the serving cell(s) (e.g., the primary cell and/or the secondary cell)) is configured, then, for the unpaired spectrum, the UE 102 may initialize (e.g., start, (re)start) the second timer (e.g., the value(s) of the second timer) if the UE 102 detects the DCI format(s) indicating the activated DL BWP(s). Also, in a case that the default BWP (e.g., the default BWP of the primary cell) is configured and the second timer (e.g., the second timer indicating the value(s) for the primary cell) is configured, then, for the paired spectrum, the UE 102 may initialize the second timer (e.g., the value(s) of the second timer) if the UE 102 detects the DCI format(s) indicating the activated DL BWP(s) or the DCI format(s) indicating the activated UL BWP(s). Also, in a case that the UE 102 does not detect the DCI format(s), the UE 102 may increment the second timer (e.g., the value(s) of the second timer) at each PDCCH monitoring period for the DCI format(s). Also, for the serving cell(s) (e.g., the primary cell and/or the secondary cell), in a case that the UE 102 does not detect the DCI format(s) indicating the active DL BWP(s) for the unpaired spectrum operation (e.g., for a total number of respective consecutive PDCCH monitoring periods, across all control resource sets the UE is configured for monitoring PDCCH in the active DL BWP, equal to the value(s) of the second timer), the UE 102 may switch to the default DL BWP from the activated DL BWP. Namely, in a case that the value(s) of the second timer is equal to the configured value (i.e., the value(s) of the second timer that is configured by the gNB 160), the second timer expires (i.e., the second timer is considered as expired). Also, for the serving cell(s) (e.g., the primary cell and/or the secondary cell), in a case that the UE 102 does not detect the DCI format(s) indicating the DL BWP(s) and/or the DCI format(s) indicating the UL BWP(s) for the paired spectrum operation (e.g., for a total number of respective consecutive PDCCH monitoring periods, across all control resource sets the UE is configured for monitoring PDCCH in the active DL BWP equal to the value(s) of the second timer), the UE 102 may switch to the default DL BWP from the activated DL BWP. Also, in a case that the first activated DL BWP(s) is configured on the serving cell(s) (i.e., the primary cell and/or the secondary cell), the UE 102 may uses the indicated DL BWP on the serving cell(s) as the first activated DL BWP on the serving cell(s). Also, the UE 102 may not be expected to monitor the PDCCH in a case that the UE 102 performs measurements over a bandwidth that is not within the DL BWP for the UE 102.

Namely, in a case that the UE 102 detects the DCI format(s) indicating the activated BWP(s) (e.g., the DL BWP(s) and/or the UL BWP(s)), the UE 102 may initialize (e.g., start, (re)start) the second timer (e.g., the value(s) of the second timer). For example, in a case that the UE 102 detects the DCI format(s) indicating the activated BWP(s) within the second timer (e.g., running of the second timer), the UE 102 may initialize the second timer. For example, in a case that the UE 102 detects the DCI format(s) indicating the activation of BWP(s) within the second timer, the UE 102 may initialize the second timer associated the BWP(s) (e.g., the DL BWP(s) activated by using the DCI format(s), the UL BWP(s) activated by using the DCI format(s), and/or the UL BWP(s) paired with the DL BWP(s) activated by the DCI format(s)). Also, in a case that the UE 102 detects the DCI format(s) used for scheduling of the PDSCH in the BWP(s) (i.e., the DCI format(s) for the BWP(s)) within the timer, the UE 102 may initialize the second timer associated with the BWP(s) (e.g., the DL BWP(s) in which the PDSCH is scheduled and/or the UL BWP(s) paired with the DL BWP(s) in which the PDSCH is scheduled). Also, in a case the UE 102 detects the DCI format(s) used for scheduling of the PUSCH in the BWP(s) (i.e., the DCI format(s) for the BWP(s)) within the timer, the UE 102 may initialize the second timer associated with the BWP(s) (e.g., the UL BWP(s) in which the PUSCH is scheduled).

Here, the DCI format(s) detected by the UE 102 for initializing the second timer may be only the scheduling DCI format(s) (i.e., the DCI format A, the DCI format B, the DCI format D, and/or the DCI format E). Namely, only in a case that the UE 102 detects the scheduling DCI format(s) for the BWP(s) within the second timer, the UE 102 may initialize the second timer associated with the BWP(s). Namely, in a case that the UE 102 detects a DCI format(s) for the BWP(s) other than the scheduling DCI format(s) (as described above), the UE 102 may not initialize the second timer associated with the BWP(s). Also, in a case that the UE 102 detects the fallback DCI format(s) (i.e., the DCI format B and/or the DCI format E) for the BWP(s), the UE 102 may not initialize the second timer associated with the BWP(s). Namely, only in a case that the UE 102 detects the DCI format A and/or the DCI format D for the BWP(s), the UE 102 may initialize the second timer associated with the BWP(s).

Also, in a case that the UE 102 does not detect the DCI format(s) indicating the activated BWP(s) (e.g., the DL BWP(s) and/or the UL BWP(s)) within the second timer (e.g., in a case that the second timer is expired, the second timer is assumed to be expired), the UE 102 may switch to the default BWP(s) from the activated BWP(s). For example, in a case that the UE 102 does not detect the DCI format(s) used for scheduling of the PDSCH in the BWP(s) (i.e., the DCI format(s) for the BWP(s)), the UE 102 may switch to the default BWP(s) from the activated BWP(s). Also, in a case the UE 102 does not detect the DCI format(s) used for scheduling of the PUSCH in the BWP(s) (i.e., the DCI format(s) for the BWP(s)), the UE 102 may switch to the default BWP(s) from the activated BWP(s). Namely, in a case that the second timer expires (i.e., in a case that the second timer is considered as expired), the UE 102 may switch to the default BWP (the default DL BWP and/or the default UL BWP) from the activated BWP(s) (the activated DL BWP(s) and/or the activated UL BWP(s)).

Figure 6:
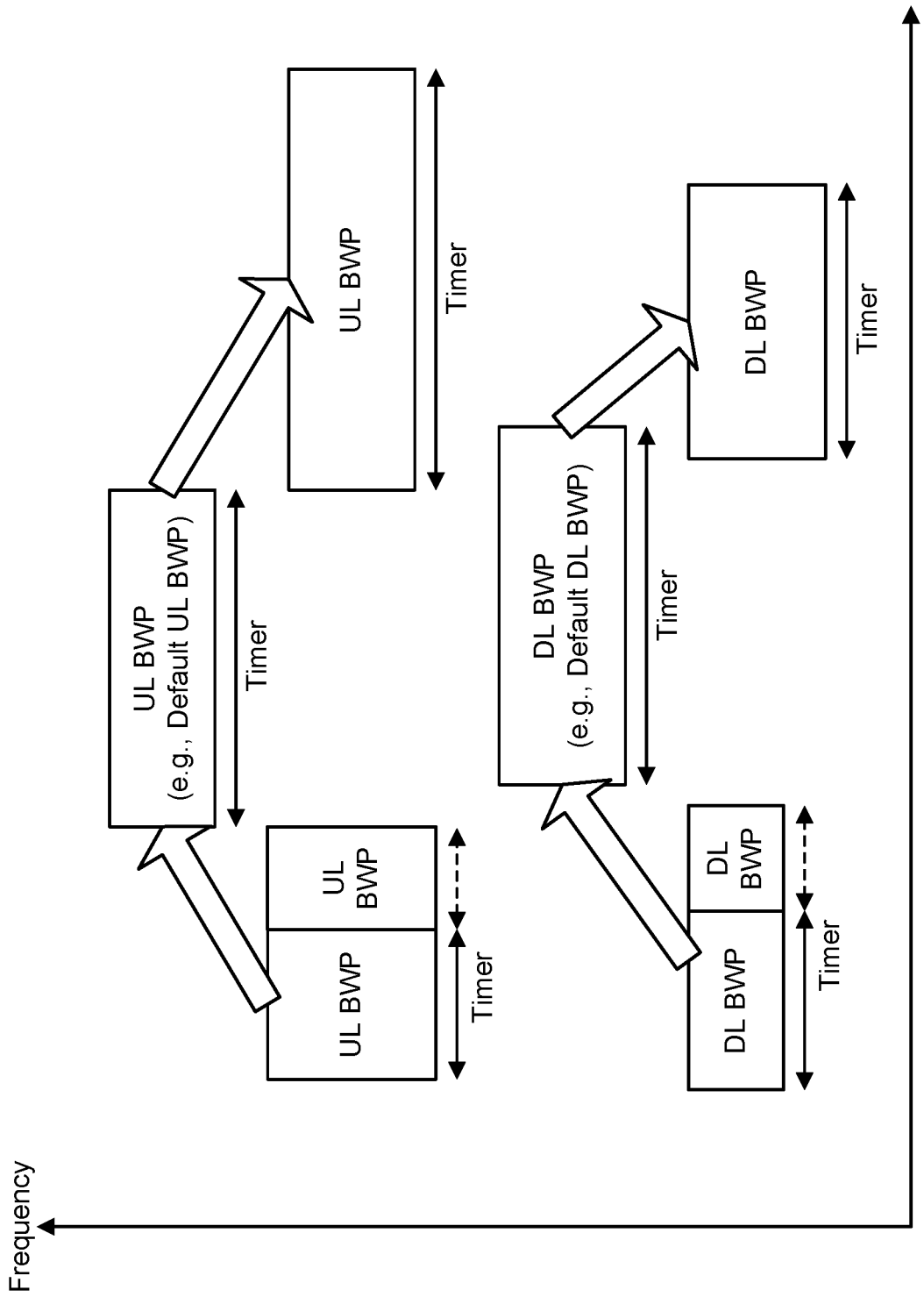
FIG. 6 illustrates another example of the downlink and/or uplink transmissions.

FIG. 6 illustrates another example of the downlink and/or uplink transmissions. Here, in a case that the UE 102 detects the DCI format(s) for the BWP(s) and the second timer associated with the BWP(s) is expired before the corresponding reception in the BWP(s) and/or the corresponding transmission in the BWP(s), the UE 102 may extend (e.g., expand) the second timer associated with the BWP(s). For example, in a case that UE 102 detects the DCI format(s) used for scheduling of the PDSCH in the DL BWP(s) (i.e., the DCI format(s) for the DL BWP(s)) and the second timer associated with the DL BWP(s) is expired before the reception on the PDSCH in the DL BWP(s), the UE 102 may extend the second timer associated with the DL BWP(s). Also, in a case that the UE 102 detects the DCI format(s) used for scheduling of the PDSCH in the DL BWP(s) (i.e., the DCI format(s) for the DL BWP(s)) and the second timer associated with the DL BWP(s) and/or the UL BWP(s) (e.g., the UL BWP(s) linked to the DL BWP(s)) is expired before the reception on the PDSCH in the DL BWP(s), the UE 102 may extend the second timer associated with the DL BWP(s) and/or the UL BWP(s) (e.g., the UL BWP(s) linked to the DL BWP(s)). Also, in a case that the UE 102 detects the DCI format(s) used for scheduling of the PUSCH in the UL BWP(s) (i.e., the DCI format(s) for the UL BWP(s)) and the second timer associated with the UL BWP(s) is expired before the transmission on the PUSCH in the UL BWP(s), the UE 102 may extend the second timer associated with the UL BWP(s).

Here, the DCI format(s) detected by the UE 102 for extending the second timer may be only the scheduling DCI format(s) (i.e., the DCI format A, the DCI format B, the DCI format D, and/or the DCI format E). Namely, only in a case that the UE 102 detects the scheduling DCI format(s) for the BWP(s) and the second timer is expired before the corresponding reception in the BWP(s) and/or the corresponding transmission in the BWP(s), the UE 102 may extend the second timer associated with the BWP(s). Namely, in a case that the UE 102 detects a DCI format(s) for the BWP(s) other than the scheduling DCI format(s) (as described above) and the second timer is expired before the corresponding reception in the BWP(s) and/or the corresponding transmission in the BWP(s), the UE 102 may not extend the second timer associated with the BWP(s). Also, in a case that the UE 102 detects the fallback DCI format(s) (i.e., the DCI format B and/or the DCI format E) for the BWP(s) and the second timer is expired before the corresponding reception in the BWP(s) and/or the corresponding transmission in the BWP(s), the UE 102 may not extend the second timer associated with the BWP(s). Namely, only in a case that the UE 102 detects the DCI format A and/or the DCI format D for the BWP(s) and the second timer is expired before the corresponding reception in the BWP(s) and/or the corresponding transmission in the BWP(s), the UE 102 may extend the second timer associated with the BWP(s).

Namely, in a case that the UE 102 detects the DCI format(s) for the BWP(s) and the second timer associated with the BWP(s) is expired before the corresponding reception in the BWP(s) and/or the corresponding transmission in the BWP(s), the UE 102 may not switch to the default BWP(s) from the activated BWP(s). Namely, in a case that the UE 102 detects the DCI format(s) for the BWP(s) and the second timer associated with the BWP(s) is expired before the corresponding reception in the BWP(s) and/or the corresponding transmission in the BWP(s), the UE 102 may initialize (e.g., reset, restart) the second timer associated with the BWP(s). Namely, in a case that the UE 102 detects the DCI format(s) for the BWP(s) and the second timer associated with the BWP(s) is expired before the corresponding reception in the BWP(s) and/or the corresponding transmission in the BWP(s), the UE 102 may initialize (e.g., reset, restart) the second timer associated with the BWP(s) and perform the corresponding reception in the BWP(s) and/or the corresponding transmission in the BWP(s). For example, in a case that the UE 102 detects the DCI format(s) for the DL BWP(s) and the second timer associated with the DL BWP(s) is expired before the reception on the PDSCH in the BWP(s), the UE 102 may initialize (e.g., reset, restart) the second timer associated with the DL BWP(s) and perform the reception on the PDSCH in the DL BWP. Also, in a case that the UE 102 detects the DCI format(s) for the UL BWP(s) and the second timer associated with the DL BWP(s) is expired before the transmission on the PUSCH in the BWP(s), the UE 102 may initialize (e.g., reset, restart) the second timer associated with the UL BWP(s) and perform the transmission on the PUSCH in the UL BWP.

Also, for example, in a case that the UE 102 detects (e.g., decode) the PDSCH in the BWP(s) and the second timer associated with the BWP(s) is expired before the transmission of the HARQ-ACK (i.e., the HARQ-ACK for the PDSCH) in the BWP(s), the UE 102 may extend (e.g., expand) the second timer associated with the BWP(s). Here, in a case that the UE 102 detects (e.g., decode) the PDSCH in the BWP(s) and the second timer associated with the BWP(s) is expired before the transmission of the HARQ-ACK (i.e., the HARQ-ACK for the PDSCH) in the BWP(s), the UE 102 may initialize (e.g., reset, restart) the second timer associated with the BWP(s). For example, in a case that the UE 102 detects (e.g., decode) the PDSCH in the DL BWP(s) and the second timer associated with the UL BWP(s) is expired before the transmission of the HARQ-ACK (i.e., the HARQ-ACK for the PDSCH) in the UL BWP(s), the UE 102 may initialize (e.g., reset, restart) the second timer associated with the UL BWP(s) and perform the transmission of the HARQ-ACK in the UL BWP(s).

Here, in a case that the UE 102 detects the DCI format(s) for the BWP(s) and the second timer associated with the BWP(s) is expired before the corresponding reception in the BWP(s) and/or the corresponding transmission in the BWP(s), the UE 102 may switch to the default BWP(s) from the BWP(s) (e.g., the activated BWP(s)) after the corresponding reception in the BWP(s) and/or the corresponding transmission in the BWP(s) is performed. Namely, in this case, the UE 102 may switch to the default BWP(s) from the BWP(s) (e.g., the activated BWP(s)) immediately after the corresponding reception in the BWP(s) and/or the corresponding transmission in the BWP(s) is performed. For example, in this case, the UE 102 may switch to the default DL BWP(s) from the DL BWP(s) (e.g., the activated BWP(s)) immediately after the PDSCH reception in the BWP(s) is performed. Also, in this case, the UE 102 may switch to the default DL BWP(s) and the default UL BWP(s) from the DL BWP(s) (e.g., the activated DL BWP(s)) and the UL BWP(s) (e.g., the activated UL BWP(s)) immediately after the PDSCH reception in the DL BWP(s) in the UL BWP(s) is performed. Also, in this case, the 102 may switch to the default UL BWP(s) from the UL BWP(s) (e.g., the activated UL BWP(s)) immediately after the PUSCH transmission in the UL BWP(s) is performed.

Also, in a case that the UE 102 detects (e.g., decode) the PDSCH in the BWP(s) (e.g., the active BWP(s)) and the second timer associated with the BWP(s) is expired before the transmission of the HARQ-ACK (i.e., the HARQ-ACK for the PDSCH) in the BWP(s), the UE 102 may switch to the default BWP(s) from the BWP(s) immediately after the transmission of the HARQ-ACK is performed.

Also, in a case that the UE 102 detects the DCI format(s) for the BWP(s) and the second timer associated with the BWP(s) is expired before the corresponding reception in the BWP(s) and/or the corresponding transmission in the BWP(s), the UE 102 may perform the corresponding reception in the default BWP(s) and/or the corresponding transmission on the default BWP(s). For example, in a case that UE 102 detects the DCI format(s) used for scheduling of the PDSCH in the DL BWP(s) (i.e., the DCI format(s) for the DL BWP(s)) and the second timer associated with the DL BWP(s) is expired before the reception on the PDSCH in the DL BWP(s), the UE 102 may perform the corresponding reception on the PDSCH in the default DL BWP(s). Also, in a case that the UE 102 detects the DCI format(s) used for scheduling of the PDSCH in the DL BWP(s) (i.e., the DCI format(s) for the DL BWP(s)) and the second timer associated with the DL BWP(s) and/or the UL BWP(s) (e.g., the UL BWP(s) linked to the DL BWP(s)) is expired before the corresponding reception on the PDSCH in the DL BWP(s), the UE 102 may perform the reception on the PDSCH in the default DL BWP(s). Also, in a case that the UE 102 detects the DCI format(s) used for scheduling of the PUSCH in the UL BWP(s) (i.e., the DCI format(s) for the UL BWP(s)) and the second timer associated with the UL BWP(s) is expired before the transmission on the PUSCH in the UL BWP(s), the UE 102 may perform the corresponding transmission on the PUSCH in the default UL BWP(s). Here, the default BWP(s) (e.g., the default DL BWP(s) and/or the default UL BWP(s)) may be activated. Namely, the default BWP(s) (e.g., the default DL BWP(s) and/or the default UL BWP(s)) may be activated based on (e.g., to perform) the reception on the PDSCH (e.g., the reception on the PDSCH scheduled by using the DCI format(s) received in the activated BWP (e.g., the activated BWP(s) other than the default BWP(s), the activated DL BWP(s)). Also, the default BWP(s) (e.g., the default UL BWP(s)) may be activated based on (e.g., to perform) the transmission on the PUSCH (e.g., the transmission on the PUSCH scheduled by using the DCI format(s) received in the activated BWP (e.g., the activated BWP(s) other than the default BWP(s), the activated DL BWP(s)).

Also, in a case that the UE 102 detects (e.g., decode) the PDSCH in the BWP(s) (e.g., the active BWP(s)) and the second timer associated with the BWP(s) is expired before the transmission of the HARQ-ACK (i.e., the HARQ-ACK for the PDSCH) in the BWP(s), the UE 102 may perform the corresponding transmission of the HARQ-ACK in the default UL BWP(s). Namely, the default BWP(s) (e.g., the default UL BWP(s)) may be activated based on (e.g., to perform) the transmission of the HARQ-ACK (e.g., the transmission of the HARQ-ACK for the PDSCH received in the activated BWP(s) (e.g., the activated BWP(s) other than the default BWP(s), the activated DL BWP(s))).

Here, as described above, the each of the BWPs may have different bandwidth. Namely, for example, the default BWP(s) and the activated BWP(s) (e.g., the activated BWP(s) other than the default BWP(s)) may have different bandwidth. Namely, in a case that the UE 102 switch to the default BWP(s) from the activated BWP(s) and the UE 102 perform the reception on the PDSCH in the default BWP(s), a reinterpretation for the resource block assignment (i.e., a value(s) of the resource block assignment filed(s), an index of the resource indicated by using the DCI format(s)) may be needed. For example, in a case that the bandwidth of the default BWP(s) is 50 MHz (e.g., the number of the PRBs is 50) and the bandwidth of the activated BWPs is 100 MHz (e.g., the number of the PRBs is 100), the resource block assignment indicating the index of 80 for the activated BWP may not be applied to the default BWP(s). Here, for example, as described above, in a case that the UE 102 detects the DCI format(s) for the BWP(s) and the second timer associated with the BWP(s) is expired before the corresponding reception in the BWP(s) and/or the corresponding transmission in the BWP(s), the UE 102 may reinterpret the index for the resource indicated by using the DCI format(s).

For example, in a case that the UE 102 perform the reception on the PDSCH in a DL BWP1 (e.g., the bandwidth of the DL BWP1 is 50 MHz, the default DL BWP) that is scheduled by using the DCI format(s) received in a DL BWP2 (e.g., the bandwidth of the DL BWP2 is 100 MHz), the UE 102 may determine, based on the bandwidth of the DL BWP1 and/or the bandwidth of the DL BWP2, the resource of the PDSCH (e.g., the index of the resource of the PDSCH) indicated by using the DCI format(s). Namely, the UE 102 may determine, based on the number of PRBs of the DL BWP1 (e.g., 50) and/or the number of PRBs of the DL BWP2 (e.g., 100), the resource of the PDSCH in the DL BWP1. For example, in a case that the bandwidth of the DL BWP1 is 50 MHz (e.g., the number of the PRBs is 50) and the bandwidth of the DL BWP2 is 100 MHz (e.g., the number of the PRBs is 100), the resource block assignment indicating the index of 80 for the DL BWP2 may be interpreted as the index of 40 in the DL BWP1. Namely, for example, a ratio of the bandwidth of the DL BWP1 and the bandwidth of the DL BWP2 may be used for determining the resource of the PDSCH (e.g., the index of the resource of the PDSCH).

Also, for example, in a case that the UE 102 perform the transmission on the PUSCH in a UL BWP1 (e.g., the bandwidth of the UL BWP1 is 50 MHz, the default UL BWP) that is scheduled by using the DCI format(s) used for scheduling of the PUSCH in a UL BWP2 (e.g., the bandwidth of the UL BWP2 is 100 MHz), the UE 102 may determine, based on the bandwidth of the UL BWP1 and/or the bandwidth of the UL BWP2, the resource of the PUSCH (e.g., the index of the resource of the PUSCH) indicated by using the DCI format(s). Namely, the UE 102 may determine, based on the number of PRBs of the UL BWP1 (e.g., 50) and/or the number of PRBs of the UL BWP2 (e.g., 100), the resource of the PUSCH in the UL BWP1. For example, in a case that the bandwidth of the UL BWP1 is 50 MHz (e.g., the number of the PRBs is 50) and the bandwidth of the UL BWP2 is 100 MHz (e.g., the number of the PRBs is 100), the resource block assignment indicating the index of 80 for the UL BWP2 may be interpreted as the index of 40 in the UL BWP1. Namely, for example, a ratio of the bandwidth of the UL BWP1 and the bandwidth of the UL BWP2 may be used for determining the resource of the PUSCH (e.g., the index of the resource of the PUSCH).

Also, for example, the UE 102 may perform, in a UL BWP1 (e.g., the bandwidth of the UL BWP1 is 50 MHz, the default UL BWP), the transmission of the HARQ-ACK for the PDSCH received in a UL BWP2 (e.g., the bandwidth of the UL BWP2 is 100 MHz). And, in this case, the UE 102 may determine, based on the bandwidth of the UL BWP1 and/or the bandwidth of the UL BWP2, the resource of the PUSCH in the UL BWP 1 and/or the PUCCH in the UL BWP1 (e.g., the index of the resource of the PUSCH in the UL BWP1 and/or the PUCCH in the BWP1) for the transmission of the HARQ-ACK. Namely, the UE 102 may determine, based on the number of PRBs of the UL BWP1 (e.g., 50) and/or the number of PRBs of the UL BWP2 (e.g., 100), the resource of the PUSCH in the UL BWP1 and/or the resource of the PUCCH. For example, in a case that the bandwidth of the UL BWP1 is 50 MHz (e.g., the number of the PRBs is 50) and the bandwidth of the UL BWP2 is 100 MHz (e.g., the number of the PRBs is 100), the resource block assignment indicating the index of 80 for the UL BWP2 may be interpreted as the index of 40 in the UL BWP1. Namely, for example, a ratio of the bandwidth of the UL BWP1 and the bandwidth of the UL BWP2 may be used for determining the resource of the PUSCH and/or the PUCCH (e.g., the index of the resource of the PUSCH and/or the PUCCH).

Here, as the uplink transmission (e.g., the transmission on the PUSCH), the transmission based on a configured grant may and the transmission based on a dynamic scheduling may be defined. Here, the transmission based on the configured grant may include the transmission on the PUSCH that is semi-persistently scheduled (i.e., the semi-persistent scheduling, UL SPS). Also, the transmission based on the configured grant may include the transmission on the PUSCH that is without a UL grant (i.e., the grant free scheduling, GF). Here, the transmission on the PUSCH without the UL grant may include Type 1 GF transmission and/or Type 2 GF transmission. Also, the Type 1 GF transmission and/or the Type 2 GF transmission may support a repetition (i.e., a repeat of the transmission). Namely, the transmission based on the configured grant may include the UL SPS transmission, the GF transmission (e.g., the Type 1 GF transmission and/or the Type 2 GF transmission).

For example, the UL SPS transmission may be supported based on the RRC configuration and an activation by using the DCI format(s) with the SPS C-RNTI. For example, the gNB 160 may configure, by using the RRC signal, a periodicity for the UL SPS transmission. Also, the gNB 16—may indicate, by using the DCI format(s) with the SPS C-RNTI, the activation for the UL SPS transmission. And, the UE 102 may perform the UL SPS transmission on the PUSCH. Also, the Type 1 GF transmission may be supported based on the RRC configuration. For example, the gNB 160 may configure, by using the RRC signal, a periodicity for the Type 1 GF transmission. And, the UE 102 may perform the Type 1 GF transmission (e.g., one or more repetitions) on the PUSCH. Also, the Type 2 GF transmission may be supported based on the RRC configuration and an activation by using the DCI format(s) with the GF C-RNTI. For example, the gNB 160 may configure, by using the RRC signal, a periodicity for the Type 2 GF transmission. Also, the gNB 16—may indicate, by using the DCI format(s) with the GF C-RNTI, the activation for the UL SPS transmission. And, the UE 102 may perform the Type 2 GF transmission on the PUSCH. Also, the transmission based on the dynamic scheduling may be supported based on the DCI format(s) with the C-RNTI. As described above, the UE 102 may perform the transmission on the PUSCH that is scheduled by using the DCI format(s) with the C-RNTI.

Here, the transmission based on the configured grant may be performed in one or more slots, and/or one or more symbol. Also, the transmission based on the dynamic scheduling may be performed in one or more slots, and/or one or more symbol. Here, a same timing may include coincide between the transmission based on the configured grant in the one or more slots and/or the one or more symbols and the transmission based on the dynamic scheduling in the one or more slots and/or the one or more symbols. Namely, the transmission based on the configured grant in the one or more slots and/or the one or more symbols and the transmission based on the dynamic scheduling in the one or more slots and/or the one or more symbols may be partially overlapped. Also, the transmission based on the configured grant in the one or more slots and/or the one or more symbols and the transmission based on the dynamic scheduling in the one or more slots and/or the one or more symbols may be partially overlapped.

And, in a case that the transmission based on the configured grant in the activate BWP1 (e.g., the default BWP) and the transmission based on the dynamic grant in the activate BWP2, the UE 102 may perform the transmission based on the dynamic grant in the activate BWP2. Namely, in a case that the transmission based on the configured grant in the activate BWP1 (e.g., the default BWP) and the transmission based on the dynamic grant in the activate BWP2, the UE 102 may drop the transmission based on the dynamic grant in the activate BWP1. Namely, the transmission based on the dynamic grant may be prioritized over the transmission based on the configured grant. Also, in a case that the transmission based on the configured grant in the activate BWP1 (e.g., the default BWP) and the transmission based on the dynamic grant in the activate BWP2, the UE 102 may perform the transmission based on the configured grant in the activate BWP1. Namely, in a case that the transmission based on the configured grant in the activate BWP1 (e.g., the default BWP) and the transmission based on the dynamic grant in the activate BWP2, the UE 102 may drop the transmission based on the dynamic grant in the activate BWP2. Namely, the transmission based on the configured grant may be prioritized over the transmission based on the dynamic grant.

Here, as described above, the gNB 160 may configure, by using a first message (e.g., the PBCH (e.g., the MIB), and/or the PDSCH (e.g., the SIB type 2 (i.e., the RMSI))), one or more information as described. Also, the gNB 160 may configure, by using a second message (e.g., the dedicated RRC message), the one more information (i.e., the same one or more information) as described. For example, as described above, the one more information may include the information used for configuring the CSS (e.g., the region of the CSS, the one or more CORESETs of the CSS). Also, the one or more information may include the information used for configuring the USS (e.g., the region of the USS, the one or more CORESETs of the USS). Also, the one or more information may include the information used for configuring the occasion(s) (e.g., the PDCCH monitoring periodicity, the PDCCH monitoring occasions(s)). Also, the one or more information may include the information used for configuring the serving cell(s). Also, the one or more information may include the information used for configuring the BWP(s). Also, the one or more information may include the information used for configuring the default BWP(s) and/or the initial activate BWP(s). Also, the one or more information may include the information used for configuring the one or more BWP(s) in the serving cell(s). Also, the information used for configuring the linkage between the UL BWP(s) and the DL BWP(s).

Here, in a case that the one or more information (e.g., a first value(s) of the one or more information) is configured by using the first message and the one or more information (e.g., a second value(s) of the one or more information) is configured by using the second message, the UE 102 may use the one or more information (e.g., the second value(s) of the one or more information) that is configured by using the second message. Namely, the first value(s) of the one or more information that is configured by using the first message may be overridden by the second value(s) of the one or more information that is configured by using the second message. Here, in a case that the information (e.g., the first value(s) of the one or more information) is configured by using the first message and no information (e.g., no second value(s) of the one or more information) is configured by using the second message, the UE 102 may use the one or more information (e.g., the first value(s) of the one or more information) that is configured by using the first message. Also, in a case that no information (e.g., the first value(s) of the one or more information) is configured by using the first message and the information (e.g., the second value(s) of the one or more information) is configured by using the second message, the UE 102 may use the one or more information (e.g., the second value(s) of the one or more information) that is configured by using the first message. Also, in a case that the one or more information (e.g., a first value(s) of the one or more information) is configured by using the first message and the one or more information (e.g., a second value(s) of the one or more information) is configured by using the second message, the UE 102 may use the one or more information (e.g., the first value(s) of the information) that is configured by using the first message. Namely, the second value(s) of the one or more information that is configured by using the second message may be overridden by the first value(s) of the one or more information that is configured by using the first message.

FIG. 7 illustrates examples of a CSI request field. As described above, the CSI request (i.e., the CSI request field(s)) may be included in the DCI format(s). Here, the CSI request may be used for requesting (e.g., instructing, indicating, triggering) the transmission of the CSI on the PUSCH and/or the PUCCH. Here, the transmission of the CSI requested by using the DCI format(s) may be referred as the aperiodic CSI report (i.e., the aperiodic CSI reporting). For example, the CSI request included in the DCI format(s) for the downlink may be used for requesting the transmission of the CSI on the PUCCH. Also, the CSI request included in the DCI format(s) for the uplink may be used for requesting the transmission of the CSI on the PUCCH. Also, the CSI request included in the DCI format(s) for the uplink may be used for requesting the transmission of the CSI on the PUSCH. For example, in a case that the CSI request (i.e., the CSI request field(s)) is set to trigger (e.g., set to a positive CSI request) the aperiodic CSI report, the UE 102 may perform the aperiodic CSI reporting using the PUSCH and/or the PUCCH. For example, based on the detection of the DCI format(s) in a slot n, the UE 102 may perform the aperiodic CSI reporting using the PUSCH and/or the PUCCH in a slot n+Y. Here, the value(s) of Y may be indicated by using the DCI format(s). Namely, information used for indicating the value of Y may be included in the DCI format(s) (e.g., the DCI format A, the DCI format B, the DCI format C, the DCI format D, the DCI format E and/or the DCI format F). Here, for the DCI format B, the DCI format C, the DCI format E and/or the DCI format F, the value of Y may defined as a predetermined value(s) (i.e., Y=4). Here, the predetermined value(s) for Y may be specified, in advance, by the specification, and known information between the gNB 160 and the UE 102.

Here, the gNB 160 may configure by using the higher layer signal more than one values (e.g., more than one values for Y), and indicate by using the DCI format(s) one value of Y from among the more than one values. For example, the gNB 160 may transmit the higher layer signal (e.g., the RRC message) including information used for configuring the more than one values (e.g., four values for Y). Furthermore, the gNB 160 may transmit the DCI format(s) (i.e., the DCI format(s) including the CSI request field(s) set to trigger the aperiodic CSI report) including information used for indicating the one value of Y from among the more than one values (e.g., the four values for Y). And, the UE 102 may perform, based on the one value of Y indicated from the more than one values, the aperiodic CSI reporting using the PUSCH and/or the PUCCH in a slot n+Y.

Here, the information used for configuring the more than one values (e.g., the more than one values for Y) may be configured per serving cell. Namely, the information used for configuring the more than one values (e.g., the more than one values for Y) may be configured for each of the serving cells (e.g., each of the primary cell and the one or more secondary cells). Also, the information used for configuring the more than one values (e.g., the more than one values for Y) may be configured per BWP (e.g., per BWP in a serving cell). Namely, the information used for configuring the more than one values (e.g., the more than one values for Y) may be configured for each of BWPs in a serving cell. Also, the information used for configuring the more than one values (e.g., the more than one values for Y) may be configured per DCI format. For example, the information used for configuring the more than one values (e.g., the more than one values for Y) may be configured for each of the DCI formats (e.g., the DCI format A, the DCI format B, the DCI format C, the DCI format E, and/or the DCI format E). Namely, information used for configuring the more than one values (e.g., the more than one values for Y) may be configured for the each of the serving cells, the each of the BWPs, and/or the each of the DCI formats.

Here, in a case that the DCI format(s) (i.e., the DCI format(s) including the CSI request field(s) set to trigger the aperiodic report) for a serving cell is received (e.g., decoded, detected), the UE 102 may perform the aperiodic CSI reporting using the PUSCH and/or the PUCCH on the serving cell. Also, in a case that the DCI format(s) (i.e., the DCI format(s) including the CSI request field(s) set to trigger the aperiodic report) for a BWP (e.g., the DL BWP in a serving cell and/or the UL BWP in a serving cell) is received, the UE 102 may perform the aperiodic CSI reporting using the PUSCH and/or the PUCCH on the BWP (e.g., the UL BWP in the serving cell). Here, the CSI (e.g., aperiodic CSI report and/or periodic CSI report) may be transmitted on only an activated BWP(s) (e.g., the activated UL BWP(s) in the activated serving cell(s)). For example, in a case that the DCI format D for a BWP (e.g., the DL BWP and/or the UL BWP) in a serving cell is received, the UE 102 may perform the aperiodic CSI reporting using the PUSCH on the BWP (e.g., the UL BWP) in the serving cell. Also, in a case that the DCI format A and/or the DCI format D for a BWP (e.g., the DL BWP and/or the UL BWP) in a serving cell is received, the UE 102 may perform the aperiodic CSI reporting using the PUCCH on the BWP (e.g., the UL BWP) in the serving cell.

Also, in a case that the DCI format(s) (i.e., the DCI format(s) including the CSI request field(s) set to trigger the aperiodic report) for a BWP (e.g., the DL BWP in a serving cell and/or the UL BWP in a serving cell) is received, the UE 102 may perform the aperiodic CSI reporting using the PUSCH and/or the PUCCH on the default BWP (e.g., the default UL BWP in the serving cell). For example, in a case that the DCI format D for a BWP (e.g., the DL BWP and/or the UL BWP) in a serving cell is received, the UE 102 may perform the aperiodic CSI reporting using the PUSCH on the default BWP (e.g., the default UL BWP) in the serving cell. Also, in a case that the DCI format A and/or the DCI format D for a BWP (e.g., the DL BWP and/or the UL BWP) in a serving cell is received, the UE 102 may perform the aperiodic CSI reporting using the PUCCH on the default BWP (e.g., the default UL BWP) in the serving cell. Also, in a case that the DCI format E for a BWP (e.g., the DL BWP and/or the UL BWP) in a serving cell is received, the UE 102 may perform the aperiodic CSI reporting using the PUSCH on the default BWP (e.g., the default UL BWP) in the serving cell. Also, in a case that the DCI format B and/or the DCI format E for a BWP (e.g., the DL BWP and/or the UL BWP) in a serving cell is received, the UE 102 may perform the aperiodic CSI reporting using the PUCCH on the default BWP (e.g., the default UL BWP) in the serving cell. Also, in a case that the DCI format F for a BWP (e.g., the DL BWP and/or the UL BWP) in a serving cell is received, the UE 102 may perform the aperiodic CSI reporting using the PUSCH on the default BWP (e.g., the default UL BWP) in the serving cell. Also, in a case that the DCI format C and/or the DCI format F for a BWP (e.g., the DL BWP and/or the UL BWP) in a serving cell is received, the UE 102 may perform the aperiodic CSI reporting using the PUCCH on the default BWP (e.g., the default UL BWP b) in the serving cell.

Also, in a case that the DCI format(s) (i.e., the DCI format(s) including the CSI request field(s) set to trigger the aperiodic report) for a BWP (e.g., the initial active DL BWP in a serving cell, the DL BWP in a serving cell, the initial active UL BWP in a serving cell, and/or the UL BWP in a serving cell) is received, the UE 102 may perform the aperiodic CSI reporting using the PUSCH and/or the PUCCH on the initial active BWP (e.g., the initial active UL BWP in the serving cell). For example, in a case that the DCI format D for a BWP (e.g., the initial active DL BWP, the DL BWP, the initial active UL BWP, and/or the UL BWP) in a serving cell is received, the UE 102 may perform the aperiodic CSI reporting using the PUSCH on the initial active BWP (e.g., the initial active UL BWP) in the serving cell. For example, in a case that the DCI format A and/or the DCI format D for a BWP (e.g., the initial active DL BWP, the DL BWP, the initial active UL BWP, and/or the UL BWP) in a serving cell is received, the UE 102 may perform the aperiodic CSI reporting using the PUCCH on the initial active BWP (e.g., the initial active UL BWP) in the serving cell. Also, in a case that the DCI format E for a BWP (e.g., the initial active DL BWP, the DL BWP, the initial active UL BWP, and/or the UL BWP) in a serving cell is received, the UE 102 may perform the aperiodic CSI reporting using the PUSCH on the initial active BWP (e.g., the initial active UL BWP) in the serving cell. Also, in a case that the DCI format B and/or the DCI format E for a BWP (e.g., the initial active DL BWP, the DL BWP, the initial active UL BWP, and/or the UL BWP) in a serving cell is received, the UE 102 may perform the aperiodic CSI reporting using the PUCCH on the initial active BWP (e.g., the initial active UL BWP) in the serving cell. Also, in a case that the DCI format F for a BWP (e.g., the initial active DL BWP, the DL BWP, the initial active UL BWP, and/or the UL BWP) in a serving cell is received, the UE 102 may perform the aperiodic CSI reporting using the PUSCH on the initial active BWP (e.g., the initial active UL BWP) in the serving cell. Also, in a case that the DCI format C and/or the DCI format F for a BWP (e.g., the initial active DL BWP, the DL BWP, the initial active UL BWP, and/or the UL BWP) in a serving cell is received, the UE 102 may perform the aperiodic CSI reporting using the PUCCH on the initial active BWP (e.g., the initial active UL BWP) in the serving cell.

As described above, the aperiodic CSI (i.e., the aperiodic CSI report) may be transmitted using the PUSCH and/or the PUCCH on the serving cell. Also, the aperiodic CSI may be transmitted using the PUSCH and/or the PUCCH on the BWP (e.g., the activated BWP, the default BWP, and/or the initial active BWP) in a serving cell. Also, for example, the aperiodic CSI may be transmitted using a scheduled resource of the PUSCH and/or a scheduled resource of the PUCCH. Namely, the UE 102 may use the resource of the PUSCH that is scheduled by using the DCI format(s) (i.e., the corresponding DCI format(s) including the CSI request field(s) set to trigger the aperiodic report) to perform the aperiodic CSI reporting. Also, the UE 102 may use the resource of the PUCCH that is scheduled by using the DCI format(s) (i.e., the corresponding DCI format(s) including the CSI request field(s) set to trigger the aperiodic report) to perform the aperiodic CSI reporting.

For example, in a case that the DCI format D (i.e., including the CSI request field set to trigger the aperiodic report) is received, the UE 102 may perform the aperiodic CSI reporting using the scheduled resource of the PUSCH on the BWP in a serving cell. Also, in a case that the DCI format A and/or the DCI format D (i.e., including the CSI request field set to trigger the aperiodic report) is received, the UE 102 may perform the aperiodic CSI reporting using the scheduled resource of the PUCCH on the BWP in a serving cell. Also, in a case that the DCI format E (i.e., including the CSI request field set to trigger the aperiodic report) is received, the UE 102 may perform the aperiodic CSI reporting using the scheduled resource of the PUSCH on the BWP in a serving cell. Also, in a case that the DCI format B and/or the DCI format E (i.e., including the CSI request field set to trigger the aperiodic report) is received, the UE 102 may perform the aperiodic CSI reporting using the scheduled resource of the PUCCH on the BWP in a serving cell. Here, as described above, the BWP may include the activated BWP (e.g., the activated UL BWP), the default BWP (e.g., the default UL BWP), and/or the initial active BWP (e.g., the initial active UL BWP).

Also, for example, the aperiodic CSI may be transmitted using a configured resource of the PUSCH and/or a configured resource of the PUCCH. Namely, for example, the UE 102 may use the resource of the PUSCH that is configured by using the higher layer signal (e.g., the RRC message) to perform the aperiodic CSI reporting. Also, the UE 102 may use the resource of the PUCCH that is configured by using the higher layer signal (e.g., the RRC message) to perform the aperiodic CSI reporting. Namely, the gNB 160 may transmit the higher layer signal (e.g., the RRC message) including information used for configuring the resource of the PUSCH that is used for transmitting the aperiodic CSI (i.e., the aperiodic CSI reporting).

Here, the information used for configuring the resource of the PUSCH may be configured per serving cell. Namely, the information used for configuring the resource of the PUSCH may be configured for each of the serving cells (e.g., each of the primary cell and the one or more secondary cells). Also, the information used for configuring the resource of the PUSCH may be configured per BWP (e.g., per BWP in a serving cell). Namely, the information used for configuring the resource of the PUSCH may be configured for each of BWPs in a serving cell. Also, the information used for configuring the resource of the PUSCH may be configured per DCI format. For example, the information used for configuring the resource of the PUSCH may be configured for each of the DCI formats (e.g., the DCI format A, the DCI format B, the DCI format C, the DCI format E, and/or the DCI format E). Namely, information used for configuring the resources of the PUSCH may be configured for the each of the serving cells, the each of the BWPs, and/or the each of the DCI formats.

Also, the gNB 160 may transmit the higher layer signal (e.g., the RRC message) including information used for configuring the resource of the PUCCH that is used for transmitting the aperiodic CSI (i.e., the aperiodic CSI reporting). Here, the information used for configuring the resource of the PUCCH may be configured per serving cell. Namely, the information used for configuring the resource of the PUCCH may be configured for each of the serving cells (e.g., each of the primary cell and the one or more secondary cells). Also, the information used for configuring the resource of the PUCCH may be configured per BWP (e.g., per BWP in a serving cell). Namely, the information used for configuring the resource of the PUCCH may be configured for each of BWPs in a serving cell. Also, the information used for configuring the resource of the PUCCH may be configured per DCI format. For example, the information used for configuring the resource of the PUCCH may be configured for each of the DCI formats (e.g., the DCI format A, the DCI format B, the DCI format C, the DCI format E, and/or the DCI format E). Namely, information used for configuring the resources of the PUCCH may be configured for the each of the serving cells, the each of the BWPs, and/or the each of the DCI formats.

For example, in a case that the DCI format D (i.e., including the CSI request field set to trigger the aperiodic report) is received, the UE 102 may perform the aperiodic CSI reporting using the configured resource of the PUSCH on the BWP in a serving cell. Also, in a case that the DCI format A and/or the DCI format D (i.e., including the CSI request field set to trigger the aperiodic report) is received, the UE 102 may perform the aperiodic CSI reporting using the configured resource of the PUCCH on the BWP in a serving cell. Also, in a case that the DCI format E (i.e., including the CSI request field set to trigger the aperiodic report) is received, the UE 102 may perform the aperiodic CSI reporting using the configured resource of the PUSCH on the BWP in a serving cell. Also, in a case that the DCI format B and/or the DCI format E (i.e., including the CSI request field set to trigger the aperiodic report) is received, the UE 102 may perform the aperiodic CSI reporting using the configured resource of the PUCCH on the BWP in a serving cell. Also, in a case that the DCI format F (i.e., including the CSI request field set to trigger the aperiodic report) is received, the UE 102 may perform the aperiodic CSI reporting using the configured resource of the PUSCH on the BWP in a serving cell. Also, in a case that the DCI format C and/or the DCI format F (i.e., including the CSI request field set to trigger the aperiodic report) is received, the UE 102 may perform the aperiodic CSI reporting using the configured resource of the PUCCH on the BWP in a serving cell. Here, as described above, the BWP may include the activated BWP (e.g., the activated UL BWP), the default BWP (e.g., the default UL BWP), and/or the initial active BWP (e.g., the initial active UL BWP).

Also, the gNB 160 may configure by using the higher layer signal more than one resources, and indicate by using the DCI format(s) one resource from among the more than one resources. For example, the gNB 160 may transmit the higher layer signal (e.g., the RRC message) including information used for configuring the more than one resources of the PUSCH (e.g., four resources of the PUSCH). Furthermore, the gNB 106 may transmit the DCI format(s) including information used for indicating the one resource of the PUSCH from among the more than one resources of the PUSCH (e.g., the four resources of the PUSCH). And, the UE 102 may perform the aperiodic CSI reporting using the one resource of the PUSCH that is indicated by using the DCI format(s). Namely, the DCI format(s) may include the information used for indicating, from among the more than one resources of the PUSCH, the one resource of the PUSCH.

Here, the information used for configuring the more than one resources of the PUSCH (e.g., the four resources of the PUSCH) may be configured per serving cell. Namely, the information used for configuring the more than one resources of the PUSCH (e.g., the four resources of the PUSCH) may be configured for each of the serving cells (e.g., each of the primary cell and the one or more secondary cells). Also, the information used for configuring the more than one resources of the PUSCH (e.g., the four resources of the PUSCH) may be configured per BWP (e.g., per BWP in a serving cell). Namely, the information used for configuring the more than one resources of the PUSCH (e.g., the four resources of the PUSCH) may be configured for each of BWPs in a serving cell. Also, the information used for configuring the more than one resources of the PUSCH (e.g., the four resources of the PUSCH) may be configured per DCI format. For example, the information used for configuring the more than resources of the PUSCH (e.g., the four resources of the PUSCH) may be configured for each of the DCI formats (e.g., the DCI format A, the DCI format B, the DCI format C, the DCI format E, and/or the DCI format E). Namely, information used for configuring the more than one resources of the PUSCH (e.g., the four resources of the PUSCH) may be configured for the each of the serving cells, the each of the BWPs, and/or the each of the DCI formats.

Also, for example, the gNB 160 may transmit the higher layer signal (e.g., the RRC message) including information used for configuring more than one resources of the PUCCH (e.g., four resources of the PUCCH). Furthermore, the gNB 106 may transmit the DCI format(s) including information used for indicating one resource of the PUCCH from among the more than one resources of the PUCCH (e.g., the four resources of the PUCCH). And, a UE 102 may perform the aperiodic CSI reporting using the one resource of the PUCCH that is indicated by using the DCI format(s). Namely, the DCI format(s) may include the information used for indicating, from among the more than one resources of the PUCCH, the one resource of the PUCCH.

Here, the information used for configuring the more than one resources of the PUCCH (e.g., the four resources of the PUCCH) may be configured per serving cell. Namely, the information used for configuring the more than one resources of the PUCCH (e.g., the four resources of the PUCCH) may be configured for each of the serving cells (e.g., each of the primary cell and the one or more secondary cells). Also, the information used for configuring the more than one resources of the PUCCH (e.g., the four resources of the PUCCH) may be configured per BWP (e.g., per BWP in a serving cell). Namely, the information used for configuring the more than one resources of the PUCCH (e.g., the four resources of the PUCCH) may be configured for each of BWPs in a serving cell. Also, the information used for configuring the more than one resources of the PUCCH (e.g., the four resources of the PUCCH) may be configured per DCI format. For example, the information used for configuring the more than resources of the PUCCH (e.g., the four resources of the PUCCH) may be configured for each of the DCI formats (e.g., the DCI format A, the DCI format B, the DCI format C, the DCI format E, and/or the DCI format E). Namely, information used for configuring the more than one resources of the PUCCH (e.g., the four resources of the PUCCH) may be configured for the each of the serving cells, the each of the BWPs, and/or the each of the DCI formats.

For example, in a case that the DCI format D (i.e., including the CSI request field set to trigger the aperiodic report) is received, the UE 102 may perform the aperiodic CSI reporting using the one resource of the PUSCH (i.e., the one resource of the PUSCH that is indicated from among the more than one resources of the PUSCH) on the BWP in a serving cell. Also, in a case that the DCI format A and/or the DCI format D (i.e., including the CSI request field set to trigger the aperiodic report) is received, the UE 102 may perform the aperiodic CSI reporting using the one resource of the PUCCH (i.e., the one resource of the PUCCH that is indicated from among more than one resources of the PUCCH) on the BWP in a serving cell. Also, in a case that the DCI format E (i.e., including the CSI request field set to trigger the aperiodic report) is received, the UE 102 may perform the aperiodic CSI reporting using the one resource of the PUSCH (i.e., the one resource of the PUSCH that is indicated from among more than one resources of the PUSCH) on the BWP in a serving cell. Also, in a case that the DCI format B and/or the DCI format E (i.e., including the CSI request field set to trigger the aperiodic report) is received, the UE 102 may perform the aperiodic CSI reporting using the one resource of the PUCCH (i.e., the one resource of the PUCCH that is indicated from among the more than one resources of the PUCCH) on the BWP in a serving cell. Also, in a case that the DCI format F (i.e., including the CSI request field set to trigger the aperiodic report) is received, the UE 102 may perform the aperiodic CSI reporting using the one resource of the PUSCH (i.e., the one resource of the PUSCH that is indicated from among the more than one resources of the PUSCH) on the BWP in a serving cell. Also, in a case that the DCI format C and/or the DCI format F (i.e., including the CSI request field set to trigger the aperiodic report) is received, the UE 102 may perform the aperiodic CSI reporting using the one resource of the PUCCH (i.e., the one resource of the PUCCH that is indicated from the more than one resources of the PUCCH) on the BWP in a serving cell. Here, as described above, the BWP may include the activated BWP (e.g., the activated UL BWP), the default BWP (e.g., the default UL BWP), and/or the initial active BWP (e.g., the initial active UL BWP).

Also, for example, the aperiodic CSI may be transmitted using a resource of the PUSCH that is determined based on the CORESET of the PDCCH (e.g., an index of the CORE- SET (e.g., a number of the CORESET) of the PDCCH, the lowest index of the CORESET (e.g., the smallest number of the CORESET, the number of the first CORESET) of the PDCCH, a position(s) of the CORESET of the PDCCH). Also, the aperiodic CSI may be transmitted using a resource of the PUCCH that is determined based on the CORESET of the PDCCH (e.g., an index of the CORESET (e.g., a number of the CORESET) of the PDCCH, the lowest index of the CORESET (e.g., the smallest number of the CORESET, the number of the first CORESET) of the PDCCH, a position(s) of the CORESET of the PDCCH).

Also, the aperiodic CSI may be transmitted using a resource of the PUSCH that is determined based on a control channel element(s) of the PDCCH (e.g., an index of the control channel element(s) (e.g., a number of the control channel element) of the PDCCH, the lowest index of the control channel element(s) (e.g., the smallest number of the control channel element(s), the number of the first control channel element(s)) of the PDCCH, a position(s) of the control channel element(s) of the PDCCH). Also, the aperiodic CSI may be transmitted using a resource of the PUCCH that is determined based on the control channel element(s) of the PDCCH (e.g., an index of the control channel element(s) (e.g., a number of the control channel element(s)) of the PDCCH, the lowest index of the control channel element(s) (e.g., the smallest number of the control channel element(s), the number of the first control channel element(s)) of the PDCCH, a position(s) of the control channel element(s) of the PDCCH).

Also, the aperiodic CSI may be transmitted using a resource of the PUSCH that is determined based on a search space(s) of the PDCCH (e.g., an index of the search space(s) (e.g., a number of the search space(s)) of the PDCCH, the lowest index of the search space(s) (e.g., the smallest number of the search space(s), the number of the first search space(s)) of the PDCCH, a position(s) of the search space(s) of the PDCCH). Also, the aperiodic CSI may be transmitted using a resource of the PUCCH that is determined based on the search space(s) of the PDCCH (e.g., an index of the search space(s) (e.g., a number of the search space(s)) of the PDCCH, the lowest index of the search space(s) (e.g., the smallest number of the search space(s), the number of the first search space(s)) of the PDCCH, a position(s) of the search space(s) of the PDCCH). Here, the PDCCH may include the PDDCH used for transmitting the DCI format(s) (i.e., the DCI format(s) including the CSI request set to trigger the aperiodic CSI report). Also, the search space may include the UE-specific search space and/or the common search space (i.e., the UE-common search space).

Namely, the resource of the PUSCH used for the aperiodic CSI reporting may be determined based on the PDCCH (e.g., the CORESET of the PDCCH, the control channel element(s) of the PDCCH, and/or the search space of the PDCCH). Here, the resource of the PUSCH used for the aperiodic CSI reporting may be determined based on the PDCCH and information configured by using the higher layer signal (e.g., the RRC message). For example, the gNB 160 may transmit the higher layer signal including information used for configuring a value(s) that is used for determining the resource of the PUSCH. And, the UE 102 may determine the resource of the PUSCH based on the PDCCH and the value(s) that is configured by using the higher layer signal. Namely, the resource of the PUSCH used for the aperiodic CSI reporting may be determined based on the PDCCH and the value(s) configured by using the higher layer signal.

Here, the information used for configuring the value(s) may be configured per serving cell. Namely, the information used for configuring the value(s) may be configured for each of the serving cells (e.g., each of the primary cell and the one or more secondary cells). Also, the information used for configuring the value(s) may be configured per BWP (e.g., per BWP in a serving cell). Namely, the information used for configuring the value(s) may be configured for each of BWPs in a serving cell. Also, the information used for configuring the value(s) may be configured per DCI format. For example, the information used for configuring the value(s) may be configured for each of the DCI formats (e.g., the DCI format A, the DCI format B, the DCI format C, the DCI format E, and/or the DCI format E). Namely, information used for configuring the value(s) may be configured for the each of the serving cells, the each of the BWPs, and/or the each of the DCI formats.

Also, the resource of the PUCCH used for the aperiodic CSI reporting may be determined based on the PDCCH (e.g., the CORESET of the PDCCH, the control channel element(s) of the PDCCH, and/or the search space of the PDCCH). Here, the resource of the PUCCH used for the aperiodic CSI reporting may be determined based on the PDCCH and information configured by using the higher layer signal (e.g., the RRC message). For example, the gNB 160 may transmit the higher layer signal including information used for configuring a value(s) that is used for determining the resource of the PUCCH. And, the UE 102 may determine the resource of the PUCCH based on the PDCCH and the value(s) that is configured by using the higher layer signal. Namely, the resource of the PUCCH used for the aperiodic CSI reporting may be determined based on the PDCCH and the value(s) configured by using the higher layer signal.

Here, the information used for configuring the value(s) may be configured per serving cell. Namely, the information used for configuring the value(s) may be configured for each of the serving cells (e.g., each of the primary cell and the one or more secondary cells). Also, the information used for configuring the value(s) may be configured per BWP (e.g., per BWP in a serving cell). Namely, the information used for configuring the value(s) may be configured for each of BWPs in a serving cell. Also, the information used for configuring the value(s) may be configured per DCI format. For example, the information used for configuring the value(s) may be configured for each of the DCI formats (e.g., the DCI format A, the DCI format B, the DCI format C, the DCI format E, and/or the DCI format E).

Here, a size of the CSI request field(s) included in the DCI format(s) may be 1-bit, 2-bit, and/or 3-bit. Hereinafter, 1-bit CSI request field, 2-bit CSI request field, and/or 3-bit CSI request field is described as an example of the size of the CSI request field(s), however different size(s) of the CSI request field(s) is not precluded in the systems and methods herein.

For example, the size of the CSI request field(s) included in the DCI format(s) may be determined based on the number of the configured serving cell(s), the number of the configured BWP(s), the DCI format(s) (i.e., the DCI format(s) including the CSI request field(s)), and/or the search space in which the DCI format(s) is detected (e.g., decoded, received, mapped onto). For example, in a case that no more than five DL serving cells is configured and more than one DL serving cell is configured and the DCI format(s) is mapped onto the UE-specific search space, 2-bit field may be applied. Also, in a case that more than five DL serving cell is configured and the DCI format (s) is mapped onto the UE-specific search space, 3-bit field may be applied. Also, in a case that one DL serving cell is configured and/or the DCI format(s) is mapped onto the common search space (i.e., UE-common search space), 1-bit field may be applied. Here, the UE-specific search space may be given by using the C-RNTI.

Also, for example, in a case that more than one BWP (e.g., more than one DL BWP) is configured and/or the DCI format(s) is mapped onto the UE-specific search space, 2-bit field may be applied. Also, in a case that the one BWP (e.g., one DL BWP) is configured and/or the DCI format(s) is mapped onto the common search space (i.e., the UE-common search space), 1-bit field may be applied. Also, in a case that the detected DCI format including the CSI request field(s) set to trigger the aperiodic CSI report is the DCI format A and/or the DCI format D, 1-bit field, 2-bit field, and/or 3-bit field may be applied. Also, in a case that the detected DCI format including the CSI request field(s) set to trigger the aperiodic CSI report is the DCI format B and/or the DCI format E, only 1-bit field and/or 2-bit field may be applied. Also, in a case that the detected DCI format including the CSI request field(s) set to trigger the aperiodic CSI report is the DCI format C and/or the DCI format F, only 1-bit field and/or 2-bit field may be applied.

Here, in a case that the size of the CSI request field(s) is 1-bit, the aperiodic CSI report may be triggered for a serving cell. Here, the triggering of the aperiodic CSI report for the serving cell may be a triggering of the aperiodic CSI report for the serving cell in which the PDSCH and/or the PUSCH is scheduled. For example, in a case that the CSI request field(s) is set to trigger the aperiodic CSI report (e.g., the 1-bit CSI request field(s) is set to trigger the aperiodic CSI report), the UE 102 may perform the aperiodic CSI reporting for the DL serving cell in which the PDSCH is scheduled. Also, in a case that the CSI request field(s) is set to trigger the aperiodic CSI report (e.g., the 1-bit CSI request field(s) is set to trigger the aperiodic CSI report), the UE 102 may perform the aperiodic CSI reporting for the DL serving cell corresponding to the UL serving cell in which the PUSCH is scheduled.

Also, in a case that the CSI request field(s) is set to trigger the aperiodic CSI report (e.g., the 1-bit CSI request field(s) is set to trigger the aperiodic CSI report), the aperiodic CSI report may be triggered for a BWP. Here, the triggering of the aperiodic CSI report for the BWP may be a triggering of the aperiodic CSI report for the BWP in which the PDSCH and/or the PUSCH is scheduled. For example, in a case that the CSI request field(s) is set to trigger the aperiodic CSI report (e.g., the 1-bit CSI request field(s) is set to trigger the aperiodic CSI report), the UE 102 may perform the aperiodic CSI reporting for the DL BWP in which the PDSCH is scheduled. Also, in a case that the CSI request field(s) is set to trigger the aperiodic CSI report (e.g., the 1-bit CSI request field(s) is set to trigger the aperiodic CSI report), the UE 102 may perform the aperiodic CSI reporting for the DL BWP corresponding to (paired with, linked to) the UL BWP in which the PUSCH is scheduled. Here, the triggering of the aperiodic CSI report for the BWP(s) may be a triggering of the aperiodic CSI report for the BWP(s) for which the activation, the deactivation, and/or the switching is indicated. As described above, the DCI format(s) (e.g., the DCI format(s) including the CSI request field(s) set to trigger the aperiodic CSI report) may be used for activating, deactivating, and/or switching of the BWP(s). Namely, for example, in a case that the CSI request field(s) is set to trigger the aperiodic CSI report (e.g., the 1-bit CSI request field(s) is set to trigger the aperiodic CSI report), the UE 102 may perform the aperiodic CSI report for the DL BWP(s) for which the activation, the deactivation, and/or the switching is indicated. Also, in a case that the CSI request field(s) is set to trigger the aperiodic CSI report (e.g., the 1-bit CSI request field(s) is set to trigger the aperiodic CSI report), the UE 102 may perform the aperiodic CSI reporting for the DL BWP(s) corresponding to (paired with, linked to) the UL BWP(s) for which the activation, the deactivation, and/or the switching is indicated.

An example of a 2-bit CSI request field is illustrated in FIG. 7(a). In a case that the size of the CSI request field(s) is 2-bit, the aperiodic CSI report may be triggered based on a value(s) (i.e., a value(s) of the CSI request field(s)) corresponding to the aperiodic CSI reporting. For example, in a case that the value(s) of the CSI request field(s) is "00" (e.g., the CSI request field(s) is set to a first value(s)), the aperiodic CSI report may not be triggered. Also, in a case that the value(s) of the CSI request field(s) is "01" (e.g., the CSI request field(s) is set to a second value(s)), the aperiodic CSI report may be triggered for the serving cell. Also, in a case that the value(s) of the CSI request field(s) is "10" (e.g., the CSI request field(s) is set to a third value(s)), the aperiodic CSI report may be triggered for a first set of one or more serving cells that is configured by using the higher layer signal (e.g., the RRC message). Also, in a case that the value(s) of the CSI request field(s) is "11" (e.g., the CSI request field(s) is set to a fourth value(s)), the aperiodic CSI report may be triggered for a second set of one or more serving cells that is configured by using the higher layer signal (e.g., the RRC message). Namely, the UE 102 may perform, based on the information configured by using the higher layer and the value(s) of the CSI request field(s), the aperiodic CSI reporting for the set of the one or more serving cells. Also, in a case that the value(s) of the CSI request field(s) is "01" (e.g., the CSI request field(s) is set to a second value(s)), the aperiodic CSI report may be triggered for the BWP. Also, in a case that the value(s) of the CSI request field(s) is "10" (e.g., the CSI request field(s) is set to a third value(s)), the aperiodic CSI report may be triggered for a first set of one or more BWPs in a serving cell c (e.g., the first set of the one or more DL BWP in a serving cell c (i.e., a single serving cell c)) that is configured by using the higher layer signal (e.g., the RRC message). Also, in a case that the value(s) of the CSI request field(s) is "11" (e.g., the CSI request field(s) is set to a fourth value(s)), the aperiodic CSI report may be triggered for a second set of one or more BWPs in the serving cell c (e.g., the first set of the one or more DL BWP in the serving cell c (i.e., the same single serving cell c)) that is configured by using the higher layer signal (e.g., the RRC message). Namely, the UE 102 may perform, based on the information configured by using the higher layer and the value(s) of the CSI request field(s), the aperiodic CSI reporting for the set of the one or more BWPs.

Namely, the UE 102 may perform, based on the information configured by using the higher layer and the value(s) of the CSI request field(s), the aperiodic CSI reporting for the set of the one or more serving cells and/or the one or more BWPs. Namely, the gNB 160 may configure the first set of the one or more serving cells and/or the second set of the one or more serving cells. For example, the gNB 160 may transmit the higher layer signal (e.g., the RRC message) including information used for configuring the first set of the one or more serving cells. Also, the gNB 160 may transmit the higher layer signal (e.g., the RRC message) including information used for configuring the second set of the one or more serving cells. Namely, the gNB 160 may transmit the higher layer signal including the information that indicates for which serving cell(s) the aperiodic CSI report is triggered (e.g., in a case that the aperiodic CSI report is triggered by a value(s) of 2-bit CSI request field).

Also, the gNB 160 may configure the first set of the one or more BWPs (e.g., the first set of the one or more DL BWPs) in the serving cell c and/or the second set of the one or more BWPs (e.g., the second set of the one or more DL BWPs) in the serving cell c. For example, the gNB 160 may transmit the higher layer signal (e.g., the RRC message) including information used for configuring the first set of the one or more BWPs in the serving cell c. Also, the gNB 160 may transmit the higher layer signal (e.g., the RRC message) including the second set of the one or more BWPs in the serving cell c. Namely, the gNB 160 may transmit the higher layer signal including the information that indicates for which BWP(s) the aperiodic CSI report is triggered (e.g., in a case that the aperiodic CSI report is triggered by a value(s) of 2-bit CSI request field).

Here, for example, the information used for configuring the first set of the one or more serving cells and/or the information used for configuring the second set of the one or more serving cells may be configured per serving cell. Namely, the information used for configuring the first set of the one or more serving cells and/or the information used for configuring the second set of the one or more serving cells may be configured for each of the serving cells (e.g., each of the primary cell and the one or more secondary cells). Also, the information used for configuring the first set of the one or more serving cells and/or the information used for configuring the second set of the one or more serving cells may be configured per BWP (e.g., per BWP in a serving cell). Namely, the information used for configuring the first set of the one or more serving cells and/or the information used for configuring the second set of the one or more serving cells may be configured for each of BWPs in a serving cell. Also, the information used for configuring the first set of the one or more serving cells and/or the information used for configuring the second set of the one or more serving cells may be configured per DCI format. For example, the information used for configuring the first set of the one or more serving cells and/or the information used for configuring the second set of the one or more serving cells may be configured for each of the DCI formats (e.g., the DCI format A, the DCI format B, the DCI format C, the DCI format E, and/or the DCI format E).

Also, for example, the information used for configuring the first set of the one or more BWPs and/or the information used for configuring the second set of the one or more BWPs may be configured per serving cell. Namely, the information used for configuring the first set of the one or more BWPs and/or the information used for configuring the second set of the one or more BWPs may be configured for each of the serving cells (e.g., each of the primary cell and the one or more secondary cells). Also, the information used for configuring the first set of the one or more BWPs and/or the information used for configuring the second set of the one or more BWPs may be configured per BWP (e.g., per BWP in a serving cell). Namely, the information used for configuring the first set of the one or more BWPs and/or the information used for configuring the second set of the one or more BWPs may be configured for each of BWPs in a serving cell. Also, the information used for configuring the first set of the one or more BWPs and/or the information used for configuring the second set of the one or more BWPs may be configured per DCI format. For example, the information used for configuring the first set of the one or more BWPs and/or the information used for configuring the second set of the one or more BWPs may be configured for each of the DCI formats (e.g., the DCI format A, the DCI format B, the DCI format C, the DCI format E, and/or the DCI format E). Namely, the information used for configuring the first set of the one or more serving cells and/or the information used for configuring the second set of the one or more serving cells may be configured for the each of the serving cell, the each of the BWPs, and/or the each of the DCI formats.

An example of a 3-bit CSI request field is illustrated in FIG. 7(*b*). In a case that the size of the CSI request field(s) is 3-bit, the aperiodic CSI report may be triggered based on a value(s) (i.e., a value(s) of the CSI request field(s)) corresponding to the aperiodic CSI reporting. For example, in a case that the value(s) of the CSI request field(s) is "000" (e.g., the CSI request field(s) is set to a first value(s)), the aperiodic CSI report may not be triggered. Also, in a case that the value(s) of the CSI request field(s) is "001" (e.g., the CSI request field(s) is set to a second value(s)), the aperiodic CSI report may be triggered for the serving cell and/or the BWP. Also, in a case that the value(s) of the CSI request field(s) is "010" (e.g., the CSI request field(s) is set to a third value(s)), the aperiodic CSI report may be triggered for a third set of one or more serving cells and/or the one or more BWPs that is configured by using the higher layer signal (e.g., the RRC message). Also, in a case that the value(s) of the CSI request field(s) is "011" (e.g., the CSI request field(s) is set to a fourth value(s)), the aperiodic CSI report may be triggered for a fourth set of one or more serving cells and/or the one or more BWPs that is configured by using the higher layer signal (e.g., the RRC message). Also, in a case that the value(s) of the CSI request field(s) is "100" (e.g., the CSI request field(s) is set to a fifth value(s)), the aperiodic CSI report may be triggered for a fifth set of one or more serving cells and/or the one or more BWPs that is configured by using the higher layer signal (e.g., the RRC message). Also, in a case that the value(s) of the CSI request field(s) is "101" (e.g., the CSI request field(s) is set to a sixth value(s)), the aperiodic CSI report may be triggered for a sixth set of one or more serving cells and/or the one or more BWPs that is configured by using the higher layer signal (e.g., the RRC message). Also, in a case that the value(s) of the CSI request field(s) is "110" (e.g., the CSI request field(s) is set to a seventh value(s)), the aperiodic CSI report may be triggered for a seventh set of one or more serving cells and/or the one or more BWPs that is configured by using the higher layer signal (e.g., the RRC message). Also, in a case that the value(s) of the CSI request field(s) is "110" (e.g., the CSI request field(s) is set to an eighth value(s)), the aperiodic CSI report may be triggered for an eighth set of one or more serving cells and/or the one or more BWPs that is configured by using the higher layer signal (e.g., the RRC message).

Namely, the UE 102 may perform, based on the information configured by using the higher layer and the value(s) of the CSI request field(s), the aperiodic CSI reporting for the set of the one or more serving cells and/or the one or more BWPs. Namely, the gNB 160 may configure the third set of the one or more serving cells and/or the one or more BWPs. For example, the gNB 160 may transmit the higher layer signal (e.g., the RRC message) including information used for configuring the third set of the one or more serving cells and/or the one or more BWPs. Also, the gNB 160 may configure the fourth set of the one or more serving cells and/or the one or more BWPs. For example, the gNB 160 may transmit the higher layer signal (e.g., the RRC message) including information used for configuring the fourth set of the one or more serving cells. Similar to the third set and the fourth set, the fifth set, the sixth set, the seventh set and the eighth set may be configured by gNB 160 by using the higher layer signal (e.g., the RRC message). Namely, the gNB 160 may transmit the higher layer signal including the information that indicates for which serving cell(s) and/or BWP(s) the aperiodic CSI report is triggered (e.g., in a case that the aperiodic CSI report is triggered by a value(s) of 3-bit CSI request field).

Here, for example, the information used for configuring the set(s) (e.g., the third set, the fourth set, the fifth set, the sixth set, the seventh set, and/or the eighth set) of the one or more serving cells and/or the one or more BWPs may be configured per serving cell. Namely, the information used for configuring the set(s) (e.g., the third set, the fourth set, the fifth set, the sixth set, the seventh set, and/or the eighth set) of the one or more serving cells and/or the one or more BWPs may be configured for each of the serving cells (e.g., each of the primary cell and the one or more secondary cells). Also, the set(s) (e.g., the third set, the fourth set, the fifth set, the sixth set, the seventh set, and/or the eighth set) of the one or more serving cells and/or the one or more BWPs may be configured per BWP (e.g., per BWP in a serving cell). Namely, the set(s) (e.g., the third set, the fourth set, the fifth set, the sixth set, the seventh set, and/or the eighth set) of the one or more serving cells and/or the one or more BWPs may be configured for each of BWPs in a serving cell. Also, the set(s) (e.g., the third set, the fourth set, the fifth set, the sixth set, the seventh set, and/or the eighth set) of the one or more serving cells and/or the one or more BWPs may be configured per DCI format. For example, the set(s) (e.g., the third set, the fourth set, the fifth set, the sixth set, the seventh set, and/or the eighth set) of the one or more serving cells and/or the one or more BWPs may be configured for each of the DCI formats (e.g., the DCI format A, the DCI format B, the DCI format C, the DCI format E, and/or the DCI format E). Namely, the set(s) (e.g., the third set, the fourth set, the fifth set, the sixth set, the seventh set, and/or the eighth set) of the one or more serving cells and/or the one or more BWPs may be configured for the each of the serving cell, the each of the BWPs, and/or the each of the DCI formats.

As described above, the aperiodic CSI report may be triggered for the serving cell(s) and/or the BWPs. Here, the aperiodic CSI report may be triggered for one or more activated serving cells. Also, the aperiodic CSI report may be triggered for one or more deactivated serving cells. Also, the aperiodic CSI report may be triggered for one or more activated BWPs. Also, the aperiodic CSI report may be triggered for one or more deactivated BWPs. Here, the aperiodic CSI report may be triggered for the one or more activated BWPs in the one or more activated serving cells. Also, the aperiodic CSI report may be triggered for the one or more deactivated BWPs in the one or more activated serving cells. Namely, the aperiodic CSI report may not be triggered for the one or more activated BWPs in the one or more deactivated serving cells. Also, the aperiodic CSI report may not be triggered for the one or more deactivated BWPs in the one or more deactivated serving cells. Namely, the aperiodic CSI report may not be triggered for the deactivated serving cells.

Figure 8:
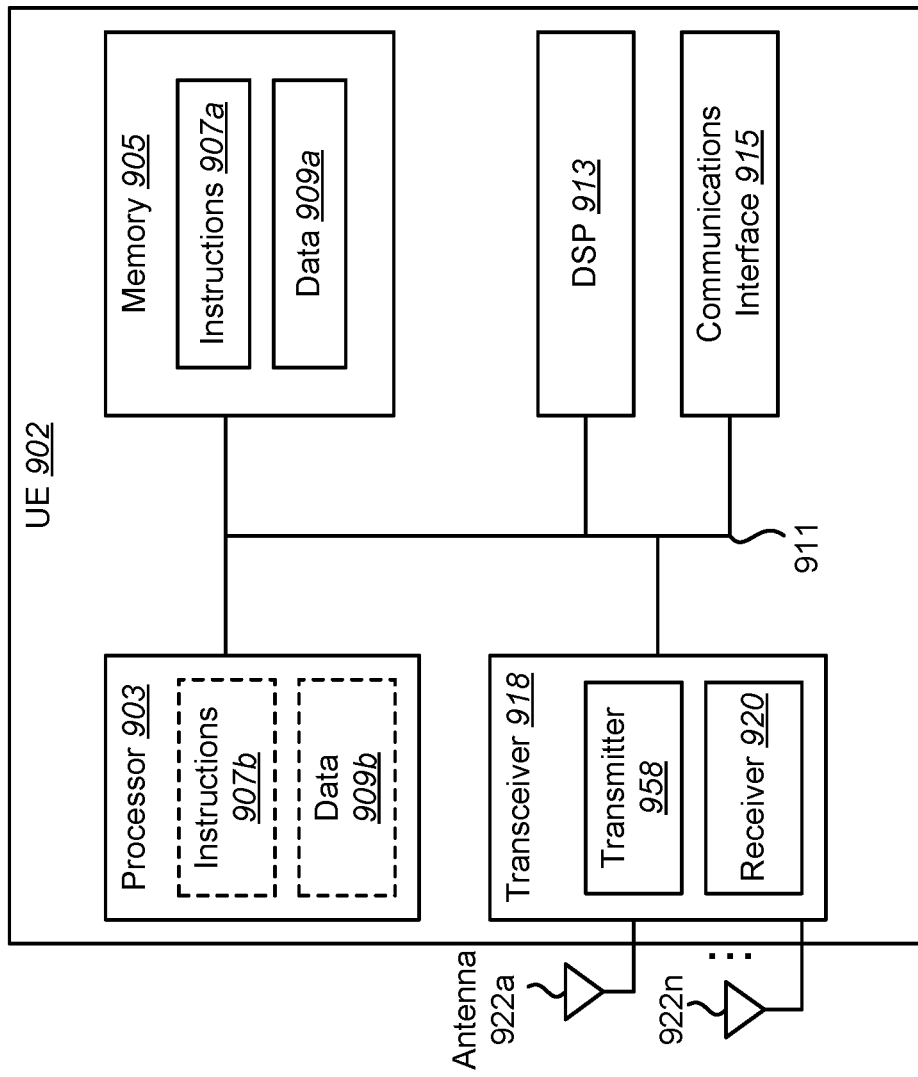
FIG. 8 illustrates various components that may be utilized in a UE.

FIG. 8 illustrates various components that may be utilized in a UE 902. The UE 902 described in connection with FIG. 8 may be implemented in accordance with the UE 102 described in connection with FIG. 1. The UE 902 includes a processor 903 that controls operation of the UE 902. The processor 903 may also be referred to as a central processing unit (CPU). Memory 905, which may include read-only memory (ROM), random access memory (RAM), a combination of the two or any type of device that may store information, provides instructions 907a and data 909a to the processor 903. A portion of the memory 905 may also include non-volatile random access memory (NVRAM). Instructions 907b and data 909b may also reside in the processor 903. Instructions 907b and/or data 909b loaded into the processor 903 may also include instructions 907a and/or data 909a from memory 905 that were loaded for execution or processing by the processor 903. The instructions 907b may be executed by the processor 903 to implement the methods described above.

The UE 902 may also include a housing that contains one or more transmitters 958 and one or more receivers 920 to allow transmission and reception of data. The transmitter(s) 958 and receiver(s) 920 may be combined into one or more transceivers 918. One or more antennas 922a-n are attached to the housing and electrically coupled to the transceiver 918.

The various components of the UE 902 are coupled together by a bus system 911, which may include a power bus, a control signal bus and a status signal bus, in addition to a data bus. However, for the sake of clarity, the various buses are illustrated in FIG. 8 as the bus system 911. The UE 902 may also include a digital signal processor (DSP) 913 for use in processing signals. The UE 902 may also include a communications interface 915 that provides user access to the functions of the UE 902. The UE 902 illustrated in FIG. 8 is a functional block diagram rather than a listing of specific components.

Figure 9:
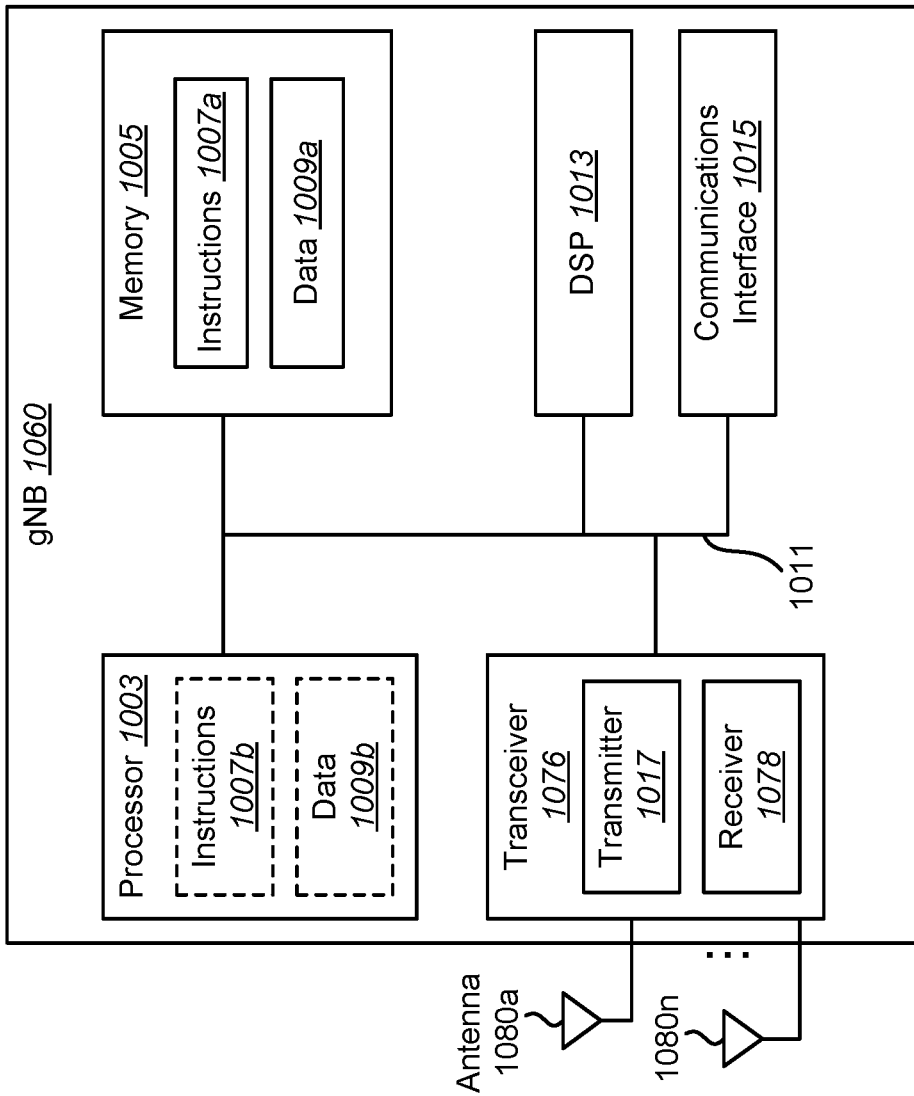
FIG. 9 illustrates various components that may be utilized in a gNB.

FIG. 9 illustrates various components that may be utilized in a gNB 1060. The gNB 1060 described in connection with FIG. 9 may be implemented in accordance with the gNB 160 described in connection with FIG. 1. The gNB 1060 includes a processor 1003 that controls operation of the gNB 1060. The processor 1003 may also be referred to as a central processing unit (CPU). Memory 1005, which may include read-only memory (ROM), random access memory (RAM), a combination of the two or any type of device that may store information, provides instructions 1007a and data 1009a to the processor 1003. A portion of the memory 1005 may also include non-volatile random access memory (NVRAM). Instructions 1007b and data 1009b may also reside in the processor 1003. Instructions 1007b and/or data 1009b loaded into the processor 1003 may also include instructions 1007a and/or data 1009a from memory 1005 that were loaded for execution or processing by the processor 1003. The instructions 1007b may be executed by the processor 1003 to implement the methods described above.

The gNB 1060 may also include a housing that contains one or more transmitters 1017 and one or more receivers 1078 to allow transmission and reception of data. The transmitter(s) 1017 and receiver(s) 1078 may be combined into one or more transceivers 1076. One or more antennas 1080a-n are attached to the housing and electrically coupled to the transceiver 1076.

The various components of the gNB 1060 are coupled together by a bus system 1011, which may include a power bus, a control signal bus and a status signal bus, in addition to a data bus. However, for the sake of clarity, the various buses are illustrated in FIG. 9 as the bus system 1011. The gNB 1060 may also include a digital signal processor (DSP) 1013 for use in processing signals. The gNB 1060 may also include a communications interface 1015 that provides user access to the functions of the gNB 1060. The gNB 1060 illustrated in FIG. 9 is a functional block diagram rather than a listing of specific components.

Figure 10:
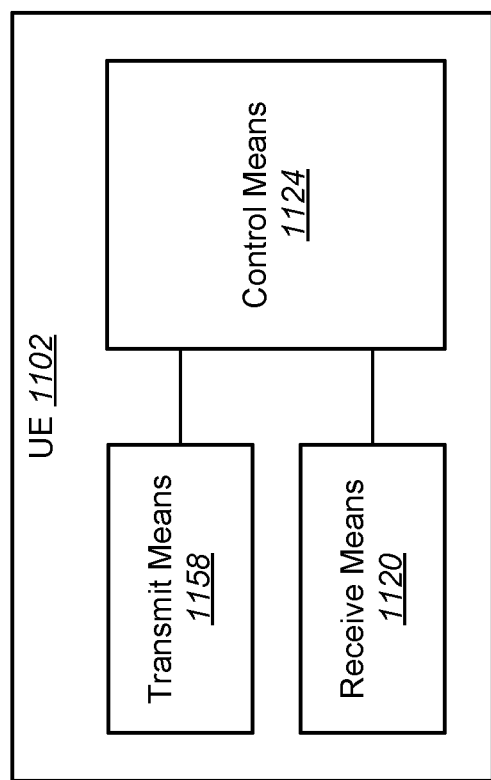
FIG. 10 is a block diagram illustrating one implementation of a UE in which systems and methods for downlink and/or uplink (re)transmissions may be implemented.

FIG. 10 is a block diagram illustrating one implementation of a UE 1102 in which systems and methods for downlink and/or uplink (re)transmissions may be implemented. The UE 1102 includes transmit means 1158, receive means 1120 and control means 1124. The transmit means 1158, receive means 1120 and control means 1124 may be configured to perform one or more of the functions described in connection with FIG. 1 above. FIG. 8 above illustrates one example of a concrete apparatus structure of FIG. 10. Other various structures may be implemented to realize one or more of the functions of FIG. 1. For example, a DSP may be realized by software.

Figure 11:
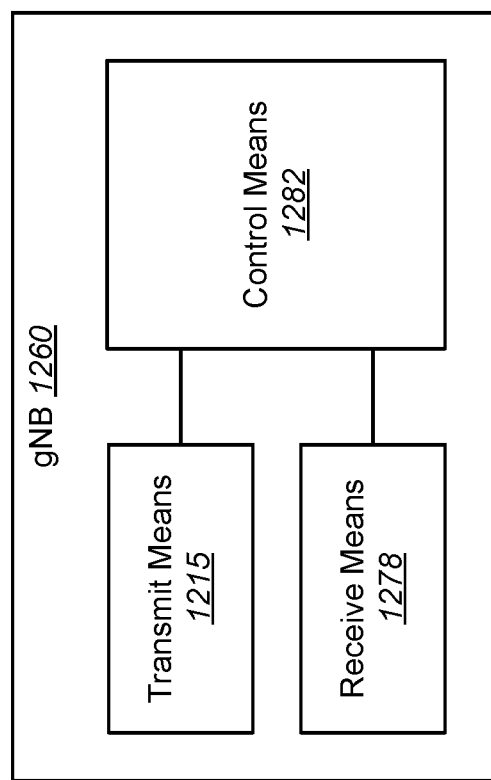
FIG. 11 is a block diagram illustrating one implementation of a gNB in which systems and methods for downlink and/or uplink (re)transmissions may be implemented.

FIG. 11 is a block diagram illustrating one implementation of a gNB 1260 in which systems and methods for downlink and/or uplink (re)transmissions may be implemented. The gNB 1260 includes transmit means 1217, receive means 1278 and control means 1282. The transmit means 1217, receive means 1278 and control means 1282 may be configured to perform one or more of the functions described in connection with FIG. 1 above. FIG. 10 above illustrates one example of a concrete apparatus structure of FIG. 11. Other various structures may be implemented to realize one or more of the functions of FIG. 1. For example, a DSP may be realized by software.

Figure 12:
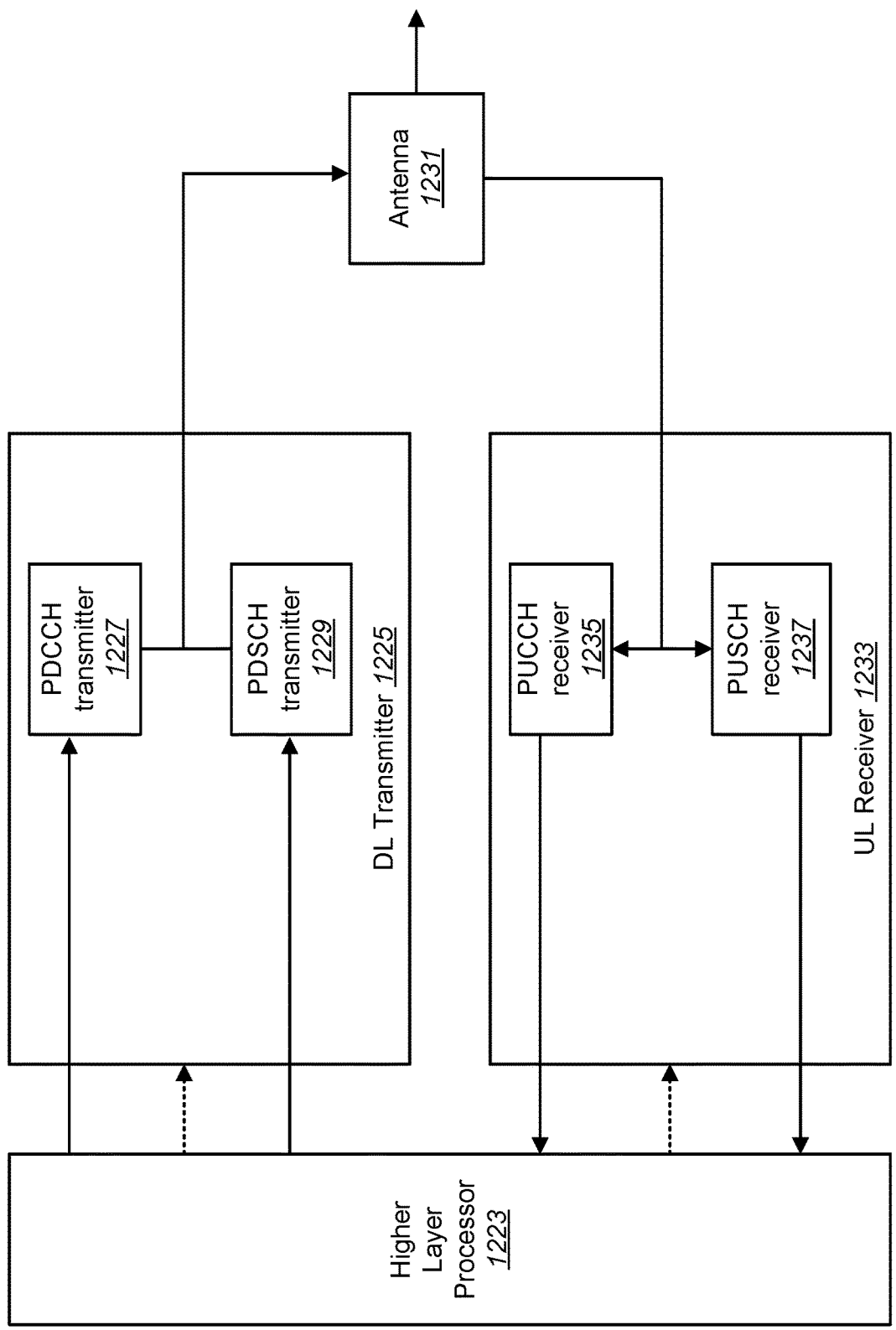
FIG. 12 is a block diagram illustrating one implementation of a gNB.

FIG. 12 is a block diagram illustrating one implementation of a gNB 1260. The gNB 1260 may include a higher layer processor 1223, a DL transmitter 1225, a UL receiver 1233, and antennas 1231. The DL transmitter 1225 may include a PDCCH transmitter 1227 and a PDSCH transmitter 1229. The UL receiver 1233 may include a PUCCH 1235 receiver and a PUSCH receiver 1237. The higher layer processor 1223 may manage physical layer's behaviors (the DL transmitter's and the UL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PDSCH transmitter 1229 transport blocks and provide the PDCCH transmitter 1227 transmission parameters related to the transport blocks. The UL receiver 1233 may receive multiplexed uplink physical channels and uplink physical signals via receiving antennas 1231 and de-multiplex them. The PUCCH receiver 1235 may provide the higher layer processor UCI. The PUSCH receiver 1237 may provide the higher layer processor received transport blocks.

Figure 13:
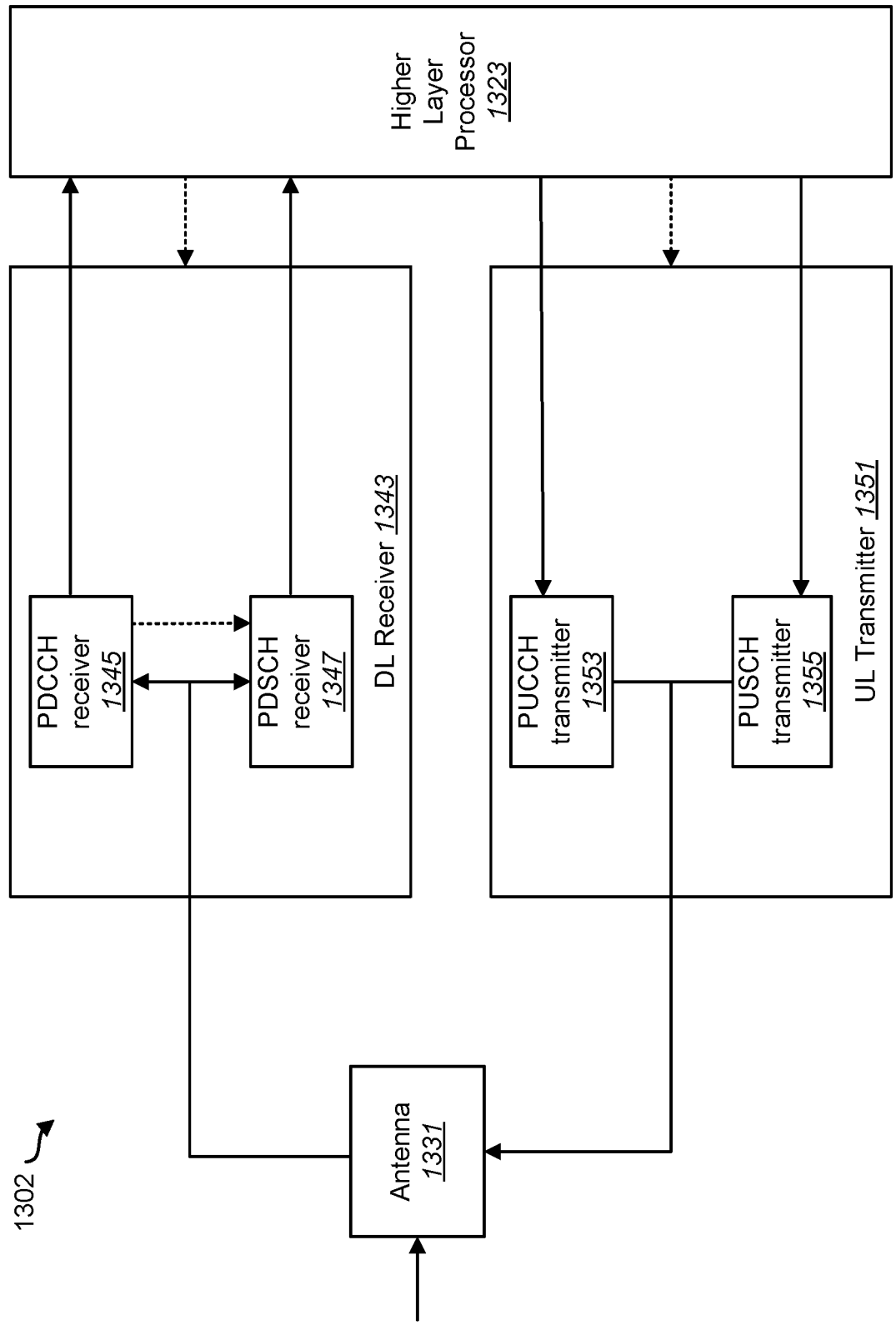
FIG. 13 is a block diagram illustrating one implementation of a UE.

FIG. 13 is a block diagram illustrating one implementation of a UE 1302. The UE 1302 may include a higher layer processor 1323, a UL transmitter 1351, a DL receiver 1343, and antennas 1331. The UL transmitter 1351 may include a PUCCH transmitter 1353 and a PUSCH transmitter 1355. The DL receiver 1343 may include a PDCCH receiver 1345 and a PDSCH receiver 1347. The higher layer processor 1323 may manage physical layer's behaviors (the UL transmitter's and the DL receiver's behaviors) and provide higher layer parameters to the physical layer. The higher layer processor 1323 may obtain transport blocks from the physical layer. The higher layer processor 1323 may send/acquire higher layer messages such as an RRC message and MAC message to/from a UE's higher layer. The higher layer processor 1323 may provide the PUSCH transmitter 1355 transport blocks and provide the PUCCH transmitter 1353 UCI. The DL receiver 1343 may receive multiplexed downlink physical channels and downlink physical signals via receiving antennas 1331 and de-multiplex them. The PDCCH receiver 1345 may provide the higher processor 1323 DCI. The PDSCH receiver 1347 may provide the higher layer processor 1323 received transport blocks.

FIG. 14 is a flow diagram of a communication method of a user equipment (UE) that communicates with a base station apparatus on one or more downlink bandwidth parts (DL BWPs) in a serving cell. The method may include receiving 1402 a radio resource control (RRC) message having first information used for configuring a physical downlink control channel (PDCCH) monitoring periodicity. The method may also include receiving 1404 a RRC message including second information used for configuring more than one offset values. The method may also include monitoring 1406 a PDCCH based on the first information. The method may also include receiving 1408 on the PDCCH, a downlink control information (DCI) format comprising third information and fourth information, the third information triggering an aperiodic channel state information (CSI) report, fourth information being used for indicating one offset value from the more than one offset values, the DCI format being used for scheduling of a physical uplink shared channel (PUSCH). The method may also include performing 1410 in a slot, based on a detection of the DCI comprising the third information and the fourth information, an aperiodic CSI reporting on the PUSCH, the slot being determined based on the fourth information. The first information may be configured for each of one or more search spaces, the one or more search spaces being configured for each of the one or more DL BWPs in the serving cell. The second information may be configured for the serving cell.

FIG. 15 is a flow diagram illustrating a communication method of a base station apparatus that communicates with a user equipment (UE) on one or more downlink bandwidth parts (DL BWPs) in a serving cell. The method may include transmitting 1510 a radio resource control (RRC) message comprising first information used for configuring a physical downlink control channel (PDCCH) monitoring periodicity, the first information being used for the UE to monitor a PDCCH. The method may also include transmitting 1512 a RRC message comprising second information used for configuring more than one offset values. The method may also include transmitting 1514 on the PDCCH, a downlink control information (DCI) format comprising third information and fourth information, the third information triggering an aperiodic channel state information (CSI) report, fourth information being used for indicating one offset value from the more than one offset values, the DCI format being used for scheduling of a physical uplink shared channel (PUSCH). The method may also include receiving 1516 in a slot, based on the transmission of the DCI comprising the third information and the fourth information, an aperiodic CSI reporting on the PUSCH, the slot being given based on the fourth information. The first information may be configured for each of one or more search spaces, the one or more search spaces being configured for each of the one or more DL BWPs in the serving cell. The second information may be configured for the serving cell.

As described above, some methods for the DL and/or UL transmissions (e.g., the PDSCH transmission and/or the PUSCH transmission) may be applied (e.g., specified). Here, the combination of one or more of the some methods described above may be applied for the DL and/or UL transmission (e.g., the PDSCH transmission and/or the PUSCH transmission). The combination of the one or more of the some methods described above may not be precluded in the described systems and methods.

It should be noted that names of physical channels described herein are examples. The other names such as "NRPDCCH, NRPDSCH, NRPUCCH and NRPUSCH," "new Generation-(G)PDCCH, GPDSCH, GPUCCH and GPUSCH" or the like can be used.

The term "computer-readable medium" refers to any available medium that can be accessed by a computer or a processor. The term "computer-readable medium," as used herein, may denote a computer- and/or processor-readable medium that is non-transitory and tangible. By way of example and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD and the like), a magnetic storage medium (for example, a magnetic tape, a flexible disk and the like) and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE) that communicates with a base station apparatus on one or more downlink bandwidth parts (DL BWPs), the one or more DL BWPs being configured for each of one or more serving cells, comprising:
   receiving circuitry configured to receive a radio resource control (RRC) message comprising first information used for configuring a physical downlink control channel (PDCCH) monitoring periodicity,
   the receiving circuitry configured to receive a RRC message comprising second information used for configuring more than one offset values,
   the receiving circuitry configured to monitor a PDCCH based on the first information,
   the receiving circuitry configured to receive on the PDCCH, a downlink control information (DCI) format comprising third information and fourth information, the third information triggering an aperiodic channel state information (CSI) report, the fourth information being used for indicating one offset value from the more than one offset values, the DCI format being used for scheduling of a physical uplink shared channel (PUSCH), and
   transmitting circuitry configured to perform, based on decoding of the DCI format comprising the third information and the fourth information, an aperiodic CSI reporting on the PUSCH in a slot, the slot being determined based on the fourth information, wherein the first information is configured for each of one or more search space sets, the one or more search space sets being configured for each of the one or more DL BWPs, and the second information is configured for the each of the one or more serving cells.

2. The UE according to claim 1, wherein the receiving circuitry is configured to receive a RRC message comprising fifth information used for configuring DCI formats where the UE monitors the PDCCH accordingly in the search space sets, the DCI formats comprising the DCI format used for scheduling of the PUSCH and a DCI format used for scheduling of a physical downlink shared channel (PDSCH).

3. The UE according to claim 2, wherein the RRC message is a dedicated RRC message.

4. A base station apparatus that communicates with a user equipment (UE) on one or more downlink bandwidth parts (DL BWPs), the one or more DL BWPs being configured for each of one or more serving cells, comprising:

transmitting circuitry configured to transmit a radio resource control (RRC) message comprising first information used for configuring a physical downlink control channel (PDCCH) monitoring periodicity, the first information being used for the UE to monitor a PDCCH, the transmitting circuitry configured to transmit a RRC message comprising second information used for configuring more than one offset values, the transmitting circuitry configured to transmit on the PDCCH, a downlink control information (DCI) format comprising third information and fourth information, the third information triggering an aperiodic channel state information (CSI) report, the fourth information being used for indicating one offset value from the more than one offset values, the DCI format being used for scheduling of a physical uplink shared channel (PUSCH), and receiving circuitry configured to receive, based on the transmission of the DCI format comprising the third information and the fourth information, an aperiodic CSI reporting on the PUSCH in a slot, the slot being determined based on the fourth information, wherein the first information is configured for each of one or more search space sets, the one or more search space sets being configured for each of the one or more DL BWPs, and the second information is configured for the each of the one or more serving cells.

5. The base station apparatus according to claim 4, wherein the transmitting circuitry is configured to transmit a RRC message comprising fifth information used for configuring DCI formats where the UE monitors the PDCCH accordingly in the search space sets, the DCI formats comprising the DCI format used for scheduling of the PUSCH and a DCI format used for scheduling of a physical downlink shared channel (PDSCH).

6. The base station apparatus according to claim 4, wherein the RRC message is a dedicated RRC message.

7. A communication method of a user equipment (UE) that communicates with a base station apparatus on one or more downlink bandwidth parts (DL BWPs) the one or more DL BWPs being configured for each of one or more serving cells, comprising:

receiving a radio resource control (RRC) message comprising first information used for configuring a physical downlink control channel (PDCCH) monitoring periodicity, receiving a RRC message comprising second information used for configuring more than one offset values, monitoring a PDCCH based on the first information, receiving on the PDCCH, a downlink control information (DCI) format comprising third information and fourth information, the third information triggering an aperiodic channel state information (CSI) report, the fourth information being used for indicating one offset value from the more than one offset values, the DCI format being used for scheduling of a physical uplink shared channel (PUSCH), and performing, based on decoding of the DCI format comprising the third information and the fourth information, an aperiodic CSI reporting on the PUSCH in a slot, the slot being determined based on the fourth information, wherein the first information is configured for each of one or more search space sets, the one or more search space sets being configured for each of the one or more DL BWPs, and the second information is configured for the each of the one or more serving cells.

8. The communication method according to claim 7, further comprising:

receiving a RRC message comprising fifth information used for configuring DCI formats where the UE monitors the PDCCH accordingly in the search space sets, the DCI formats comprising the DCI format used for scheduling of the PUSCH and a DCI format used for scheduling of a physical downlink shared channel (PDSCH).

9. The communication method according to claim 7, wherein the RRC message is a dedicated RRC message.

10. A communication method of a base station apparatus that communicates with a user equipment (UE) on one or more downlink bandwidth parts (DL BWPs), the one or more DL BWPs being configured for each of one or more serving cells, comprising:

transmitting a radio resource control (RRC) message comprising first information used for configuring a physical downlink control channel (PDCCH) monitoring periodicity, the first information being used for the UE to monitor a PDCCH, transmitting a RRC message comprising second information used for configuring more than one offset values, transmitting on the PDCCH, a downlink control information (DCI) format comprising third information and fourth information, the third information triggering an aperiodic channel state information (CSI) report, the fourth information being used for indicating one offset value from the more than one offset values, the DCI format being used for scheduling of a physical uplink shared channel (PUSCH), and receiving, based on the transmission of the DCI format comprising the third information and the fourth information, an aperiodic CSI reporting on the PUSCH in a slot, the slot being determined based on the fourth information, wherein the first information is configured for each of one or more search space sets, the one or more search space sets being configured for each of the one or more DL BWPs, and the second information is configured for the each of the one or more serving cells.

11. The communication method according to claim 10, further comprising:

transmitting a RRC message comprising fifth information used for configuring DCI formats where the UE monitors the PDCCH accordingly in the search space sets, the DCI formats comprising the DCI format used for scheduling of the PUSCH and a DCI format used for scheduling of a physical downlink shared channel (PDSCH).

12. The base station apparatus according to claim 11, wherein the RRC message is a dedicated RRC message.

* * * * *